United States Patent [19]
Kato et al.

[11] Patent Number: 5,999,185
[45] Date of Patent: Dec. 7, 1999

[54] VIRTUAL REALITY CONTROL USING IMAGE, MODEL AND CONTROL DATA TO MANIPULATE INTERACTIONS

[75] Inventors: Nobuko Kato; Akio Okazaki; Miwako Doi; Kenichi Mori; Mika Fukui, all of Kanagawa-ken; Katsuyuki Murata, Tokyo, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/039,830

[22] Filed: Mar. 30, 1993

[30] Foreign Application Priority Data

| Mar. 30, 1992 | [JP] | Japan | P04-074429 |
| Mar. 31, 1992 | [JP] | Japan | P04-076773 |
| Aug. 27, 1992 | [JP] | Japan | P04-228270 |
| Sep. 30, 1992 | [JP] | Japan | P04-286734 |

[51] Int. Cl.⁶ ................................. G06T 17/00
[52] U.S. Cl. ............................ 345/420; 345/473
[58] Field of Search .................. 395/120, 152, 395/154, 2.69; 345/121, 122, 419, 420, 302, 473–475, 156, 161, 167, 184; 364/468.04; 341/20–35; 463/29–33

[56] References Cited

U.S. PATENT DOCUMENTS

| 4,414,537 | 11/1983 | Grimes | 341/20 |
| 4,487,410 | 12/1984 | Sassak | 472/131 |
| 4,645,459 | 2/1987 | Graf et al. | 434/43 |
| 4,958,297 | 9/1990 | Hansen | 395/154 |
| 4,962,463 | 10/1990 | Crossno et al. | 395/154 |
| 4,965,753 | 10/1990 | Kraemer | 395/152 X |
| 4,985,762 | 1/1991 | Smith | 348/39 |
| 4,988,981 | 1/1991 | Zimmerman et al. | 345/158 |
| 5,092,780 | 3/1992 | Vlach | 434/433 |
| 5,165,897 | 11/1992 | Johnson | 434/113 |
| 5,184,319 | 2/1993 | Kramer | 364/806 |
| 5,185,561 | 2/1993 | Good et al. | 318/432 |
| 5,214,615 | 5/1993 | Bauer | 367/128 |
| 5,245,322 | 9/1993 | Dinwiddie, Jr. et al. | 395/154 X |
| 5,260,869 | 11/1993 | Ferrier et al. | 364/413.01 |
| 5,261,041 | 11/1993 | Susmon | 395/152 |
| 5,287,437 | 2/1994 | Deering | 395/127 |
| 5,287,446 | 2/1994 | Williams et al. | 395/152 |
| 5,315,692 | 5/1994 | Hansen et al. | 395/152 X |
| 5,354,162 | 10/1994 | Burdea et al. | 414/5 |
| 5,359,703 | 10/1994 | Robertson et al. | 395/119 |
| 5,384,908 | 1/1995 | Mackinlay et al. | 395/152 |

*Primary Examiner*—Joseph H. Feild
*Attorney, Agent, or Firm*—Oblon, Spivak, McClelland, Maier & Neustadt, P.C.

[57] ABSTRACT

A virtual reality data presentation system capable of improving naturalness of the system operation and data presentation. In the system, 3D model is presented according to 3D model data; input data for manipulating objects in the presented 3D model is entered; and a presentation of the 3D model is controlled according to the 3D model data, the entered input data, and control data specifying reactions of the objects in the presented 3D model with respect to the entered input data. In addition, in the system, real object data are obtained from actual objects represented by the objects in the 3D model; and a presentation of the presented 3D model is controlled to selectively present selected ones of the objects in the 3D model in terms of the obtained real object data.

28 Claims, 47 Drawing Sheets

FIG.21

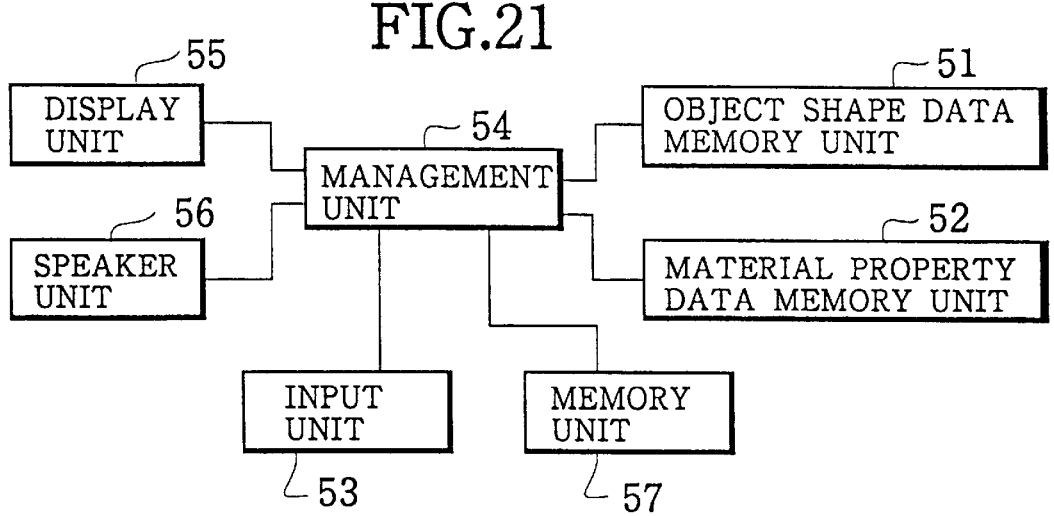

FIG.22

(material name : iron
   (texture : iron_tex)
   (auditory
      (Collision : iron_sound1)
      (Finger_Rub : iron_sound2)
      (Nail_Scratch : iron_sound3)
   (tactile : slippery)

(material name : china
   (texture : china_tex)
   (auditory
      (Collision : china_sound1)
      (Finger_Rub : china_sound2)
      (Nail_Scratch : china_sound3)
      (Destruction : china_sound4)
   (tactile : smooth)

(material name : velvet
   (texture : velvet_tex)
   (auditory : velvet_sound)
   (tactile
      (+X : velvety)
      (−X : rustling)
      (+Y : velvety)
      (−Y : rustling)

FIG.23

(object name : pot-1
   (object shape data * pot)
   (material property data * nil)

(object name : pot-2
   (object shape data * pot)
   (material property data * iron)

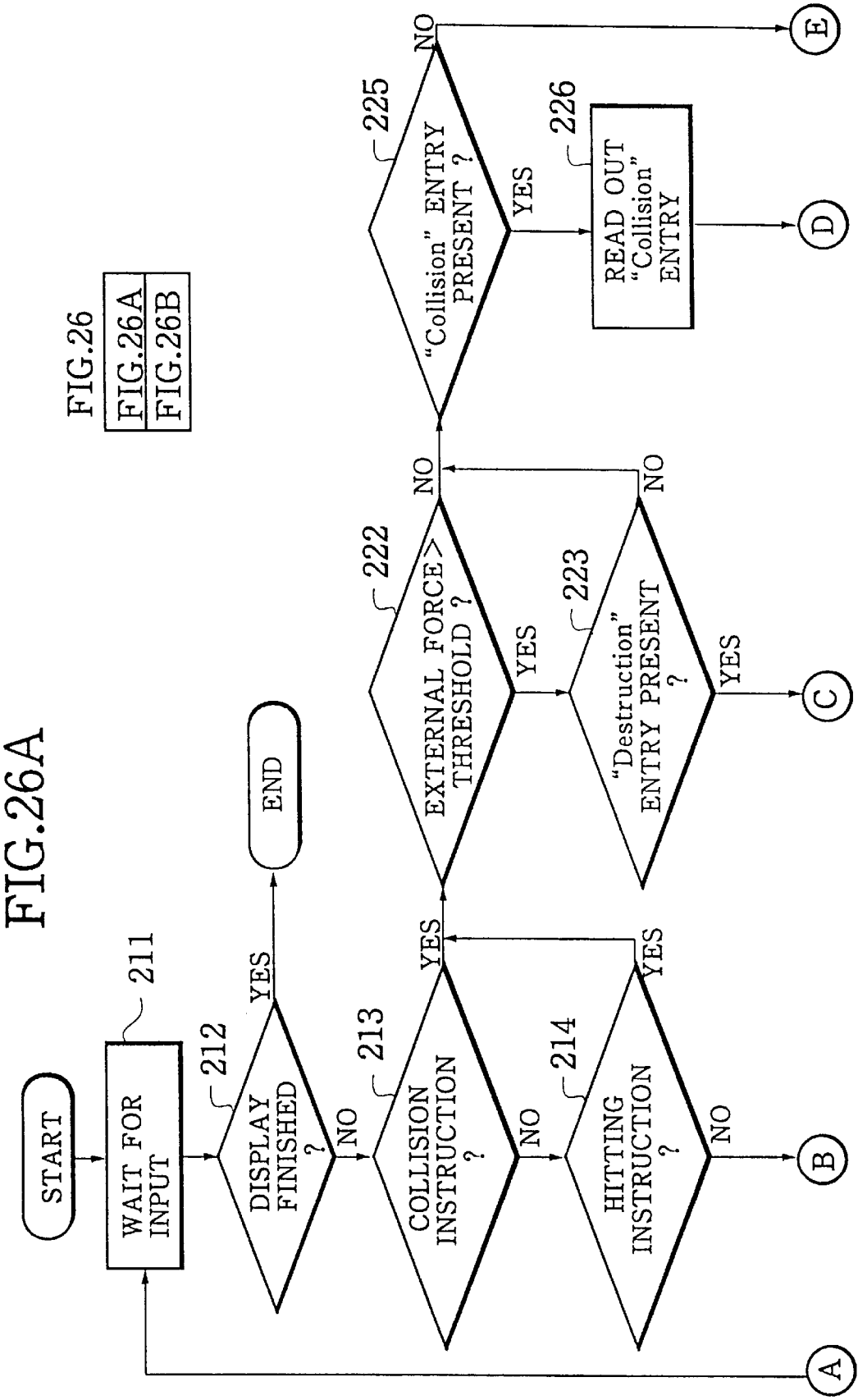

| USER TYPE | HEIGHT |
|---|---|
| ELEMENTARY (LOWER GRADES) | 120cm |
| ELEMENTARY (MIDDLE GRADES) | 130cm |
| ELEMENTARY (UPPER GRADES) | 140cm |
| JUNIOR HIGH (GIRL) | 150cm |
| JUNIOR HIGH (BOY) | 160cm |
| ADULT (FEMALE) | 157cm |
| ADULT (MALE) | 165cm |

| USER TYPE | HEIGHT | ARM LENGTH |
|---|---|---|
| ELEMENTARY (LOWER GRADES) | 120cm | 50cm |
| ELEMENTARY (MIDDLE GRADES) | 130cm | 53cm |
| ELEMENTARY (UPPER GRADES) | 140cm | 55cm |
| JUNIOR HIGH (GIRL) | 150cm | 57cm |
| JUNIOR HIGH (BOY) | 160cm | 57.5cm |
| ADULT (FEMALE) | 157cm | 58.5cm |
| ADULT (MALE) | 165cm | 60cm |

FIG. 37

| ID | NAME | POINTER TO MODEL DATA | POINTER TO REAL DATA | POINTER TO TEXTURE DATA | POSITION COORDINATE |
|---|---|---|---|---|---|
| 711 | PANEL-1 | pd0 | rd0 | ptr0 | $(\alpha_0, \beta_0, \gamma_0)$ |
| 712 | PANEL-2 | pd1 | rd1 | ptr1 | $(\alpha_1, \beta_1, \gamma_1)$ |
| 713 | PANEL-3 | pd2 | rd2 | ptr2 | $(\alpha_2, \beta_2, \gamma_2)$ |
| 721 | TERMINAL-1 | pd3 | rd3 | ptr3 | $(\alpha_3, \beta_3, \gamma_3)$ |
| 722 | TERMINAL-2 | dp4 | rd4 | ptr4 | $(\alpha_4, \beta_4, \gamma_4)$ |
| 723 | TERMINAL-3 | pd5 | rd5 | ptr5 | $(\alpha_5, \beta_5, \gamma_5)$ |
| 724 | TERMINAL-4 | pd6 | rd6 | ptr6 | $(\alpha_6, \beta_6, \gamma_6)$ |
| 725 | TERMINAL-5 | pd7 | rd7 | ptr7 | $(\alpha_7, \beta_7, \gamma_7)$ |
| 726 | TERMINAL-6 | pd8 | rd8 | ptr8 | $(\alpha_8, \beta_8, \gamma_8)$ |
| 727 | TERMINAL-7 | pd9 | rd9 | ptr9 | $(\alpha_9, \beta_9, \gamma_9)$ |

FIG.40

RULE1 : WHEN $L \leq T1$,
FOR OBJECTS WITHIN CIRCLE
WITH RADIUS $\ell' = L\tan 17°$

⟶ REAL DATA DISPLAY

RULE2 : WHEN $T1 < L \leq T2$,
FOR OBJECTS WITHIN CIRCLE
WITH RADIUS $\ell = L\tan 5°$

⟶ REAL DATA DISPLAY

RULE3 : WHEN $L > T2$,
FOR ALL OBJECTS

⟶ TEXTURE DATA DISPLAY

RULE4 : WHEN $L \leq T1$,
FOR OBJECTS OUTSIDE CIRCLE
WITH RADIUS $\ell' = L\tan 17°$

⟶ TEXTURE DATA DISPLAY

RULE5 : WHEN $T1 < L \leq T2$,
FOR OBJECTS OUTSIDE CIRCLE
WITH RADIUS $\ell = L\tan 5°$

⟶ TEXTURE DATA DISPLAY

FIG.45

| ID | NAME | POINTER TO REAL SOUND DATA | POINTER TO SIMULATED SOUND DATA | POSITION COORDINATE |
|---|---|---|---|---|
| 711 | PANEL-1 | rs0 | ps0 | $(\delta_0, \epsilon_0, \eta_0)$ |
| 712 | PANEL-2 | rs1 | ps1 | $(\delta_1, \epsilon_1, \eta_1)$ |
| 713 | PANEL-3 | rs2 | ps2 | $(\delta_2, \epsilon_2, \eta_2)$ |
| 721 | TERMINAL-1 | rs3 | ps3 | $(\delta_3, \epsilon_3, \eta_3)$ |
| 722 | TERMINAL-2 | rs4 | ps4 | $(\delta_4, \epsilon_4, \eta_4)$ |
| 723 | TERMINAL-3 | rs5 | ps5 | $(\delta_5, \epsilon_5, \eta_5)$ |
| 724 | TERMINAL-4 | rs6 | ps6 | $(\delta_6, \epsilon_6, \eta_6)$ |
| 725 | TERMINAL-5 | rs7 | ps7 | $(\delta_7, \epsilon_7, \eta_7)$ |
| 726 | TERMINAL-6 | rs8 | ps8 | $(\delta_8, \epsilon_8, \eta_8)$ |
| 727 | TERMINAL-7 | rs9 | ps9 | $(\delta_9, \epsilon_9, \eta_9)$ |

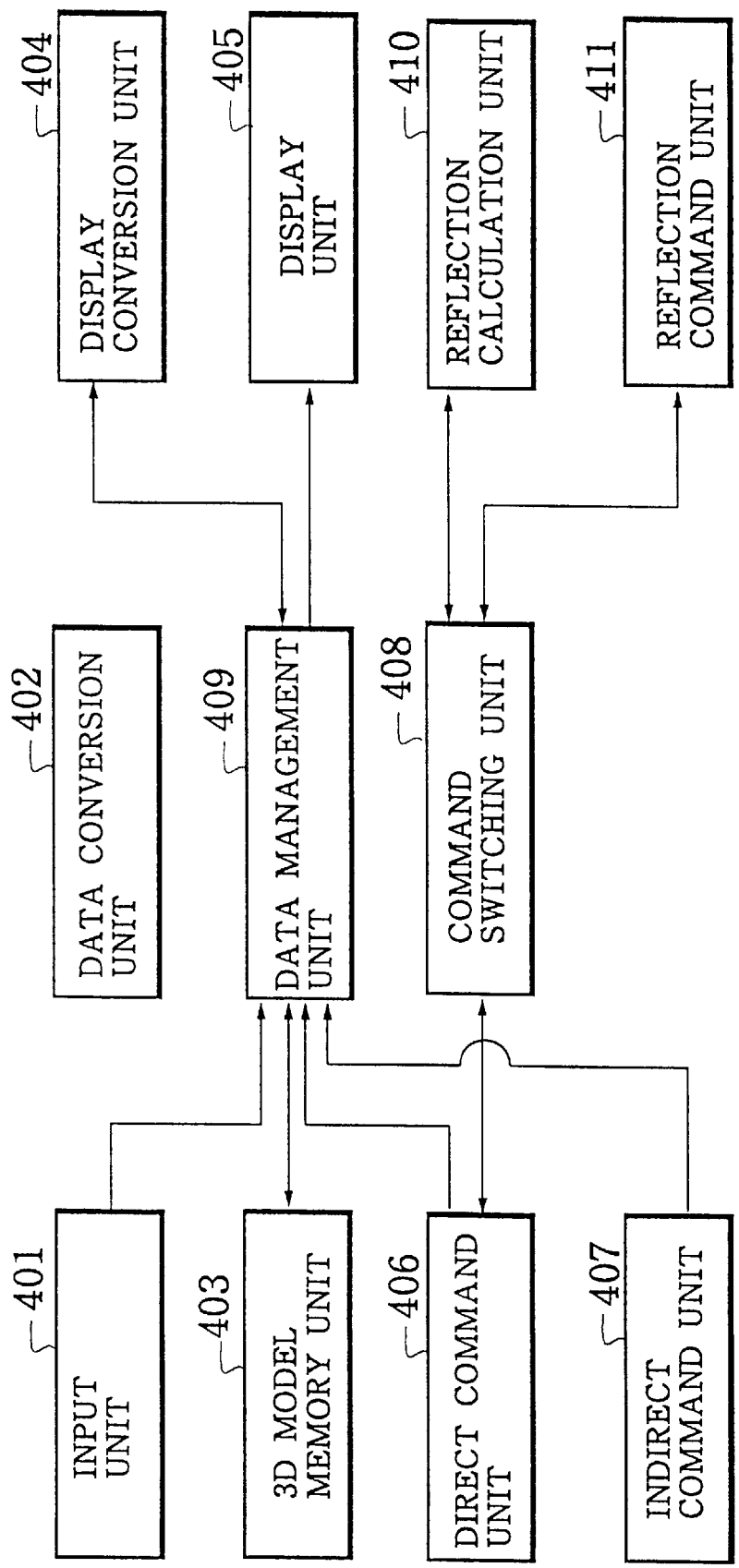

FIG.52

| MONITOR NUMBER | POSITION | VERTICES | DIAMETER/ RADIUS OF CURVATURE (d/r) | MATERIAL |
|---|---|---|---|---|
| 0 | $(X_0, Y_0, Z_0)$ | $(X_{00}, Y_{00}, Z_{00})$<br>$(X_{01}, Y_{01}, Z_{01})$<br>$(X_{02}, Y_{02}, Z_{02})$<br>$(X_{03}, Y_{03}, Z_{03})$ | 0.0 | GLASS |
| ⋮ | ⋮ | ⋮ | ⋮ | ⋮ |
| N | $(X_N, Y_N, Z_N)$ | $(X_{N0}, Y_{N0}, Z_{N0})$<br>$(X_{N1}, Y_{N1}, Z_{N1})$<br>$(X_{N2}, Y_{N2}, Z_{N2})$<br>$(X_{N3}, Y_{N3}, Z_{N3})$ | 0.1 | GLASS |

FIG.53

| LIGHT NUMBER | POSITION | VERTICES | LUMINOUS INTENSITY | |
|---|---|---|---|---|
| | | | WITHOUT LOUVER | WITH LOUVER |
| 0 | $(x_0, y_0, z_0)$ | $(x_{00}, y_{00}, z_{00})$<br>$(x_{01}, y_{01}, z_{01})$<br>$(x_{02}, y_{02}, z_{02})$<br>$(x_{03}, y_{03}, z_{03})$ | 500 | 250 |
| ⋮ | ⋮ | ⋮ | ⋮ | ⋮ |
| L | $(x_L, y_L, z_L)$ | $(x_{L0}, y_{L0}, z_{L0})$<br>$(x_{L1}, y_{L1}, z_{L1})$<br>$(x_{L2}, y_{L2}, z_{L2})$<br>$(x_{L3}, y_{L3}, z_{L3})$ | 500 | 250 |

| DATA GLOVE | GRASPING | DIRECT COMMAND |
|---|---|---|
| : | : | : |
| KEYBOARD | FUNCTION-1 KEY | DIRECT COMMAND |
| : | FUNCTION-2 KEY | INDIRECT COMMAND |
|  | : | : |
| ∫ | ∫ | ∫ |

FIG.62

```
  0
SECTION          ← DATA START
  2
ENTITIES         ← ATTRIBUTE START
  0
POLYLINE         ← ATTRIBUTE NAME (POLYLINE)
  8
0
 66
  1
 10              ← FIRST x COORDINATE (0, 0)
0.0
 20              ← FIRST y COORDINATE (0, 0)
0.0
 30              ← FIRST z COORDINATE (0, 0)
0.0
 70              ← REPETITION NO. (9)
  9
  0
VERTEX           ← ATTRIBUTE NAME (VERTEX)
  8
0
 10              ← FIRST x COORDINATE (−0.599)
−0.599
 20              ← FIRST y COORDINATE (0.599)
0.599
 30              ← FIRST z COORDINATE (0.599)
0.599
 70
 32
  0
VERTEX
  8
0
 10
−0.599
 20
−0.599
 30
0.599
 70
 32
  0
VERTEX

0
ENDSEC           END OF DATA
  0
EOF              END OF FILE
```

VIRTUAL REALITY CONTROL USING IMAGE, MODEL AND CONTROL DATA TO MANIPULATE INTERACTIONS

BACKGROUND OF THE INVENTION

1. Field of the Invention

The present invention relates to a data presentation system for such data as visual image data and audio sound data, and more particularly, to a data presentation system suitable for the so called virtual reality data presentation.

2. Description of the Background Art

Conventionally, there has been an image display for displaying the computer graphic images on a display screen of a work station at which the displayed images can be manipulated, and such an image display has been utilized in various designing purposes.

More recently, there has been a development of a virtual reality image display device having an input unit in a form of a data glove or a data suit which measures the body motion of an operator directly and inputs the measured data as input data for an input coupled image, such that the operator is allowed to make an active access to a virtual space formed within the displayed images in real time.

In such a virtual reality image display device, the 3D (three-dimensional) images are displayed, and the objects shown in the displayed images can be lifted up, twisted, or pulled within the virtual space, in response to the corresponding operations of the input unit made by the operator and detected by the input unit, by reflecting the operations of the input unit made by the operator in the input coupled image in the displayed images.

In a conventionally available virtual reality image display device, the correspondence between the displayed image and the operations of the input unit by the operator have been made as follows.

Namely, the position of the input coupled image is determined in terms of a displacement from an origin of the input unit. In this case, the operation of the input unit always coincides with the motion of the input coupled image in the virtual space, so that the motion in the displayed image may appear unnatural or unreal in some cases.

For example, consider a case of using the data glove as the input unit and a hand image as the input coupled image, where the position and configuration of the data glove operated by the operator correspond to the position and the configuration of the hand image in the displayed image. In this case, when the operator carries out the operation to pick up an object in the virtual space and displaces it to the other location within the virtual space, the operator's hand operating the data glove is freely movable in the real space, so that the object in the virtual space can be moved in response to the unintentional slight trembling of the operator's hand. However, such a motion of the object in the virtual space can appear unnatural in view of the real space in which the object has some weight or the object has some support so that the object cannot be moved so easily by such a slight trembling of the hand.

In this regard, in order to realize the more realistic presentation of the virtual space, an additional control mechanism for limiting the operation of the input unit by the operator may be provided such that this control mechanism is activated to increase the reality in the virtual space. (See, H. Iwata, "Artificial Reality with Force-feedback: Development of Desktop Virtual Space with Compact Master Manipulator", Computer graphics, Vol. 24, No. 4, August 1990.)

For example, by providing a feedback for controlling the input unit to the input unit according to the positions of the hand image and the object in the displayed image, the operator's operation of the data glove can be appropriately limited when the object is heavy, such that the sense of a reality in the operation of the input unit can be realized, and consequently the displayed image can appear more natural. In addition, because of the presence of the feedback to the input unit, it also becomes possible for the operator to sense the situation within the virtual space.

However, such an additional control mechanism requires a highly specialized equipment to be attached to the input unit, which also makes the input unit as a whole to be quite large, and its applicability and operational range can be quite limited, so that this scheme is not very practical.

There has also been a problem concerning a relationship among the objects in the displayed virtual space. Namely, in a conventional virtual reality image display device, because the objects in the virtual space can be moved by the operator through the input unit, the interference checking has been carried out in order to avoid the unnatural display of the objects overlapped with each other. For example, when a box located on top of a table is to be moved to another table in the virtual space, the box should not appear to be overlapping with another table after the box has been moved, and should properly appear to be located on top of another table.

Although this interference checking is capable of avoiding the unnatural display very strictly, it requires a large amount of calculations for determining the display positions of the objects, so that it is quite time consuming. In particular, when the virtual space contains many objects, the amount of calculations required by the interference checking can be so enormous that the real time processing of the display in response to the operation of the input unit by the operator becomes practically impossible.

Now, consider a case in which the operator is to move through the virtual space representing 3D model of the interior of a building or a city. In such a case, it is often difficult for the operator to comprehend where he is located presently and which way he is oriented presently, so that there is a need to provide such a position information to the operator. Here, the position information useful for the operator includes the operator's viewpoint indicating the present position in the displayed virtual space, the operator's reference point indicating the object presently attracting the operator's attention in the displayed virtual space, and the operator's field of view indicating the range that the operator can presently see in the displayed virtual space.

Conventionally, such a position information has been presented either in terms of numerical data for the viewpoint, the reference point, and the field of view, displayed at a part of the display, or in a form of a two-dimensional overview of the entire virtual space looked from a particular direction on which the viewpoint is indicated by a dot and which is displayed at a part of the display.

However, these conventional manners of presenting the position information have been associated with the drawbacks in that the numerical data are very difficult to comprehend immediately, and that the overview can only provide the very rough information, so that the more informative information such as what is located in a vicinity of the operator's present position cannot be obtained from the overview.

Now, in a conventional computer graphics technique, the shape of the object and the material of the object are usually defined separately. For example, when the 3D shape data for a pot are provided, the material property of this pot can be quite different depending on a texture with which its surface is presented.

The simplest method for presenting the material property of an object is to change the color and the amount of light reflection of its surface. For example, when the surface makes a mirror like reflection of lights, the object can appear metallic. On the other hand, when the surface makes a uniform scattering of the lights, the object appear can plastic. However, this simplest manner can only present a uniform surface quality.

Another conventionally known method for presenting the material property of an object is a so called texture mapping, in which the patterns indicative of the texture is attached on a surface of the object. For example, when the characteristic pattern of the grain of the wood is attached to an object, the object can appear to be made of wood, whereas when the characteristic pattern of marble is attached to an object, the object can appear to be made of marble. It is also possible to attach a picture such as a label. However, in this texture mapping method, only a flat pattern is attached to a flat surface, so that the material property of concavity or convexity cannot be presented.

In order to make up for this shortcoming of the texture mapping method, there is also a method called bump mapping, in which a divergence of normal vectors is attached to a surface of an object. In this bump mapping method, it is therefore possible to provide an uneven appearance of the surface, which can be put in a pattern of a rock face, a brass work, or a water ring. Even in such a case, there is no need to complicate the original object shape data in this bump mapping method.

Yet, these texture mapping method and the bump mapping method are exclusively directed toward the presentation of the visual material property alone, despite of the fact that the object in the real space has many other characteristic material properties. For example, a wooden pot not only has a pattern of the grain of the wood on its surface, but it also makes a dull sound when it is hit, and it has rather rough feel when it is touched. The texture mapping method and the bump mapping method described above totally ignore these other material properties of the objects.

On the other hand, in the recent virtual reality data presentation, the virtually realistic situation is realized by utilizing various material property presentation techniques such as 3D image display, computer graphics, 3D sound space production, and artificial touch sense presentation.

By using this technique of the virtual reality, it is possible to provide an opportunity for anyone to experience an event that is rather difficult to experience in real space. Also, this virtual reality technique can be utilized in as a simulator for the various trainings such as a flight training, such that the training can be carried out in a realistic situation.

In a conventional virtual reality data presentation system, various presentation parameters for determining the manner of data presentation such as the viewpoint for the image display, the repulsive force to be given back, the loudness of the sound to be outputted, etc. are designed in view of a prescribed standard user's attributed values such as height, strength, etc., so that a user having the attributed values which are greatly different from those of the standard user may not be able to receive the presented data to be natural because of the setting of these presentation parameters which seems unbalanced or distorted to such a user.

For example, when the viewpoint of the image display is designed in view of an adult male user, a child user who has much shorter arm length compared with the adjust male would have a difficulty in reaching to an object which is designed to be placed in the displayed virtual space at a position reachable by a standard adult male user. Also, in a case there is a repulsive force to be given back from the data presentation system to the user, the repulsive force designed in view of an adult male user can be dangerously strong for a child user.

Similarly, in the virtual reality data presentation system using the 3D image display or the 3D sound space production, the presented images and sounds may not necessarily have the truly 3D quality for some users who have attributed values greatly different from those of a standard user in view of whom the system had been designed.

Also, in a case of utilizing the virtual reality data presentation system for evaluating the proto-type product, it is preferable to make an evaluation from a standpoint of the actual user of the product. Thus, when the product is a toy to be used by a child, it is preferable to make an evaluation from a standpoint of a child user who has much different attributed values compared with an adult who has developed the product. Similarly, when the product is a kitchen system, it may not be sufficient to make an evaluation from a standpoint of an adult female in general, and it is rather preferable to make an evaluation from a standpoint of a younger adult female, a standpoint of an older adult female, etc. who have largely different physical attributed values as well as greatly different preferences.

However, the conventional virtual reality data presentation system has been designed in view of a specific standard user, and it has been impossible to adjust the settings of the presentation parameters according to the attributed values of the individual user or to experience the different standpoints of various different users.

Now, conventionally, the training of an operator of a monitoring system for a nuclear plant or a steel plant, has been achieved by using a replica of the actual monitoring system, such that the training for various situations including those of the serious troubles can be carried out, while the actual monitoring system remains in operation.

However, such a replica monitoring system for training purpose is made in the actual size of the actual monitoring system, which is quite large. In addition, a number of different replica monitoring systems must be provided for a number of different monitoring targets, so that this scheme of training can be quite costly. In addition, at a time of updating the replica monitoring system in accordance with the updating of the actual monitoring system, the physical construction works must be carried out, so that this scheme is both time consuming as well as ineconomical.

In view of such problems encountered in the conventional training scheme suing replica, the use of the virtual reality data presentation system as a simulator for such a training is increasing. In this application of the virtual reality data presentation system, the simulated monitoring system can be updated easily as it is realized as 3D model on a computer, so that it is much less time consuming as well as less costly.

In such a virtual reality data presentation system, hen the straightforward 3D model presentation alone is not realistic enough, the reality of the presented data can be increased by the method called texture mapping in which the texture expressing the material property of the objects in the 3D model is attached to the objects in the 3D model, as described above.

Now, in this texture mapping method, the texture to be attached to the object is usually obtained as images taken through an image scanner. For this reason, the attached image itself remains unchanged regardless of whether it is looked at from far away or nearby. However, in the real space, the each small pat-tern in the image is not clearly visible and appears to be absorbed into the image as a whole from far away, while it becomes clearly and distinctively visible from nearby, and such a perspective cannot be obtained by the texture mapping.

In order to improve in this aspect, there is a proposition for switching one texture image with another texture image in which the pattern is shown more clearly whenever the distance from the viewpoint becomes less than a prescribed value. However, in this modified method, there is a drawback in that the switching of the images must be made so abruptly that the large changes of the details of the appearance before and after the switching can make it appear rather unnatural. In order to achieve the smooth changes of the appearance, a large number of images must be provided and the switching operation must be repeated.

On the other hand, the monitoring screen on the monitoring system shows various data given in terms of letters, figures, and graphs from which the operator makes judgements, these data are constantly changing in time in the real space, but the image attached by the texture mapping is unchangeable, so that the various data necessary for making judgements cannot be provided to the operator in the simulated monitoring system using the texture mapping method.

In order to overcome this drawback, there is a proposition for using the real computer output. However, in such a scheme, the data provided by the real computer output are practically invisible when the viewpoint is located far away, so that the time and the system function for maintaining the display of the real computer output is wasteful in such a case.

Furthermore, in a conventional virtual reality data presentation system, the presented data are largely biased toward the visual image data. However, in the actual monitoring system, the audio sound data such as the vibration sounds of the motors and the sounds of fluid flows through the pipes can provide the variable information, so that there are cases in which the actual sounds collected by the microphones located at the monitoring target cite are outputted at the monitoring system through speakers.

However, in a case the number of monitoring targets increases, if all the sounds collected from all the monitoring target are outputted continually, the slight abnormal sound indicative of the malfunction can be inaudible because of all the sounds outputted concurrently.

Now, the designing the various office rooms and monitoring rooms has conventionally been made on a basis of a sketches from various viewpoints prepared by a designer. However, it is practically impossible to prepare the sketches from arbitrary viewpoint, accounting for every possible settings of the variable parameters, so that the designed arrangement can be evaluated only from a limited number of viewpoints.

In order to resolve this problem of the conventional designing procedure, it is possible to utilize the computer graphics technique for the designing purpose.

In this case, the displayed 3D model representing the designed arrangement can be prepared by using the CAD system and displayed in a form of a perspective projection from arbitrary viewpoint, so that the designed arrangement can be evaluated more thoroughly.

However, even when the replacement of the designer's sketches with the computer graphics is made, it is still impossible to check the reflections due to the ceiling lights on the monitor screens, which is very serious practical concern.

Moreover, in the conventional computer graphics, even when the defect of the arrangement is found on the displayed 3D model, it has been impossible to make the necessary corrections on the displayed 3D model, because the computer graphics is basically the display tool which utilizes the 3D model data solely for the purpose of displaying.

On the other hand, the human comprehension of the 3D arrangement of the 3D objects is largely helped by the presence of the shadows on the floor. In the conventional computer graphics, there are several shadow calculation algorithms including the ray tracing algorithm based on the mirror reflection model, and the radio city algorithm based on the total scattering model. The former is known to be suitable for the reflection at the metallic surface, while the latter is known to be suitable for calculating the soft shadow images.

However, these conventionally known shadow calculation algorithms have the serious drawback of the enormous time required for their calculations.

There has also been a proposition for the high speed shadow calculation algorithm called fake shadow algorithm. however, this algorithm is capable of producing only very clear shadow images which may not necessarily be very realistic.

Now, in the monitoring room or the office room which is equipped with many ceiling fluorescent lights, the actual shadows on the floor appear rather dim, with uncertain boundary. Thus, the shadows calculated by the fake shadow algorithm appear too distinct to be natural.

SUMMARY OF THE INVENTION

It is therefore an object of the present invention to provide a virtual reality data presentation system capable of presenting the visual image data and the audio sound data which react more naturally with respect to the operations made by the operator.

It is another object of the present invention to provide a virtual reality data presentation system capable of determining a natural display position for an object in the virtual space moved in response to the operations made by the operator.

It is another object of the present invention to provide a virtual reality data presentation system capable of providing easily comprehensible and more informative position information to the operator.

It is another object of the present invention to provide a virtual reality data presentation system capable of presenting various material properties of the objects in the virtual space.

It is another object of the present invention to provide a virtual reality data presentation system capable of adjusting the settings of the presentation parameters according to the attributed values of the individual user and enabling any operator to experience the different standpoints of various different users.

It is another object of the present invention to provide a virtual reality data presentation system capable of providing the real image and sound data for judgement making to the operator whenever necessary while reducing the unnecessary load on the system.

It is another object of the present invention to provide a virtual reality data presentation system capable of checking the reflections due to the lights in the 3D model representing the 3D arrangement of the 3D objects.

It is another object of the present invention to provide a virtual reality data presentation system capable of displaying and freely correcting the 3D model representing the 3D arrangement of the 3D objects.

It is another object of the present invention to provide a virtual reality data presentation system capable of displaying the 3D model with the natural shadow images at high speed.

According to one aspect of the present invention there is provided a virtual reality data presentation system, comprising: model data memory means for storing 3D (three dimensional) model data; data presentation means for presenting the 3D model according to the 3D model data stored in the data memory means; input means for entering input data for manipulating objects in the 3D model presented by the data presentation means; control data memory means for storing control data for specifying reactions of the objects in the 3D model presented by the data presentation means with respect to the input data entered from the input means; and control means for controlling a presentation of the 3D model by the data presentation means according to the 3D model data stored in the model data memory means, the input data entered from the input means, and the control data stored in the control data memory means.

According to another aspect of the present invention there is provided a virtual reality data presentation system, comprising: model data memory means for storing 3D (three dimensional) model data; data presentation means for presenting the 3D model according to the 3D model data stored in the data memory means; real data acquisition means for obtaining real object data from actual objects represented by the objects in the 3D model; and control means for controlling the data presentation means to selectively present selected ones of the objects in the 3D model in terms of the real object data obtained by the real data acquisition means.

According to another aspect of the present invention there is provided a method of virtual reality data presentation, comprising the steps of: presenting 3D model according to 3D model data; entering input data for manipulating objects in the 3D model presented at the presenting step; and controlling a presentation of the 3D model at the presenting step according to the 3D model data, the input data entered at the entering step, and control data specifying reactions of the objects in the 3D model presented at the presenting step with respect to the input data entered at the entering step.

According to another aspect of the present invention there is provided a method of virtual reality data presentation, comprising the steps of: presenting 3D model according to 3D model data; obtaining real object data from actual objects represented by the objects in the 3D model; and controlling a presentation of the 3D model at the presenting step to selectively present selected ones of the objects in the 3D model in terms of the real object data obtained at the obtaining step.

Other features and advantages of the present invention will become apparent from the following description taken in conjunction with the accompanying drawings.

BRIEF DESCRIPTION OF THE DRAWINGS

FIG. 21 is a schematic block diagram of a third embodiment of a virtual reality data presentation system according to the present invention.

FIG. 22 is an illustration of a data format for the material property data used in the system of FIG. 21.

FIG. 23 is an illustration of a data format for the linkage data used in the system of FIG. 21.

FIG. 26 which includes FIGS. 26A and 26B is a flow chart for the operation of manipulating the displayed object in the system of FIG. 21.

FIG. 37 is a diagrammatic illustration of a table for managing object in the 3D model memory unit in the system of FIG. 35.

FIG. 40 is a table summarizing the rules for switching between texture data and real data used in the system of FIG. 35.

FIG. 45 is a diagrammatic illustration of a table for managing object in the 3D model memory unit in the system of FIG. 43.

FIG. 47 is a schematic block diagram of a seventh embodiment of a virtual reality data presentation system according to the present invention.

FIG. 52 is a diagrammatic illustration of a monitor screen data used in the system of FIG. 47.

FIG. 53 is a diagrammatic illustration of a light source data used in the system of FIG. 47.

FIG. 62 is an illustration of the 3D model data for a cube in a dxf format to be used in the CAD system.

DETAILED DESCRIPTION OF THE PREFERRED EMBODIMENTS

Figure 1:
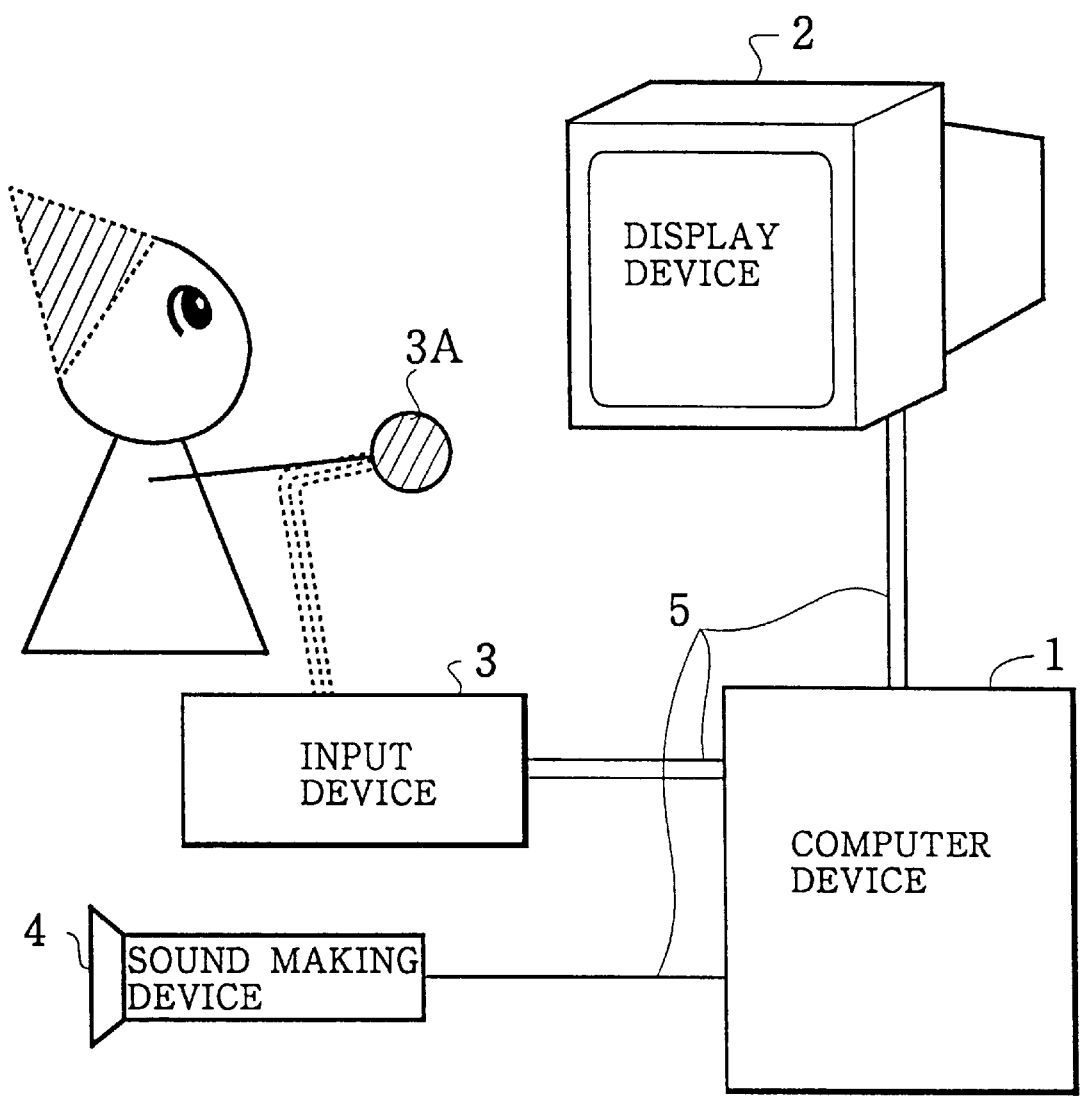
FIG. 1 is a schematic block diagram of a first embodiment of a virtual reality data presentation system according to the present invention.

Referring now to FIG. 1, a first embodiment of a virtual reality data presentation system according to the present invention will be described in detail.

In this first embodiment, the system is constructed in a form or a work station system which comprises: a computer device 1; a display device 2 such as a CRT for displaying visual image data forming a virtual space; an input device 3 having a data glove 3A to be worn by an operator, which enters input commands from the operator; and a sound making device 4 such as a loudspeaker for outputting sound data; where the display device 2, the input device 3, and the sound making device 4 are all connected to the computer device 1 through data lines 5.

Figure 2:
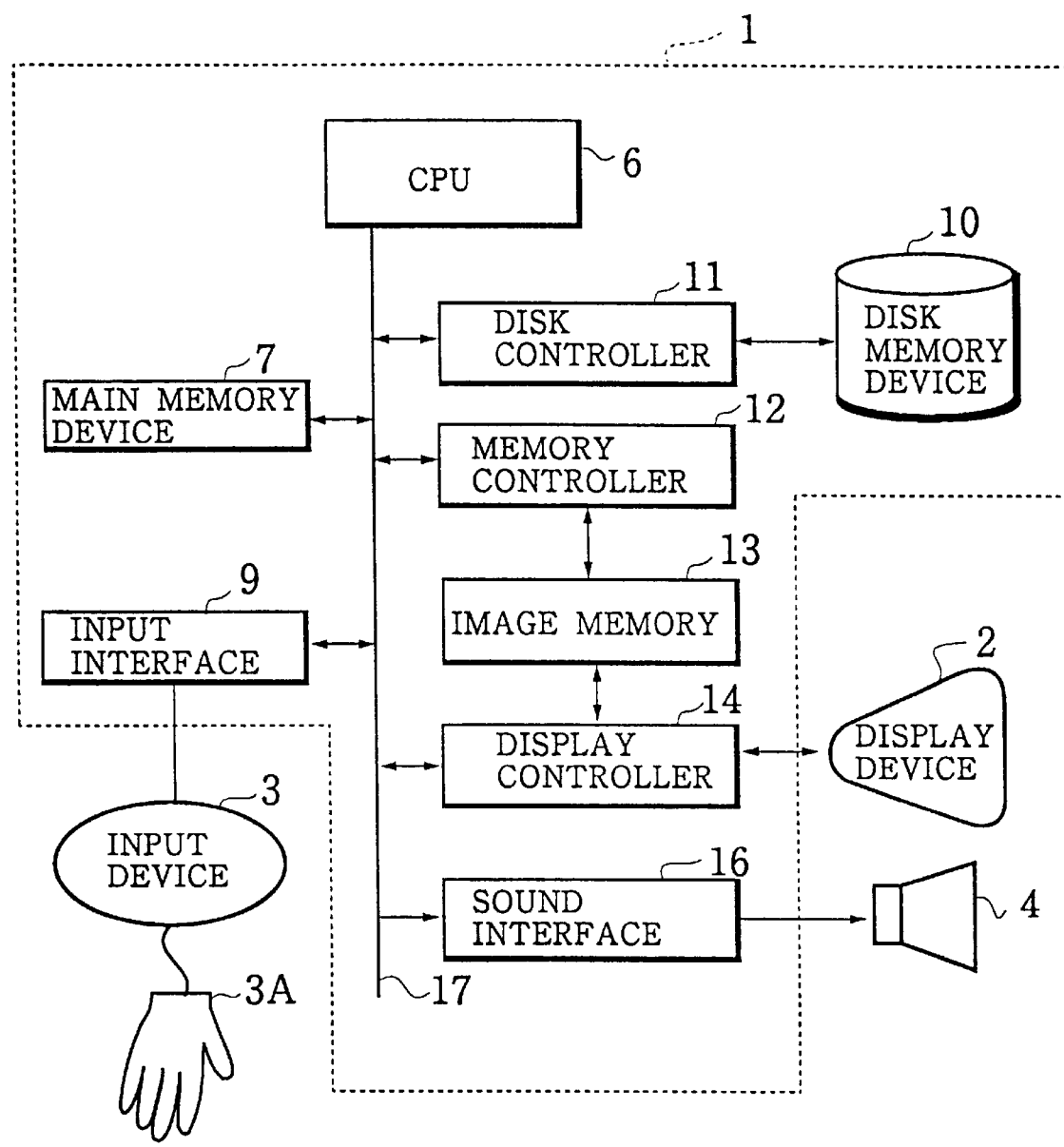
FIG. 2 is a block diagram of a computer device in the system of FIG. 1.

In further detail, as shown in FIG. 2, the computer device 1 further comprises: a CPU 6 for processing data, which is connected with the other elements through a bus line 17; an input interface 9 for interfacing the input device 3 and a bus line 17; a disk memory device 10 for storing various types of data to be outputted; a disk controller 11 connected between the disk memory device 10 and the bus line 17 for controlling the disk memory device 10; a main memory device 7 connected with the bus line 17 for storing programs for controlling this work station system, and temporarily storing the data read out from the disk memory device 10; an image memory 13 for temporarily storing the visual image data to be displayed by the display device 2; a memory controller connected between the image memory 13 and the bus line 17 for controlling the image memory 13; a display controller 14 connected with the display device 2, the image memory 13, and the bus line 17, for controlling the display device 2 to display the visual image data on the image memory 13; and a sound interface 14 for interfacing the sound making device 4 and the bus line 17.

In this first embodiment, the data glove 3A detects any one of several prescribed gestures of the operator's hand, such as a hand closing gesture and a hand opening gesture for example, and transmits the corresponding input data to the computer device 1 in response.

Figure 3:
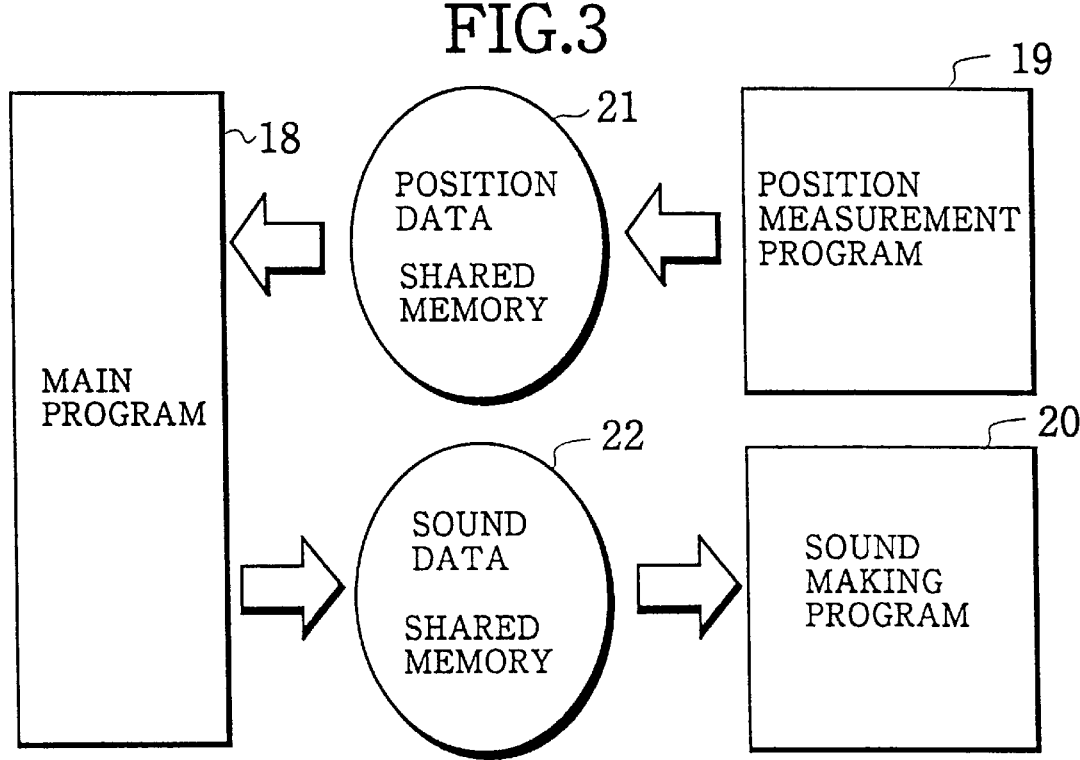
FIG. 3 is a diagram of programs used in the system of FIG. 1.

Also, a program for this first embodiment has a structure as shown in FIG. 3, which comprises; a main program 18, a position measurement program 19, and a sound making program 20, where the data obtained by the position measurement program 19 are transmitted to the main program 18 through a position data shared memory 21 provided in the main memory device 7, while the data to be outputted by the sound making program 20 are transmitted from the main program 18 through a sound data shared memory 22 provided in the main memory device 7.

Figure 4:
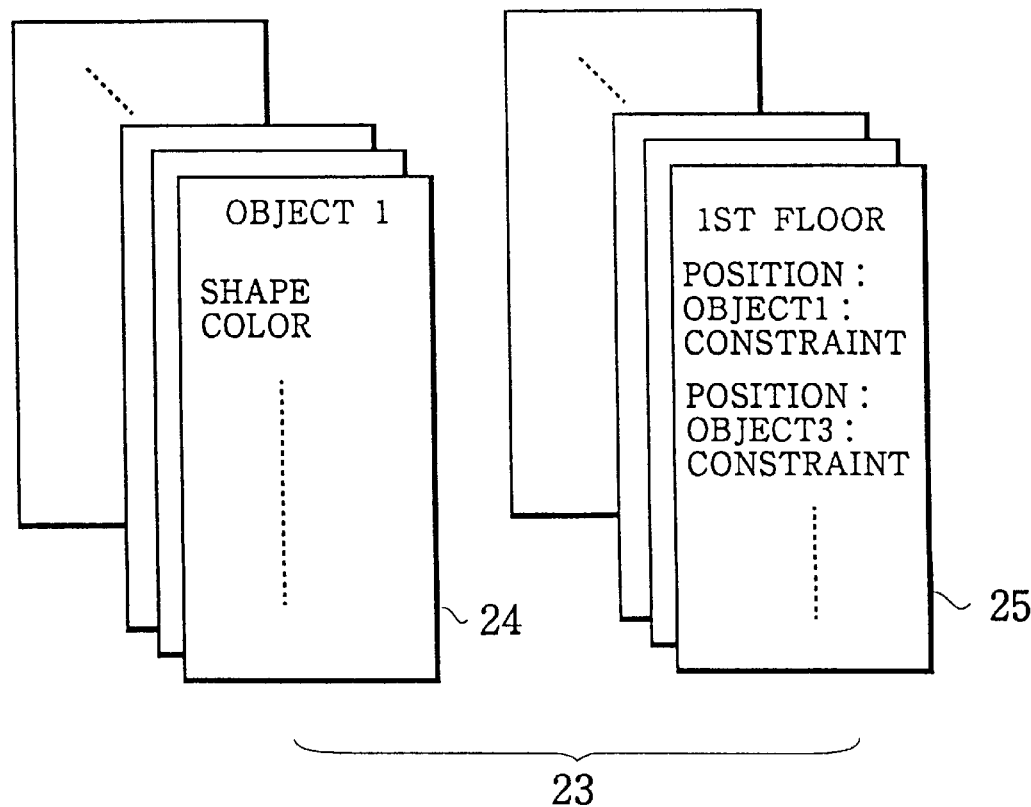
FIG. 4 is a diagrammatic illustration of a data structure of an object management memory used in the system of FIG. 1.

FIG. 4 shows a data structure in an object management memory 23 which will be used in constructing the virtual space to be displayed on the display device 2. This object management memory 23 comprises: an object data memory 24 containing various object data such as shape data and color data, for each object in correspondence to an object number assigned to this object; and an object arrangement memory 25 containing object arrangement data for each scene such as an operation panel A, an operation panel B, a room A, a room B, a first floor, a second floor, etc., where each object arrangement data entry is formed by a position data indicating a position for displaying the object, an object number identifying the object to be displayed; and constraints imposed on the object. Here, for example, the constraint for a telephone which is supposed to be on a table will be set to a height of the table, such that the telephone cannot appear to take any other height in the virtual space even when the telephone is moved in the virtual space, according to this constraint.

Figure 5:
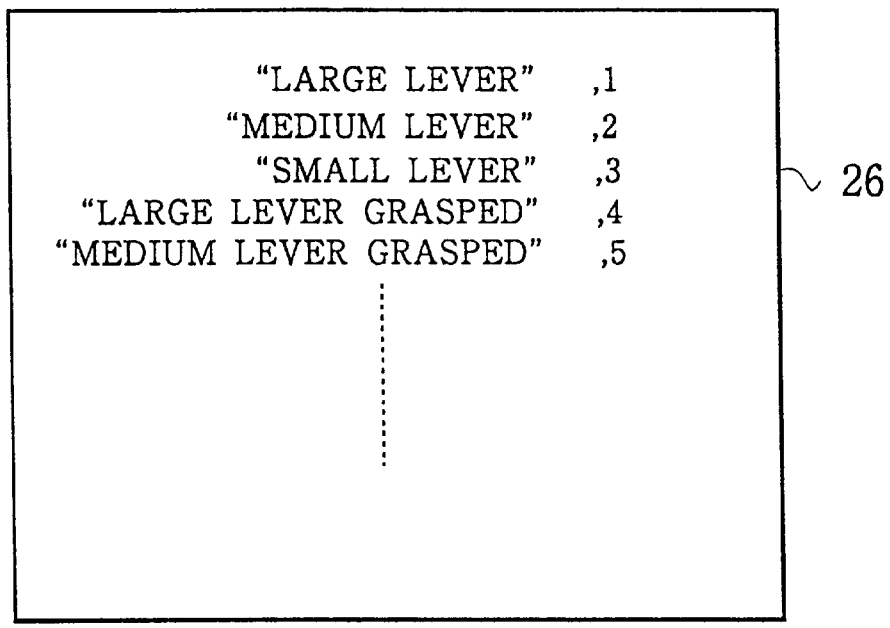
FIG. 5 is a diagrammatic illustration of a data structure of a sound correspondence memory used in the system of FIG. 1.

FIG. 5 shows a data structure in a sound correspondence memory 26, which is utilized in obtaining the sound output to be outputted by the sound making device 4. Each entry of this sound correspondence memory 26 is formed by a sound type data indicating a type of the sound to be outputted and a sound number data identifying a corresponding sound data. Here, the sound data identified by the sound number data are prepared by recording the appropriate sounds in advance and stored in a sound data file provided in the disk memory device 10.

Figure 6:
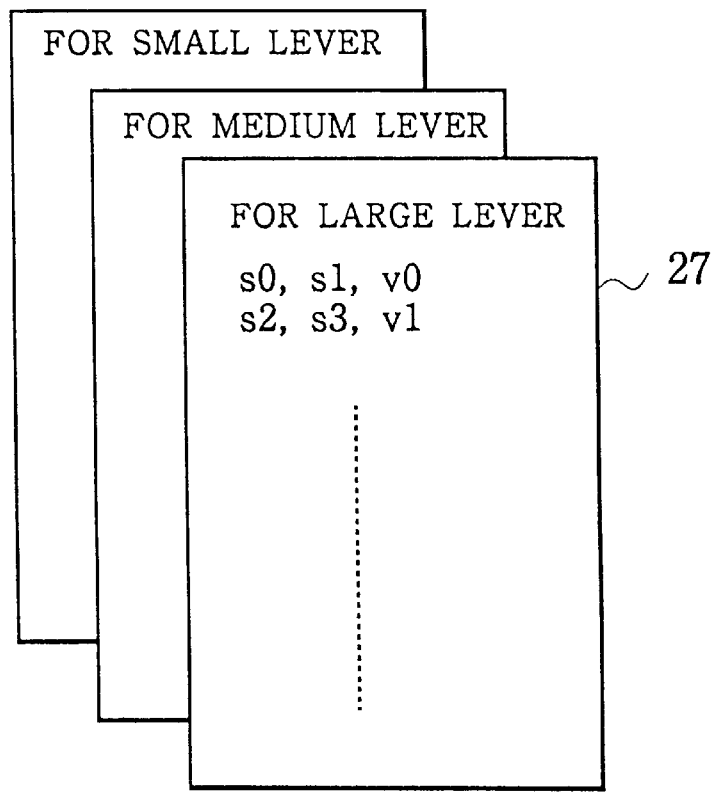
FIG. 6 is a diagrammatic illustration of a data structure of an image correspondence memory used in the system of FIG. 1.

FIG. 6 shows a data structure in an image correspondence memory 27, which is utilized in controlling movements of the objects in the virtual space displayed by the display device 2. This image correspondence memory 27 stores functional relationships for specifying correspondences among the state of the data glove 3A, a corresponding input image in the virtual space, and a corresponding movement of a target object. Here, the input image is an image displayed by the display device 2 in response to the movement detected by the data glove 3A, which is usually given in a form of a hand image. Each entry of the image correspondence memory 27 is formed by the object number identifying the target object, position measurement data (s0, s1, etc.) obtained by the data glove 3A, and a display position data (v0, v1, etc.) for the target object. The movement of the target object in the virtual space is controlled according to this image correspondence memory 27.

These object management memory 23, the sound correspondence memory 26, and the image correspondence memory 27 are stored in the disk memory device 10, and read out to the main memory device 7 whenever necessary.

The position measurement program 19 shown in FIG. 3 is initiated when the process using the data glove 3A is triggered, which can be done by using a command menu displayed by the display device 2, and carried out according to the flow chart of FIG. 7, as follows.

First, at the step 100, the three-dimensional position of the hand image is initialized at a current three-dimensional position of the data glove 3A in an internal memory of the CPU 6 as an origin for the hand image to be displayed.

Next, at the step 101, the gesture of the hand is initialized. Namely, an "angle" is regarded as 0° when the hand is opened, and as 90° when the hand is closed. This "angle" will be utilized in recognizing the prescribed gestures of the hand as mentioned above. In this first embodiment, the prescribed gestures to be detected includes a finger pointing gesture, a hand closing gesture, and a hand opening gesture, which correspond to an instruction for moving forward, an instruction for grasping, and an instruction for releasing or stopping, respectively.

Then, at the step 102, the gesture and the three dimensional position of the data glove 3A are measured, where the gesture is recognized as one of the three prescribed gestures described above, and the position is measured with respect to the origin registered at the step 100.

Next, at the step 103, measurement data indicating the recognized gesture and the measured position are stored in the position data shared memory 21, in which the finger pointing gesture is indicated by a number "1", the hand closing gesture is indicated by a number "2", and the hand opening gesture is indicated by a number "3", while all the other gestures are indicated by a number "0".

Then, by the step 103X, the above described steps 102 and 103 are repeated until the execution of the main program 18 is finished.

Figure 8:
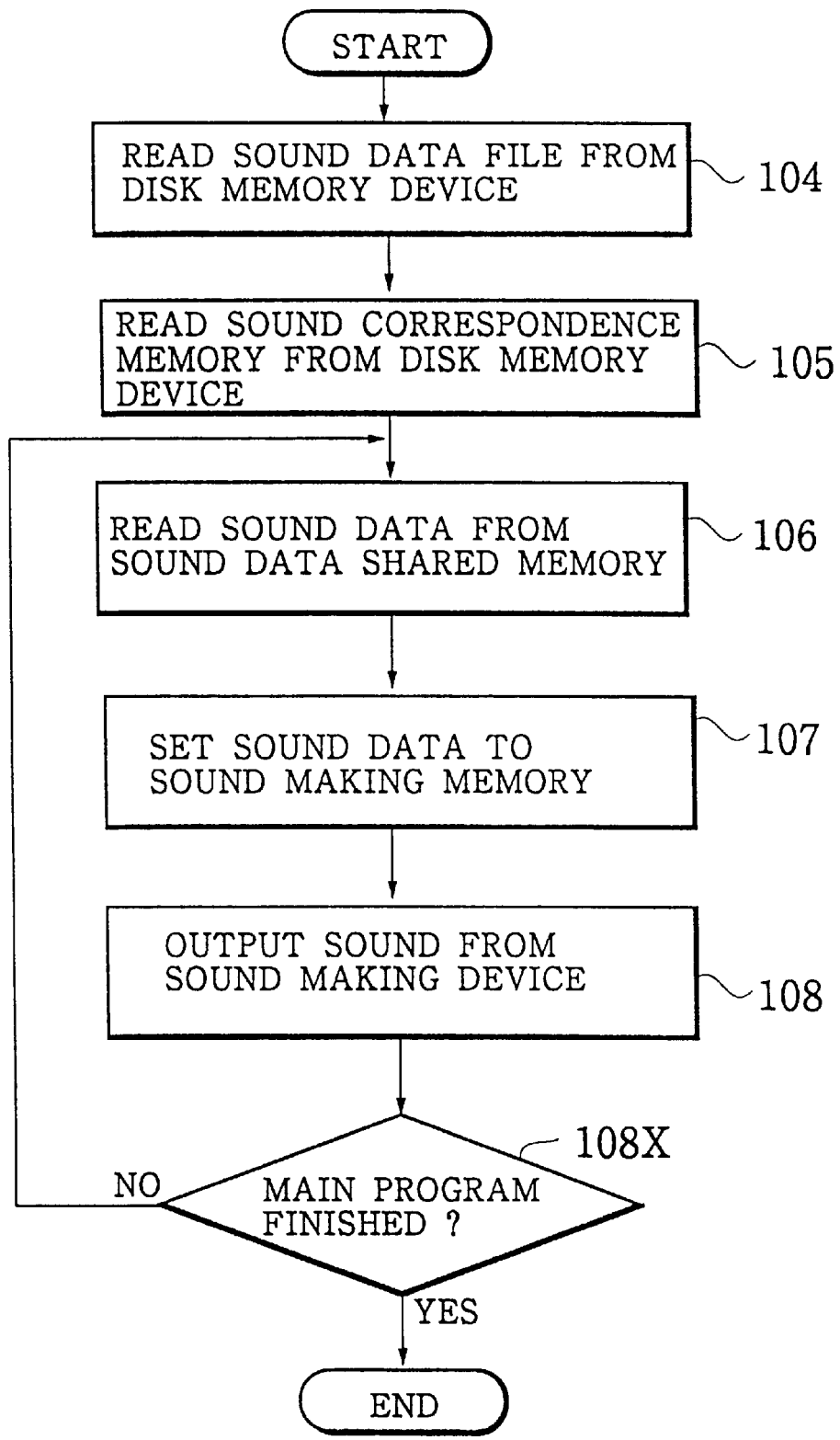
FIG. 8 is a flow chart for the operation according to a sound making program used in the system of FIG. 1.

The sound making program 20 shown in FIG. 3 is also initiated when the process using the data glove 3A is commanded, and carried out according to the flow chart of FIG. 8, as follows.

First, at the step 104, the sound data file is read out from the disk memory device 10 to the main memory device 7, and then at the step 105, the sound correspondence memory is read out from the disk memory device 10 to the main memory device 7.

Then, at the step 106, whether sound data are set in the sound data shared memory 22 or not is checked. Here, the sound data are to be set in the sound data shared memory 22 by the main program 18 according to the sound data memory in correspondence to the position of the hand image in the virtual space, and specify the sound number along with the sound volume and number of sound outputs.

The sound shared memory 22 has a value 0 when there is no sound data, in which case the sound shared memory 22 is checked again after a predetermined period of time. Whereas when the sound data are found to be set in the sound data shared memory 22, that sound data are read out and the sound data shared memory 22 is reset to 0.

Next, at the step 107, the sound data read out from the sound data shared memory 22 are set to the sound making memory, and the sound specified by that sound data is outputted from the sound making device 4 at the step 108.

Then, by the step 108X, the above described steps 106 to 108 are repeated until the execution of the main program 18 is finished.

Figure 9:
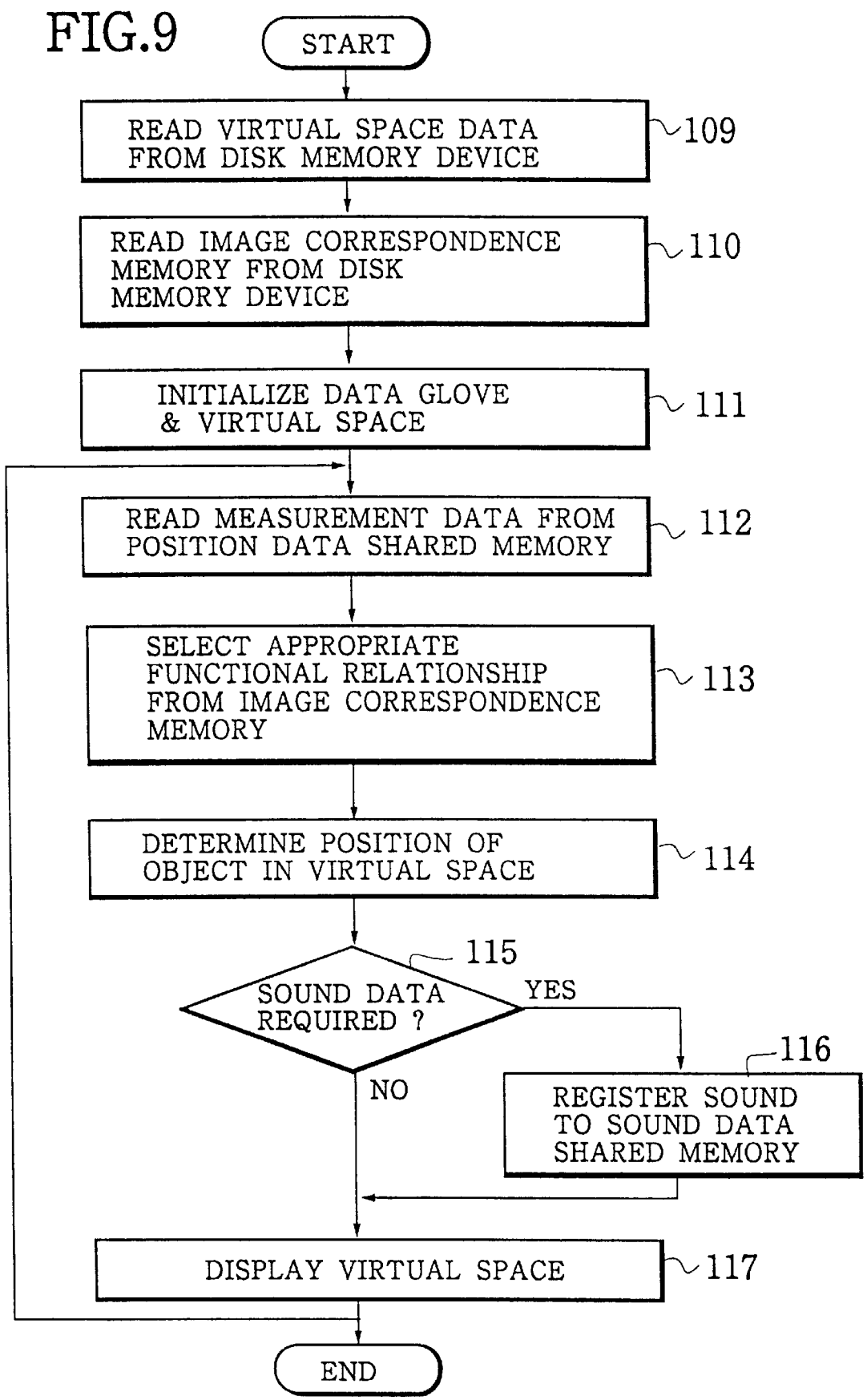
FIG. 9 is a flow chart for the operation according to a main program used in the system of FIG. 1.

The main program 18 shown in FIG. 3 is initiated when the process for the virtual space manipulation is triggered, and carried out according to the flow chart of FIG. 9, as follows.

First, virtual space data including the object data and the object arrangement data in the object management memory 23, are read out from the disk memory device 10 to the main memory device 7. Here, the virtual space data obviously contains the data for the hand image as well.

Then, at the step 110, the image correspondence memory 27 is read out from the disk memory device 27 to the main memory device 7.

Next, at the step 111, the data glove 3A and the virtual space are initialized. Namely, the virtual space is constructed with the hand image located at the origin registered in the internal memory, in correspondence to the current position of the data glove 3A.

Next, at the step 112, the measurement data including the position and the shape of the data glove 3A which are stored in the position data shared memory 21 by the position measurement program 19 are read out to the main memory device 7.

Then, at the step 113, the appropriate functional relationship corresponding to the current position of the data glove 3A is selected from the image correspondence memory 27.

Next, at the step 114, the position of the target object in the virtual space is determined according to the selected functional relationship, so as to determine a movement of the target object to be manipulated by the hand image controlled by the operator.

Next, at the step 115, whether the sound data are required or not is judged according to the sound data memory and the position of the hand image. Here, the sound data are required when the hand image is located at the position to make a contact with the target object. In addition, when the current position of the hand image is unchanged from a previous position, i.e., when the hand image continues to make a contact with the target object between a previous timing and a current timing, the sound data are ignored so that no sound is made.

In a case the sound data are judged to be required at the step 115, next at the step 116, the sound data are read out from the sound data memory to the sound data shared memory 22. The appropriate sound specified by the sound data is subsequently made by the sound making device 4, so as to enhance the sense of the reality for the event taking place in the virtual space. In a case the sound data are judged to be not required at the step 114, this step 116 is skipped.

Then, at the step 117, the image of the virtual space including the hand image and the target object is constructed and displayed by the display device 2 in conjunction with the sound output from the sound making device 4.

Figure 10:
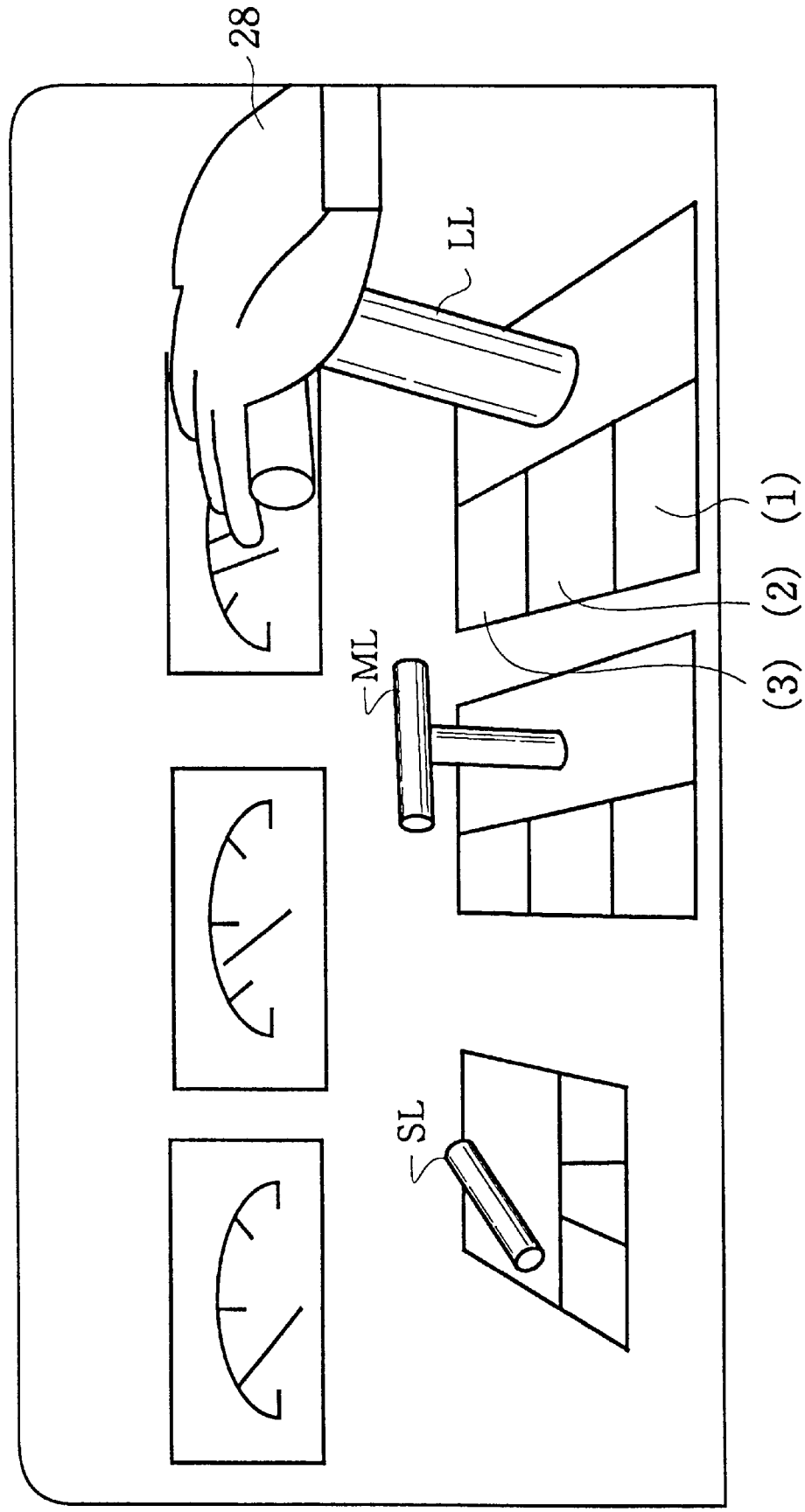
FIG. 10 is an illustration of an exemplary display of the 3D model used in the system of FIG. 1.

Now, the actual procedure for the virtual space manipulation in this first embodiment will be described for an exemplary case of manipulating three types (large, medium, small) of levers (LL, ML, SL) by the hand image 28 as shown in FIG. 10.

Namely, in FIG. 10, the large lever LL and the medium lever ML are levers to be shifted forward or backward by the hand image 28, while the small lever SL is a lever whose rear end is pivotally fixed and whose front end is to be shifted from right to left or from left to right by the hand image 28. Each of these levers has three shifting positions such as the positions (1), (2), and (3) indicated for the large lever LL.

Here, in an actual lever shifting action in a real space, a certain amount of force is needed to shift the lever from one shifting position to another, so that the lever would not move until the certain amount of force is exerted by the hand. Thus, if the lever in the virtual space moves as soon as the data glove 3A is moved, the naturalness of the virtual space can be diminished.

In this regard, in this first embodiment, in order to assimilate such an actual lever shifting action in a real space, the lever in the virtual space is controlled such that, when the lever is shifted to one shifting position, the lever cannot be moved out of that shifting position by the slight movement of the data glove 3A, and remains in its state at that shifting position.

This lever controlling in the virtual space is achieved by the data in the image correspondence memory 27 which specify the non-linear functional relationship in general for these levers.

Figure 11:
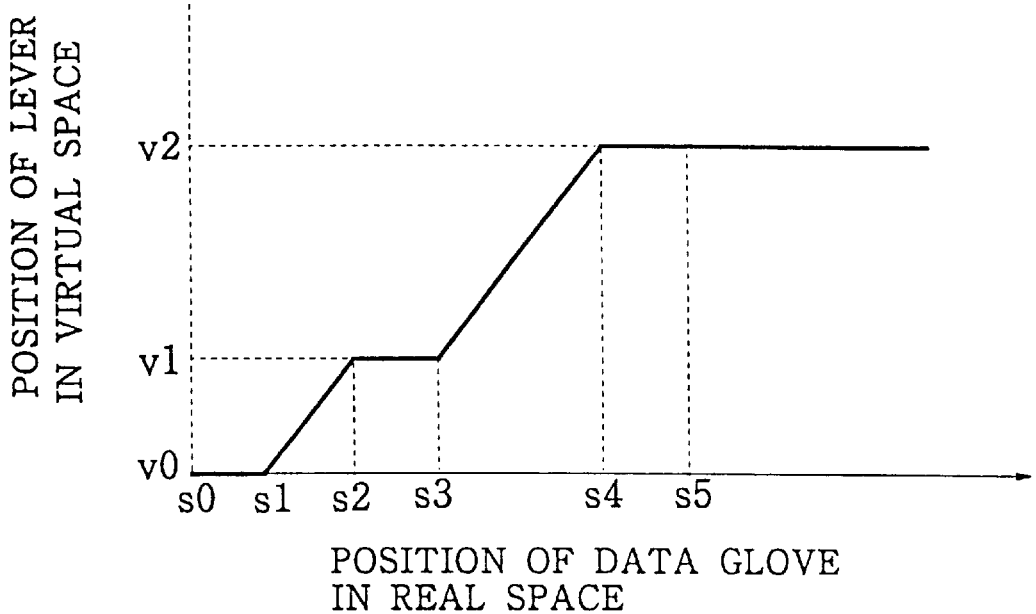
FIG. 11 is a graph of a non-linear relationship between positions of lever and data glove used in the system of FIG. 1.

More specifically, the data in the image correspondence memory 27 specify the non-linear functional relationship between the positions of the lever in the virtual space and the positions of the data glove 3A in the real space, as shown in FIG. 11 for the large lever LL, for example. Namely, in FIG. 11, the vertical axis represents the positions of the lever in the virtual space in the prescribed x-direction for the movement of the lever, while the horizontal axis represents the positions of the data glove 3A in the real space in the prescribed X-direction corresponding to the x-direction in the virtual space.

According to this functional relationship expressed by FIG. 11, the lever will not move and remain at a position v0 of the first shifting position (1) when the data glove 3A is moved within an interval [s0, s1] with respect to the original position s0. When the data glove 3A is moved within the interval [s1, s2] with respect to the original position s0, the lever moves within the interval [v0, v1] with respect to the original position v0 in direct proportion to the displacement of the data glove 3A, until the lever is shifted to the second shifting position (2) at the position v1. When the data glove is moved within the interval [s2, s3] with respect to the original position s0, the lever will not move and remain at a position v1 of the second shifting position (2). When the data glove 3A is moved within the interval [s3, s4] with respect to the original position s0, the lever moves within the interval [v1, v2] with respect to the original position v0 in direct proportion to the displacement of the data glove 3A, until the lever is shifted to the third shifting position (3) at the position v2. When the data glove is moved beyond the position s4 with respect to the original position so, the lever will not move and remain at a position v2 of the third shifting position (3).

The non-linear functional relationships similar to that shown in FIG. 11 are also specified for the medium lever ML and the small lever SL as well.

Figure 12:
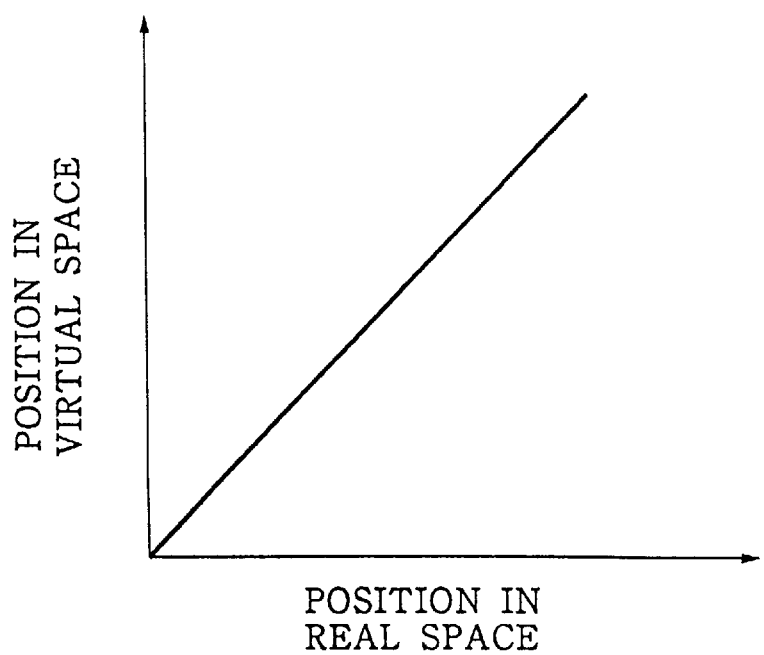
FIG. 12 is a graph of a linear relationship between positions in virtual and real spaces used in the system of FIG. 1.

Also, at the positions away from these levers, the hand image is freely movable in the virtual space, so that the functional relationship between the positions in the virtual space and the positions in the real space becomes linear as shown in FIG. 12. Thus, the hand image 28 in the virtual space moves in direct proportion to the displacement of the data glove 3A in the real space.

Thus, in this case, the operations in the work station system of FIGS. 1 and 2 proceeds as follows.

Figure 7:
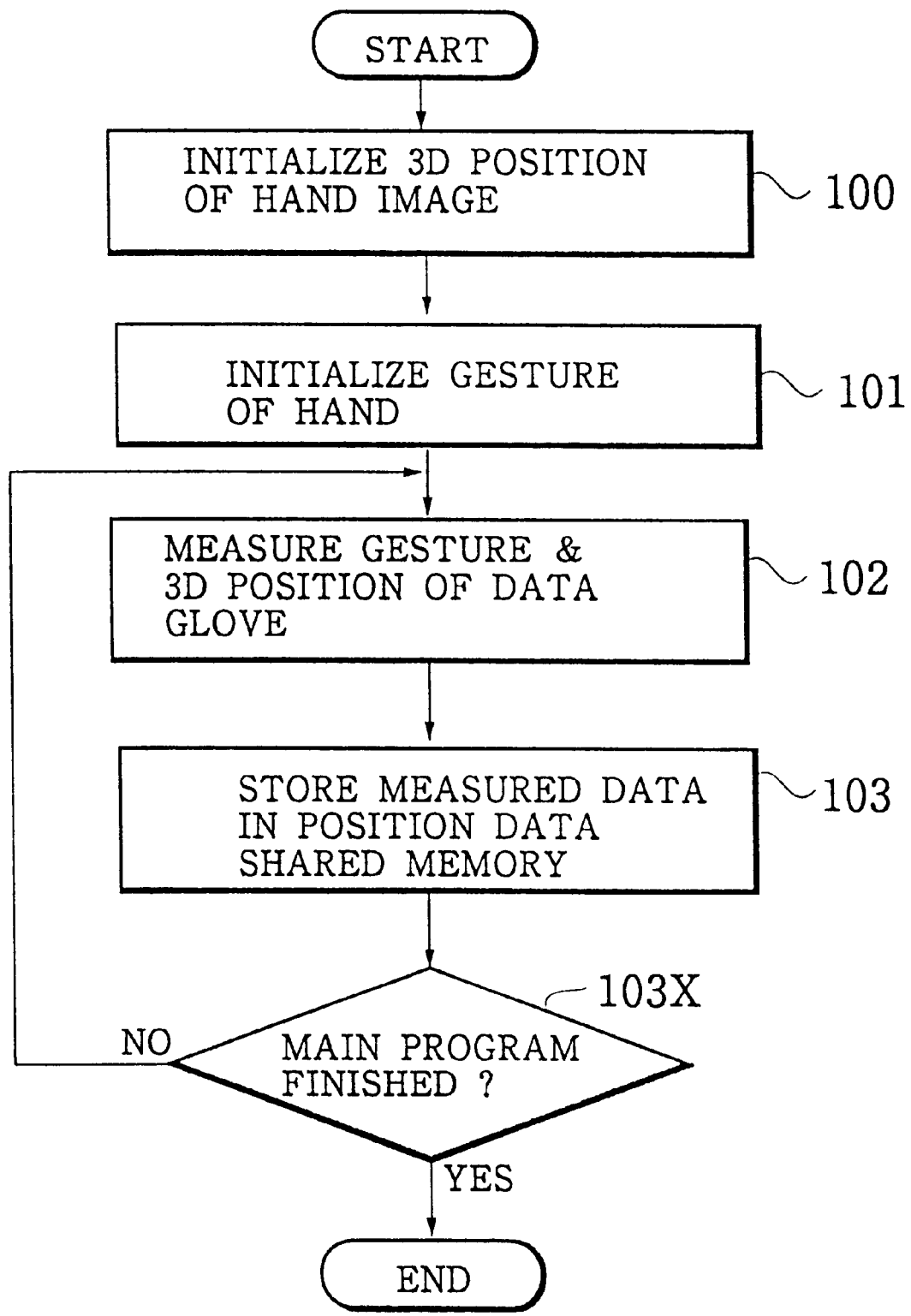
FIG. 7 is a flow chart for the operation according to a position measurement program used in the system of FIG. 1.

When the process using the data glove 3A is commanded by the operator by using a command menu displayed by the display device 2, the position measurement program 19 is executed according to the flow chart of FIG. 7 described above, such that the original position of the data glove 3A is stored in the position data shared memory 21.

The main program 18 reads the necessary data from the disk memory device 10, and the original position of the data glove 3A from the position data shared memory 21, and controls the display device 2 to display the virtual space as shown in FIG. 10. At this point, however, unlike the scene shown in FIG. 10, the hand image 28 appear at approximately central position on the displayed image, and no sound is made by the sound making device 4.

When the operator operates the data glove 3A such that the hand image 28 is moved to the position of the large lever LL and the hand is closed to indicate the command for grasping, the data glove 3A detects the shape of closing the hand according to the position measurement program 19, such that the measured data for the position and shape of the data glove 3A are stored in the position data shared memory 21.

When the main program 18 reads these measured data from the position data shared memory 21, the main program 18 sets the appropriate sound data to the sound data shared memory 22, and controls the display device 2 to display the virtual space exactly as shown in FIG. 10. At the same time, the sound making program 20 is executed according to the flow chart of FIG. 8 described above, such that the sound making device 4 is controlled to made the sound appropriate for the grasping of the lever by the hand according to the sound data, so as to assist the operator's comprehension of the action taking place in the virtual space.

Then, when the operator operates the data glove 3A to shift the large lever LL from the first shifting position (1) to the third shifting position (3), the image correspondence memory 27 for the large lever LL is selected by the main program 18 and the movement of the large lever LL is controlled according to the functional relationship shown in FIG. 11. Therefore, as already described above, the large lever LL moves in direct proportion to the displacement of the data glove 3A while the data glove 3A is moved within the intervals [s1, s2] and [s3, s4], where the direct proportion of the movement of the large lever LL with respect to the displacement of the data glove 3A can provide a sense of actually operating the large lever LL on the operator side, but the large lever LL does not move while the data glove 3A is moved within the interval [s2, s3].

In correspondence to this controlled movement of the large lever LL, the sound appropriate for sliding the large lever LL is outputted from the sound making device 4 while the large lever LL is moving, so as to make this action taking place in the virtual space more realistic, whereas no sound is made from the sound making device 4 while the large lever LL does not change its position, where this absence of the sound output can be recognized by the operator as an indication that the large lever LL is set in the shifting position.

When the large lever LL reaches to the position v2 of the third shifting position (3), the movement of the large lever LL in the virtual space is stopped, and the sound appropriate for the setting of the large lever LL into the shifting position is outputted from the sound making device 4, so as to enable the operator to recognize the timing at which the large lever LL is set into the third shifting position (3) such that the operator can stop moving the data glove 3A at that point.

Here, it is preferable to use the different sounds for different levers, in order to improve the sense of the naturalness.

Thus, according to this first embodiment, it becomes possible to improve the naturalness of the action in the displayed virtual space by using the non-linear functional relationships between the data glove 3A and the target object.

In addition, the sense of the naturalness of the action in the displayed virtual space can be further enhanced by using the appropriate sound outputs in conjunction with the change of the displayed virtual space, while also facilitating the accurate comprehension by the operator of the action taking place in the virtual space.

It is to be noted that the non-linear functional relationship between the data glove 3A and the target object can be set such that the displacement of the data glove 3A by 1 cm in the real space corresponds to the displacement of the target object by 1 cm in the virtual space in a case the virtual space is widely spaced, or the displacement of the data glove 3A by 1 m in the real space corresponds to the displacement of the target object by 1 cm in the virtual space in a case the very minute manipulation of the target object is required.

It is also to be noted that the input device 3 may be equipped with the input means other than the data glove, such as a data suit which measures the entire body movement of the operator.

It is further to be noted that the form of the data in the image correspondence memory 27 may be given in different formats, such as a transformation function to be applied to the position of the data glove to make a desired non-linear transformation, or a table enumerating the correspondences for various different circumstances.

It is also to be noted that this first embodiment can be applied to a case of making a correspondence between the change of the state of the data glove and the rotation in the virtual space, such as a case of opening and closing the door in the virtual space in response to the forward and backward motion of the data glove in which the rotation of the door can be controlled according to the linear displacement of the data glove.

Now, another aspect of this first embodiment concerning a manipulation of the virtual space to displace an object in the virtual space will be described.

Figure 13:
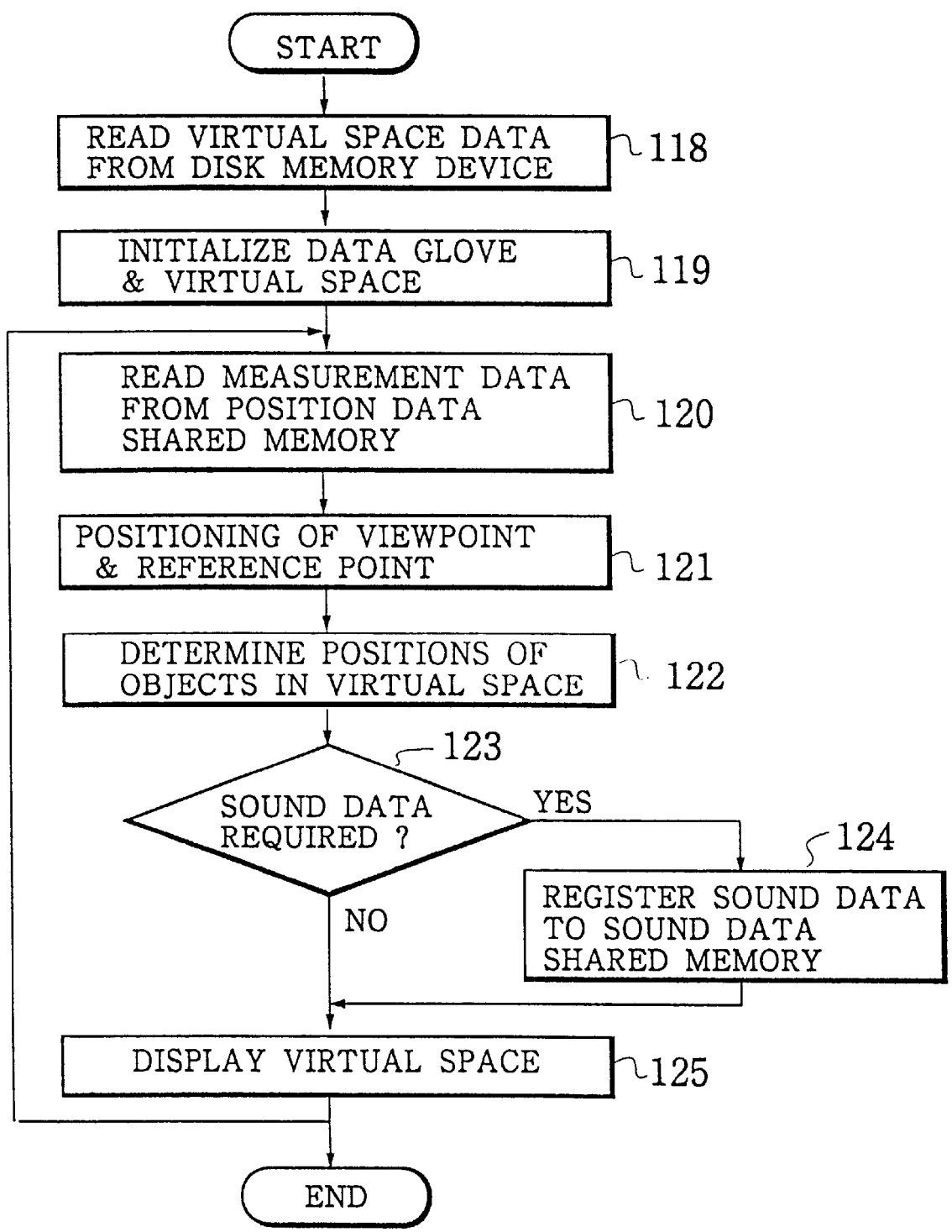
FIG. 13 is a flow chart for another aspect of the operation according to a main program used in the system of FIG. 1.

In this case, the main program 18 shown in FIG. 3 is carried out according to the flow chart of FIG. 13, as follows.

First, after the main program 18 is initiated as the process for the virtual space manipulation is triggered, the virtual space data including the object data and the object arrangement data in the object management memory 23 are read out from the disk memory device 10 to the main memory device 7 at the step 118.

Then, at the step 119, the data glove 3A and the virtual space are initialized. Namely, the virtual space is constructed with the hand image located at the origin registered in the internal memory, in correspondence to the current position of the data glove 3A.

Next, at the step 120, the measurement data including the position and the shape of the data glove 3A which are stored in the position data shared memory 21 by the position measurement program 19 are read out to the main memory device 7.

Then, at the step 121, the positioning of a viewpoint and a reference point is carried out. Namely, when the data glove 3A is put in the finger pointing gesture indicating the instruction for moving forward, the reference point is shifted to a direction pointed by the forefinger. Accordingly, the scene of the virtual space displayed by the displayed device 2 is also shifted. Here, when the direction pointed by the forefinger is within a range of ±20°, the viewpoint and the reference point are moved forward in the current viewing vector direction for a prescribed distance.

Next, at the step 122, the positions of the objects to be displayed in the virtual space are determined according to the positioned viewpoint and reference point.

Next, at the step 123, whether the sound data are required or not is judged according to the sound data memory and the position of the hand image.

In a case the sound data are judged to be required at the step 123, next at the step 124, the sound data are read out from the sound data memory to the sound data shared memory 22. The appropriate sound specified by the sound data is subsequently made by the sound making device 4, so as to enhance the sense of the reality for the event taking place in the virtual space. In a case the sound data are judged to be not required at the step 123, this step 124 is skipped.

Then, at the step 125, the image of the virtual space including the hand image and the target object is constructed and displayed by the display device 2 in conjunction with the sound output from the sound making device 4.

In this case, when the object in the view field is grasped and then released, the object is controlled according to the restriction data for this object set in the object arrangement memory 25 described above. Thus, for example, when the object is a clock hanging at one position on the wall which is to be displaced to another position on the wall, the clock is correctly located on the wall even when the operator released the clock at a position which is not on the wall, according to the constraint for this clock which specifies the coordinates of the wall as a constraint for the possible position of the clock. Consequently, it becomes possible to avoid the unnatural appearance of the virtual space in which the clock is floating in the air at the position at which the operator released the clock.

In addition, there is no need to carry out the interference checking, so that there is no need to wait for the lengthy calculations required by the interference checking to be finished, and the position of the object can be controlled in real time.

Figure 14:
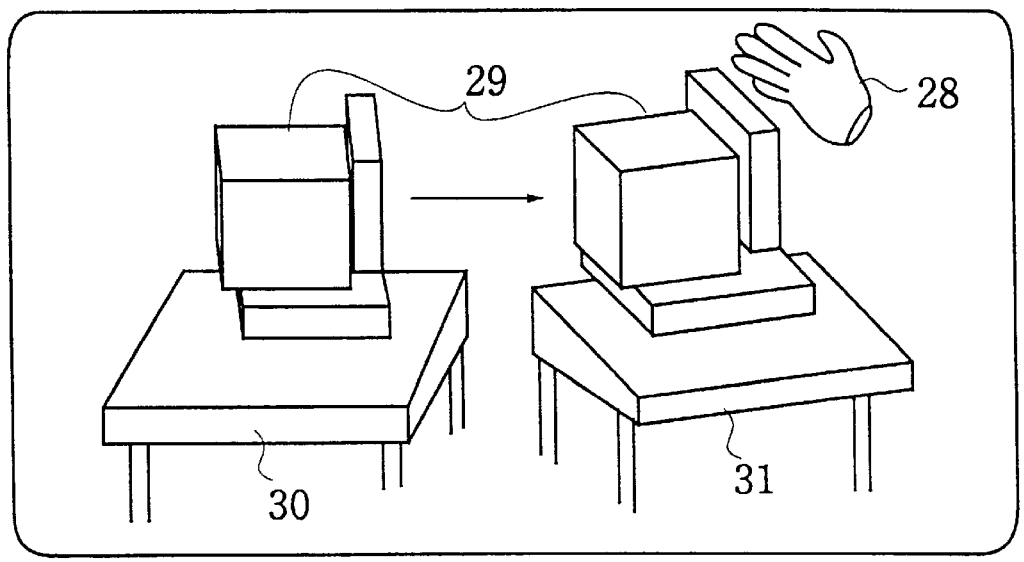
FIG. 14 is an illustration of an exemplary display of the 3D model used in the system of FIG. 1 according to the operation of the main program shown in FIG. 13.

Now, the actual procedure for the virtual space manipulation in this first embodiment for a case of displacing the object in the virtual space will be described for an exemplary case of displacing a personal computer 29 located on one table 30 from another table 31 by the hand image 28 as shown in FIG. 14.

Namely, in this case, the operations in the work station system of FIGS. 1 and 2 proceeds as follows.

When the process using the data glove 3A is triggered by the operator by using a command menu displayed by the display device 2, the position measurement program 19 is executed according to the flow chart of FIG. 7 described above, such that the original position of the data glove 3A is stored in the position data shared memory 21.

The main program 18 reads the necessary data from the disk memory device 10, and the original position of the data glove 3A from the position data shared memory 21, and controls the display device 2 to display the virtual space as shown in FIG. 14. At this point, however, unlike the scene shown in FIG. 14, the hand image 28 appear at approximately central position on the displayed image, and no sound is outputted by the sound making device 4.

When the operator operates the data glove 3A such that the hand image 28 is moved to the position of the personal computer 29 on the table 30 and the hand is closed to indicate the command for grasping, the data glove 3A detects the shape of closing the hand according to the position measurement program 19, such that the measured data for the position and shape of the data glove 3A are stored in the position data shared memory 21.

When the main program 18 reads these measured data from the position data shared memory 21, the main program 18 sets the appropriate sound data to the sound data shared memory 22, and controls the display device 2 to display the virtual space exactly as shown in FIG. 14. At the same time, the sound making program 20 is executed according to the flow chart of FIG. 8 described above, such that the sound making device 4 is controlled to output the sound appropriate for the grasping of the personal computer 29 by the hand according to the sound data, so as to assist the operator's comprehension of the action taking place in the virtual space.

Then, the operator operates the data glove 3A to displace the personal computer 29 from the table 30 to the table 31 by moving the hand image 28 from a position over the table 30 to the position over the table 31, and then the data glove 3A is put in the shape of opening the hand to indicate the command for releasing at a position over the table 31. At this point, according to the restriction data for the personal computer 29 which specifies the height of the tables 30 and 31 as a restriction for the possible position of the personal computer 29, the personal computer 29 is correctly located on the table 31 even when the operator released the personal computer 29 at a position which is not at a height of the table 31. Consequently, it becomes possible to avoid the unnatural appearance of the virtual space in which the personal computer 29 is floating in the air at the position at which the operator released the clock, or the personal computer 29 overlaps with the table 31, without carrying out the time consuming interference checking.

Thus, according to this aspect of the first embodiment, it becomes possible to eliminate the unnatural appearance of the virtual space due to the inaccurate control of the data glove by the operator, by determining the appropriate position of the object in the virtual space within the limit of the restriction data, so that the virtual space with the natural appearance can be realized in real time.

It is to be noted that the input device 3 may be equipped with the input means other than the data glove, such as a keyboard or a mouse for specifying the displacement.

It is also to be noted that it is not absolutely necessary to provide the restriction data in the object arrangement memory 25 as described above, and the restriction data can be provided in anywhere as long as they can be provided in correspondence to the objects to be displayed.

It is further to be noted that it is not necessary for the constraints to specify the height as in the exemplary case described above, and the constraints can also specify any other parameter related to the determination of the display of the object in the virtual space.

Now, a second embodiment of a virtual reality data presentation system according to the present invention, which concerns with the feature to assist the operator's comprehension of the operator's location within the virtual space, will be described in detail.

In this second embodiment, the same work station system of FIGS. 1 and 2 used in the first embodiment described above will be utilized as follows.

Figure 15:
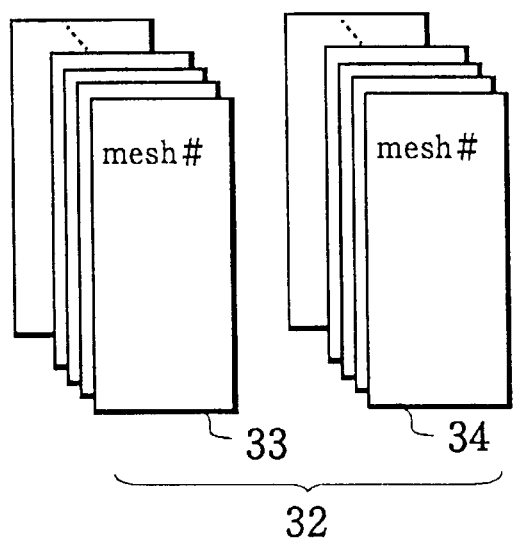
FIG. 15 is a diagrammatic illustration of a data structure of a virtual space construction memory used in a second embodiment of a virtual reality data presentation system according to the present invention.

Namely, in this second embodiment, the disk memory device 10 also contains a virtual space construction memory 32 as shown in FIG. 15, which is to be utilized in constructing the virtual space to be displayed by the display device 2. This virtual space construction memory 32 stores the data defining the virtual space in units of regions of a specific area which divides the entire virtual space, where each region is identified by a mesh number.

This manner of managing the data in units of regions is generally known as the mesh management scheme which is usually used in a case of managing a relatively wide ranging image space which is difficult to divide into sub-sections sensefully such as an image space for a city. In this mesh management scheme, the image space is divided in units of 100 m in each direction for example, and the locations of the buildings are managed within each unit. Hereinbelow, this example of the image of a city will be considered as an exemplary case.

Here, the virtual space construction memory 32 comprises a building data memory 33 for storing the data on each building such as its shape and its color, and a land use data memory 34 for storing locations of different types of land use such as roads and parks.

Figure 16:
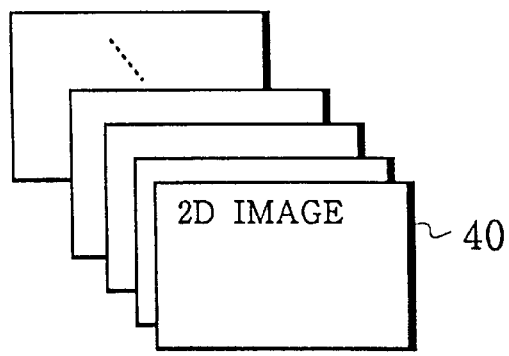
FIG. 16 is a diagrammatic illustration of a data structure of a 2D image data memory used in a second embodiment of a virtual reality data presentation system according to the present invention.

In addition, in this second embodiment, the disk memory device 10 further contains a two-dimensional (2D) image data memory 40 shown in FIG. 16 which stores the two-dimensional (2D) image data such as a map of a floor plan corresponding to the image space represented by the virtual space constructed according to the virtual space construction data memory 32, which is entered by using an external device such as an image scanner in advance and which is to be utilized as a location indication information.

Figure 17:
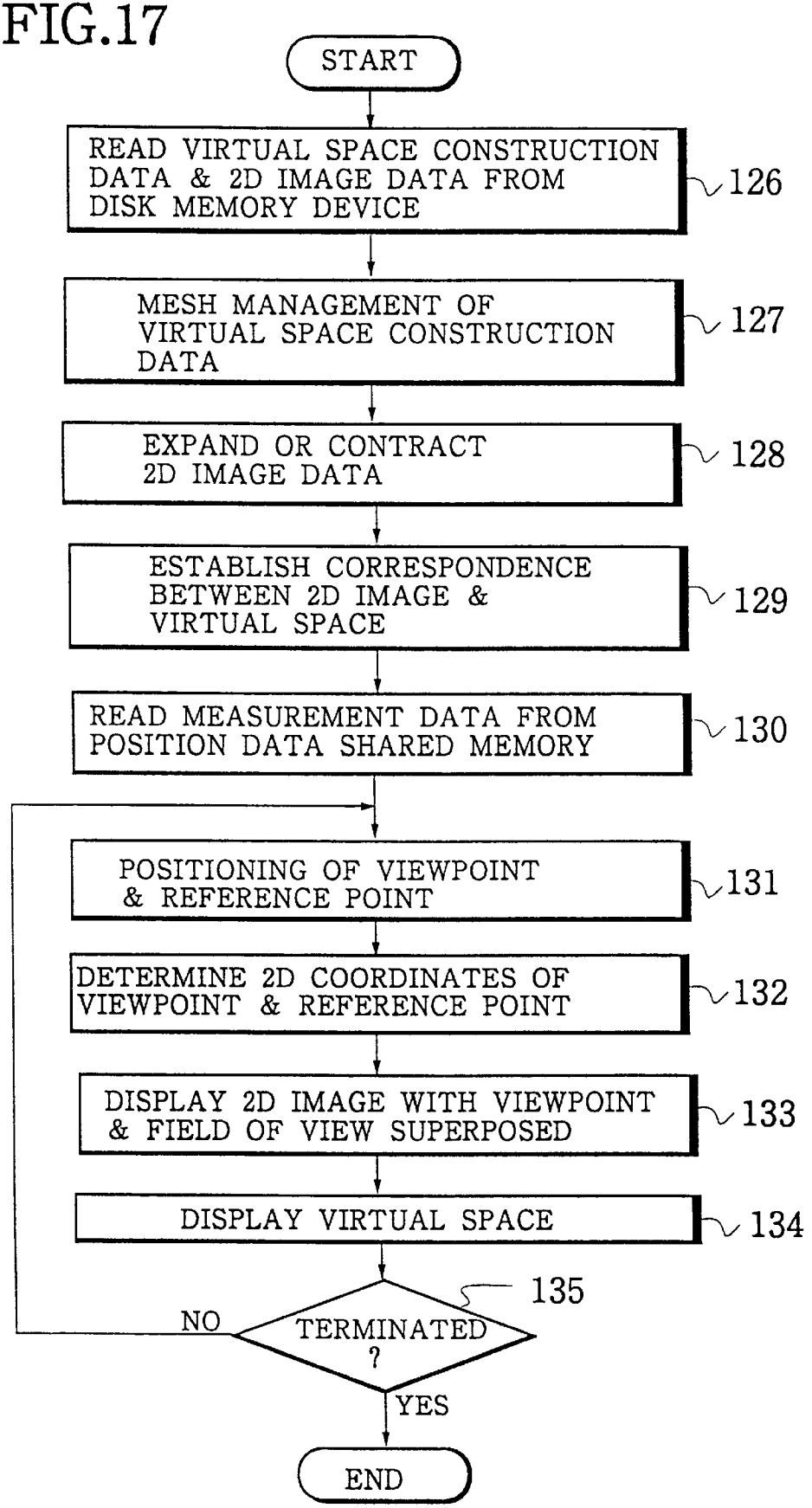
FIG. 17 is a flow chart for the operation according to a main program used in a second embodiment of a virtual reality data presentation system according to the present invention.

In this case, the main program 18 shown in FIG. 3 is carried out according to the flow chart of FIG. 17, as follows.

First, after the main program 18 is initiated as the display of the virtual space with the location indication information is triggered, the virtual space construction data in the virtual space construction memory 32 and the 2D image data in the 2D image memory 40 are read out from the disk memory device 10 to the main memory device 7 at the step 126.

Then, at the step 127, the virtual space construction data read out at the step 126 are managed in the mesh management scheme.

Next, at the step 128, the 2D image data read out at the step 126 is expanded or contracted according to a size of a display region available for the 2D image on the display device 2.

Then, at the step 129, the correspondence between the 2D image and the virtual space is established by determining the affine transformation coefficients for obtaining the 2D image from the virtual space.

Next, at the step 130, the measurement data including the position and the shape of the data glove 3A which are stored in the position data shared memory 21 by the position measurement program 19 are read out to the main memory device 7.

Then, at the step 131, the positioning of a viewpoint and a reference point is carried out. Namely, when the data glove 3A is put in the finger pointing gesture indicating the instruction for moving forward, the reference point is shifted to a direction pointed by the finger. Accordingly, the scene of the virtual space displayed by the displayed device 2 is also shifted. Here, when the direction pointed by the forefinger is within a range of ±200, the viewpoint and the reference point are moved forward in the current viewing vector direction for a prescribed distance.

Next, at the step 132, the 2D coordinates of the viewpoint and the reference point are determined according to the affine transformation coefficients determined at the step 129.

Then, at the step 133, the 2D image according to the 2D image data expanded or contracted at the step 128 is displayed with indications for the current position of the viewpoint by a dot and the current field of view by lines superposed thereon. Here, the field of view is defined to be covering 60° to left and right of the reference point from the viewpoint.

Then, at the step 134, the image of the virtual space is constructed and displayed by the display device 2.

These steps 131 to 134 are then repeated until this ode of display is terminated by the step 135.

Thus, the actual display of the virtual space and the 2D image in this second embodiment for a case of the image space of a city represented by the virtual space is achieved as follows.

In this case, the 2D image in a form of a map of the city is entered into the 2D image memory 40 by using an external device such as the image scanner.

Figure 18:
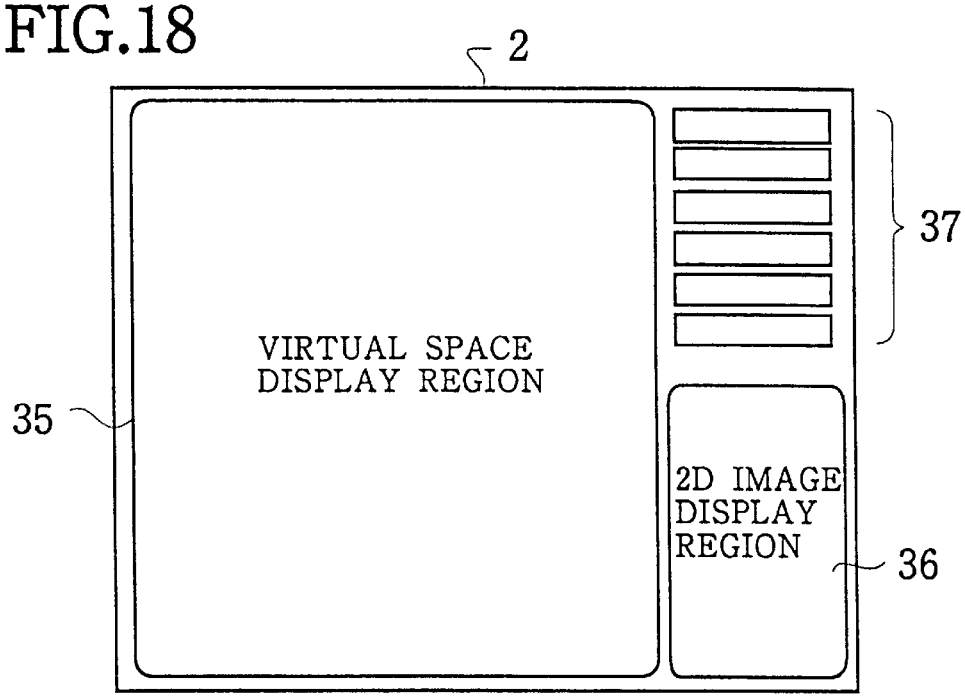
FIG. 18 is an illustration of an exemplary configuration of a display screen used in a second embodiment of a virtual reality data presentation system according to the present invention.

Then, the display device 2 has a display screen as shown in FIG. 18, which comprises a virtual space display region 35, a 2D image display region 36, and a menu region 37 in which each menu indicates each divided region of the image space of the city.

Thus, when one of the menu in the menu region 37 is selected, the virtual space construction data for the divided region corresponding to the selected menu and the corresponding 2D image data are read out from the disk memory device 10. Then, the display image of the virtual space around the location corresponding to the current position of the data glove 3A is constructed from the virtual space construction data and displayed on the virtual space display region 35, while the appropriately expanded or contracted 2D image with the indications for the viewpoint and the field of view superposed is displayed on the 2D image display region 36.

Figure 19:
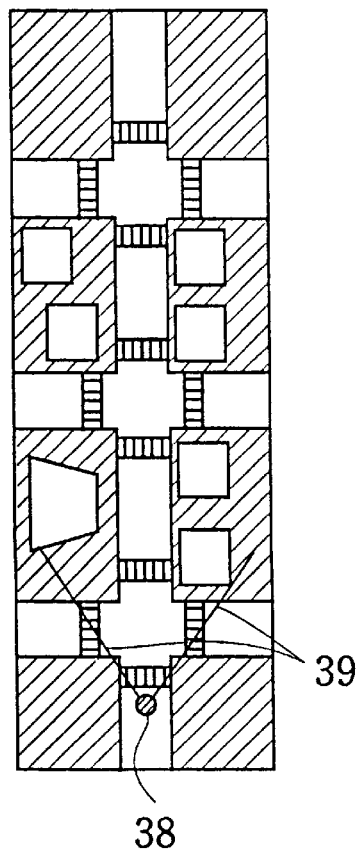
FIG. 19 is an illustration of one example of a 2D image to be displayed in a second embodiment of a virtual reality data presentation system according to the present invention.

Here, the 2D image to be displayed on the 2D image display region 36 appears as shown in FIG. 19 for example. In this 2D image of FIG. 19, the viewpoint is indicated by a dot 38, while the field of view is indicated by lines 39 such that the virtual space presently displayed on the virtual space display region 35 corresponds to a part of this divided region located within the field of view indicated by the lines 39.

With the aid of these viewpoint and field of view indicated on the 2D image displayed on the 2D image display region 36, the operator can easily recognize the current position within the entire virtual space. Here, the 2D image is a fairly detail map entered by using the image scanner, so that what is located where in this virtual space can be comprehended easily, and consequently, it becomes easier for the operator to move to a desired location within this virtual space.

It is to be noted that the 2D image to be displayed on the 2D image display region 36 may be provided in a number of different expansion or contraction rates from which the operator can select a desired one. In such a case, the affine transformation coefficients will be changed according to the selected expansion or contraction rate. For example, the contraction rate equal to 1 can be set to the display of the entire divided region. Then, the other contraction rates such as ½ and ¼ can be provided. In a case of using the contraction rates of ½ or ¼, the displayed virtual space and the 2D image may be scrolled along with the movement of the viewpoint. In a case the desired field of view straddles over a plurality of the 2D images, the new 2D image containing the desired field of view entirely may be constructed from the already existing 2D images.

It is also to be noted that the 2D image can be provided in any form indicative of the detailed view of the entire virtual space to be displayed, other than the map used in the exemplary case described above, such as an aerial photograph, a design plan, a sketch plan, and a floor plan.

Figure 20:
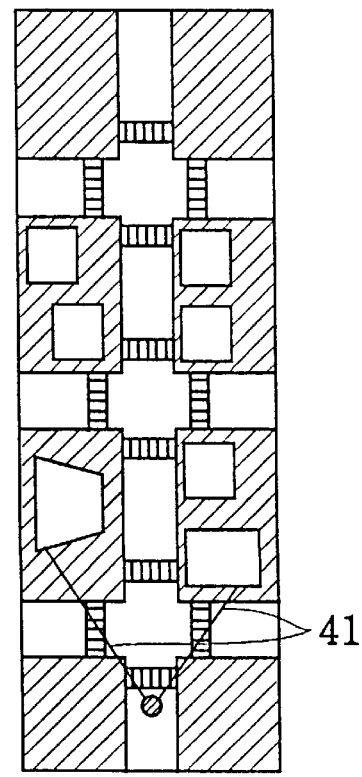
FIG. 20 is an illustration of another example of a 2D image to be displayed in a second embodiment of a virtual reality data presentation system according to the present invention.

It is also to be noted that the viewpoint and the field of view may be indicated in a format other than that described above, such as a format in which the field of view is indicated as colored, a format in which only the viewpoint is indicated, etc. Here, it can be more helpful for the operator to employ the lines of variable length for indicating the field of view, where the length of each line is determined according to how far the operator can actually see, as shown by the lines 41 in FIG. 20 in which the line for the right edge of the field of view is cut short as the operator's actual view is limited by the presence of a building.

It is also to be noted that the 2D image may be displayed on a separate display device, or the virtual space and the 2D image can be displayed interchangeably on the same display region.

Referring now to FIG. 21, a third embodiment of a virtual reality data presentation system according to the present invention will be described in detail.

In this third embodiment, the system comprises: a object shape data memory unit 51 for storing two-dimensional or three-dimensional object shape data defining shapes of objects to be displayed; a material property data memory unit 52 for storing material property data for specifying various material properties that can be attributed to the objects to be displayed, which are related to various human senses such as visual sense, auditory sense, tactile sense, olfactory sense, and gustatory sense; an input unit 53, equipped with various input devices such as a mouse, a scanner, and a microphone, for inputting visual data and sound data as well as commands for making links between the object shape data and the material property data; a display unit 55 for displaying visual image information of the objects to be displayed as well as a menu image for assisting command input by the operator; a speaker unit 56 for outputting sound information; a memory unit 57 for storing linkage data specifying links between the object shape data and the material property data; and a management unit 54 for managing the data transmissions among the elements of this system described above.

Here, the links between the object shape data and the material property data can be made by the operator easily, by specifying an appropriate material name for each object shape data from the input unit 53.

Also, the display unit 55 and the speaker unit 56 function as the visual and auditory material property data presentation means, respectively, and the system of FIG. 21 may be further equipped with the material property data presentation means other than the display unit 55 and the speaker unit 56, such as the data presentation means for the tactile material property data, olfactory material property data, gustatory material property data, or data of any combination of these.

In this third embodiment, the material property data are stored in the material property data memory unit 52 in a format of a data file as shown in FIG. 22, in which each data file has the various material property data such as auditory material property data and the tactile material property data attributed to each material name functioning as a data file name, along with a texture data corresponding to each material name.

Here, the texture data is visual data entered from the scanner of the input unit 53 by using real sample of each material in advance, which indicates actual textural appearance of each material. Here, each texture data is normalized to a unit square size.

Also, the auditory material property data for a case of colliding or hitting is specified by an attributed value of a "Collision" entry, the auditory material property data for a case of rubbing by fingers is specified by an attributed value of a "Finger_Rub" entry, and the auditory material property data for a case of scratching by nail is specified by an attributed value of a "Nail_Scratch" entry, as in the data file for iron.

In addition, the auditory material property data for a case of destroying is specified by an attributed value of a "Destruction" entry for a destructible object, as in the data file for china. When the auditory material property data is unchanged for any case, the auditory material property data can be specified by the material name itself, as in the data file for velvet. In such a case, the pointer to the material name may be used instead of using the material name directly.

The sound data specified by the attributed value of each of these auditory material property data entries are entered from the microphone of the input unit 53 by using real sample of each material in advance, and A/D converted into digital forms by which they are stored.

The tactile material property data indicates the typical tactile sense such as slippery, smooth, velvety, rustling, etc. In a case the tactile material property data is independent of the direction of touching, the tactile material property data can be specified directly, as in the data files for iron and china. On the other hand, in a case the tactile material property data depends on the direction of touching, the tactile material property data is specified for each direction separately, such as a positive X-direction indicated by "+X" entry, a negative X-direction indicated by "-X" entry, a positive Y-direction indicated by "+Y" entry, and a negative Y-direction indicated by "-Y" entry, as in the data file for velvet. A form for storing the tactile material property data depends on the tactile material property data presentation means employed.

On the other hand, when the links between the object shape data and the material property data is made for each object to be displayed, the names of the linked object shape data and material property data are registered for each object name as the linkage data in the memory unit 57 in a format of a data file as shown in FIG. 23, in which each object name functions as a data file name. In a case there is no linked material property data, "nil" is registered to the material property data entry, as in the case of the data file for pot-1.

Figure 24:
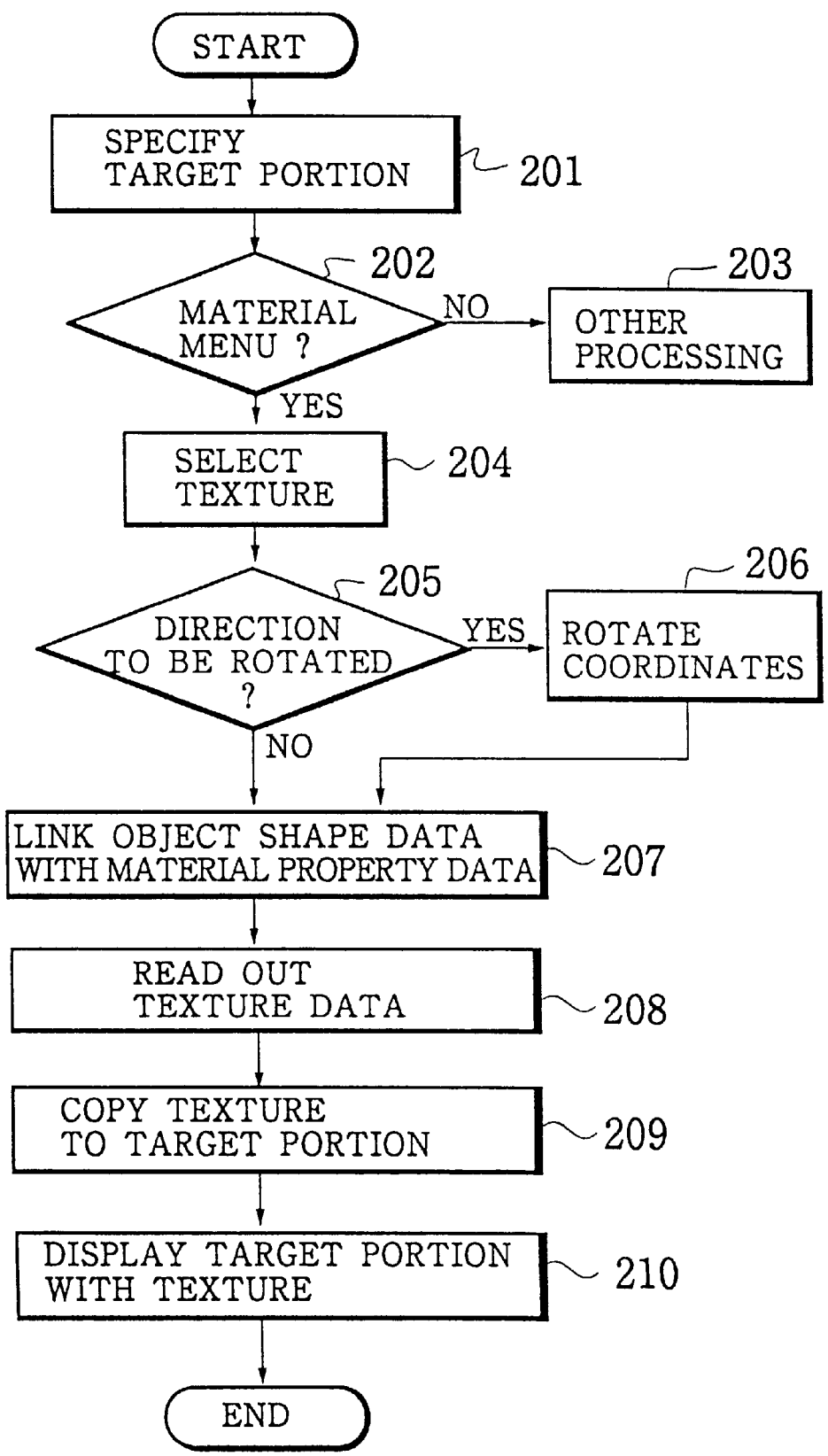
FIG. 24 is a flow chart for the operation of making a link between the object shape data and the material property data in the system of FIG. 21.

More specifically, the actual procedure for making the link between the object shape data and the material property data by the operator using the input unit 53 the display unit 55 is carried out according to the flow chart of FIG. 24, as follows.

Figure 25A:
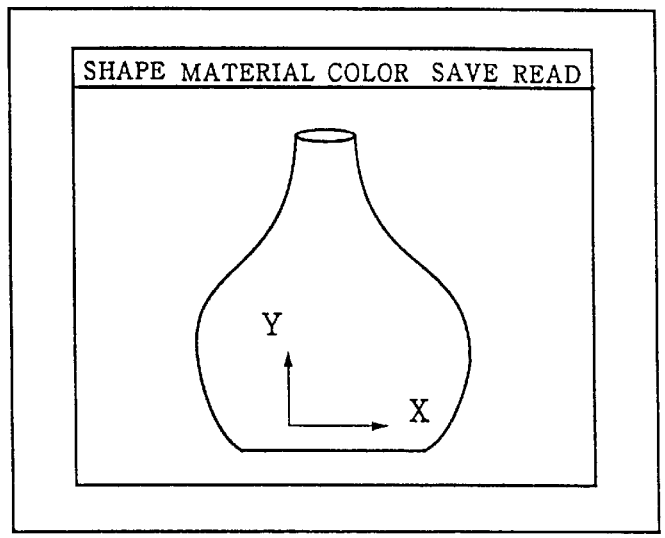
FIGS. 25A, 25B, and 25C are illustrations of exemplary display used in the system of FIG. 21 in various stages of the flow chart shown in FIG. 24.

First, at the step 201, a target portion to be linked with the material property is specified by the operator through the input unit 53. Namely, at this point, the image of the object without the linked material property is displayed by the display unit 55 as shown in FIG. 25A, according to the object shape data of this object read out from the object shape data memory unit 51, where the object is a pot in this example. Here, FIG. 25A shows a case in which the operator selected the entire pot as the target portion, so that the entire pot is displayed. The target portion can be specified as only a part of the object, if desired. Also, when the target portion is selected, the display unit 55 also displays arrows X and Y for indicating the reference directions, as shown in FIG. 25A.

Next, at the step 202, whether the operator selects the material menu next or not is determined. In a case the material menu is selected, the process proceeds to the step 204, whereas otherwise it is judged that the operator is wishing to carry out the processing other than this link making, so that the process proceeds to the step 203 at which whatever the other processing indicated by the operator is carried out.

Figure 25B:
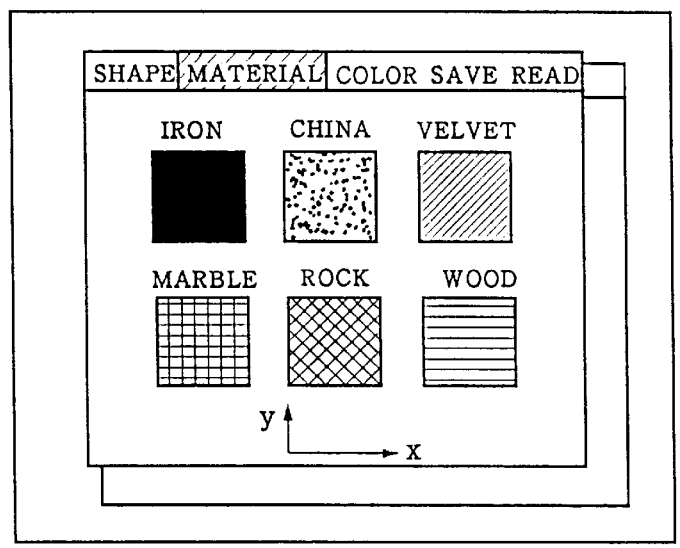

When the operator selected the material menu at the step 202 by using the menu bar provided above the image of the pot, the texture samples for the available materials such as iron, china, velvet, etc., are displayed in unit square shapes by the display unit 55 as shown in FIG. 25B, according to the texture data.

Then, at the step 204, the operator selects the desired texture to be allocated to the specified target portion from the displayed texture samples.

Here, when the operator wishes to have the patterns in the desired texture to appear in the direction different from that in which the texture sample of the desired texture is shown, the operator can specify the rotation of the desired texture.

Thus, at the step 205, whether the operator specified the rotation of the direction or not is determined. In a case the rotation of the direction is specified by the operator, next at the step 206, the texture coordinates x-y shown in FIG. 25B are rotated such that the texture samples are oriented in different direction. Otherwise the process proceeds to the step 207.

Next, at the step 207. the object shape data for the pot is linked with the material property data for the selected desired texture, and the linkage data indicating this link is registered in the memory unit 57.

Figure 25C:
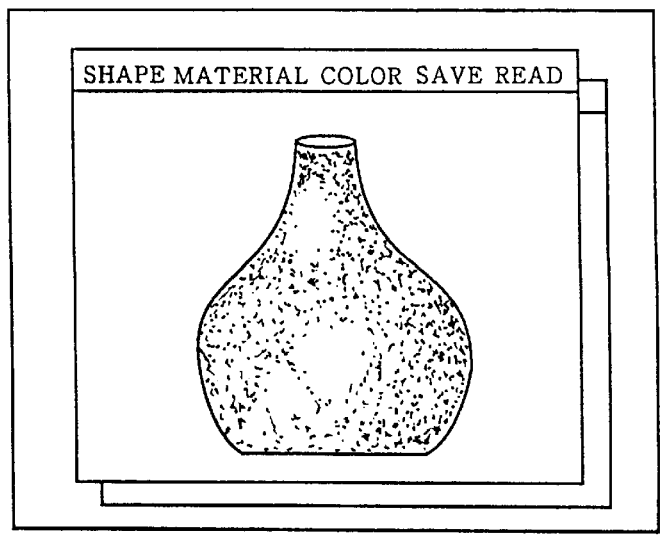

Then, at the step 208, the texture data for the selected desired texture are read out, and at the step 209 this texture data is allocated to the target portion shown by the display unit 55 by copying the texture data in unit square shape to each unit square portion in the target portion, such that the display unit 55 displays the target portion of the object with the texture at the step 210, as shown in FIG. 25C which indicates a case in which the desired texture is that of the china.

Now, using the linkage data obtained in the above procedure and an input device provided in the input device 53 such as a magnetic sensor to be operated by the operator, the operator can manipulate the object displayed y the display unit 55 according to the flow chart of FIG. 6, as follows.

First, at the step 211, the input from the input device is waited for a prescribed period of time, and at the step 212, whether the display by the display unit 55 is to be finished or not is determined. When the display is to be finished, the process terminates, whereas otherwise the process proceeds to the step 213.

At the step 213, whether the input is a collision instruction or not is determined. In a case the input is the collision instruction, the process proceeds to the step 222 described below. Otherwise, next at the step 214, whether the input is a hitting instruction or not is determined. In a case the input is the hitting instruction, the process proceeds to the step 222 described below. Otherwise, next at the step 215, whether the input is a finger rubbing instruction or not is determined. In a case the input is the finger rubbing instruction, the process proceeds to the step 220 described below. Otherwise, next at the step 216, whether the input is a nail scratching instruction or not is determined. In a case the input is the nail scratching instruction, the process proceeds to the step 218 described below. Otherwise, next at the step 217, the attributed value of the auditory material property data given by the material name itself is read out from the material property data memory unit 52 and the process proceeds to the step 227 described below.

When the input is the nail scratching instruction at the step 216, next at the step 218, whether the "Nail_Scratch" entry is present in the material property data for the material of the display object or not is determined. In a case this entry is absent, the process proceeds to the step 217 described above. Otherwise next at the step 219, the attributed value of the "Nail_Scratch" entry is read out and the process proceeds to the step 227 described below.

When the input is the finger rubbing instruction at the step 215, next at the step 220, whether the "Finger Rub" entry is present in the material property data for the material of the display object or not is determined. In a case this entry is absent, the process proceeds to the step 217 described above. Otherwise next at the step 221, the attributed value of the "Finger_Rub" entry is read out and the process proceeds to the step 227 described below.

When the input is either the collision instruction or the hitting instruction at the step 213 or 214, next at the step 222, whether the external force to be exerted is greater than a predetermined threshold or not is determined. In a case the external force is not greater than the threshold, the process proceeds to the step 225 described below. Otherwise, next at the step 223, whether the "Destruction" entry is present in the material property data for the material of the display object or not is determined. In a case this entry is absent, the process proceeds to the step 225 described below. Otherwise next at the step 224, the attributed value of the "Destruction" entry is read out and the process proceeds to the step 227 described below.

At the step 225, whether the "Collision" entry is present in the material property data for the display object or not is determined. In a case this entry is absent, the process proceeds to the step 227 described below. Otherwise next at the step 226, the attributed value of the "Collision" entry is read out and the process proceeds to the step 227 described below.

At the step 227, the sound is outputted from the speaker unit 56 according to the sound data specified by the attributed value read out at any one of the steps 217, 219, 221, 224, and 226, and the process returns to the step 211 described above.

Figure 26B:
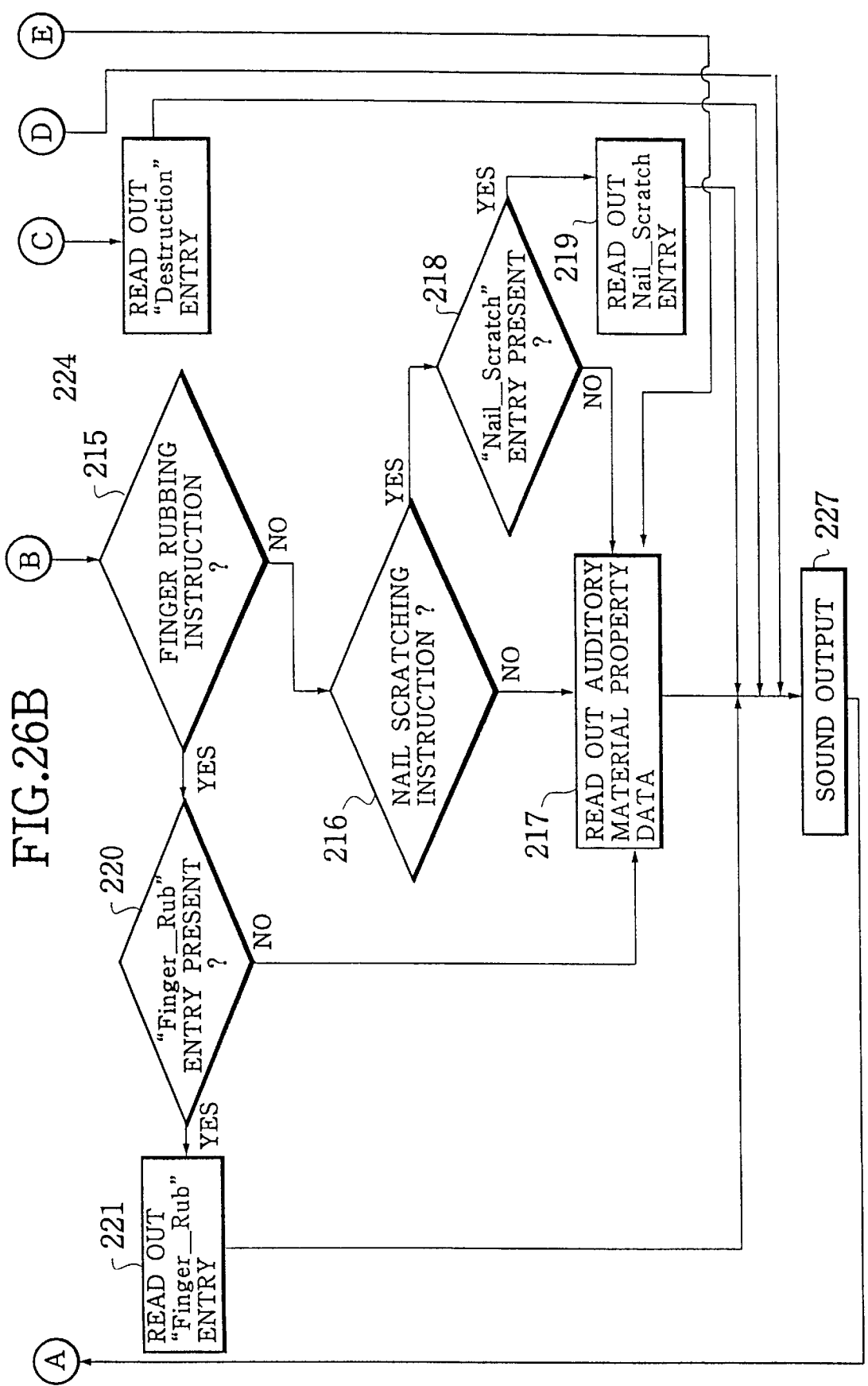

According to this procedure of FIG. 26, when the operator issues the hitting instruction for the displayed pot with the texture of the iron for example, the attributed value "iron_sound 1" is read out from the "Collision" entry of the auditory material property data in the data file for iron, and the sound specified by this sound data "iron_sound 1" which is the sound of hitting the iron is outputted from the speaker unit 56, as if the operator has actually hit the iron pot in the real space.

Similarly, when the operator issues the nail scratching instruction for the displayed pot with the texture of the iron with nails, the attributed value "iron_sound 3" is read out from the "Nail_Scratch" entry of the auditory material property data in the data file for iron, and the sound specified by this sound data "iron_sound 3" which is the sound of scratching the iron is outputted from the speaker unit 56, as if the operator has actually scratched the iron pot by nails in the real space.

Similarly, when the operator issues the collision instruction for a displayed ball with the texture of china and a displayed pot with the texture of the iron by the external force greater than the threshold, the attributed value "iron_sound 1" is read out from the "Collision" entry of the auditory material property data in the data file for iron, while the attributed value "china_sound 4" is read out from the "Destruction" entry of the auditory material property data in the data file for china, and the sounds specified by these sound data "iron_sound 1" and "china_sound 4" are outputted from the speaker unit 56 simultaneously, as if the actual collision of the china ball and the iron pot has occurred in the real space.

In addition, in a case the tactile material property data presentation device is provided in the system of FIG. 21, the operator can feel the sense of touching the displayed object as if the operator has actually touched the object in the real space.

Figure 27:
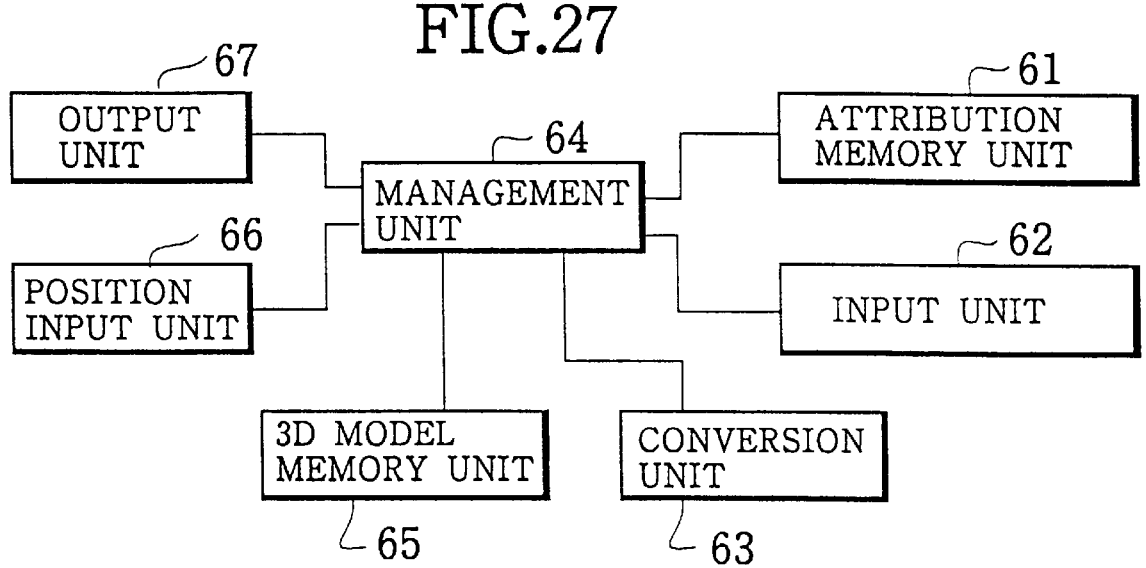
FIG. 27 is a schematic block diagram of a fourth embodiment of a virtual reality data presentation system according to the present invention.

Referring now to FIG. 27, a fourth embodiment of a virtual reality data presentation system according to the present invention will be described in detail.

In this fourth embodiment, the system comprises: a 3D model memory unit 66 for storing virtual reality 3D (three-dimensional) model to be presented; an attribution memory unit 61 for storing attribution data for different types of potential users of the 3D model; an input unit 62 in a form of a keyboard or a mouse for allowing an operator to enter his own attribution value and specify a desired one of the attribution data for a particular type of potential user; a position input unit 66 in a form of a magnetic sensor for measuring 3D position of a viewpoint of the operator; a conversion unit 63 for converting the position of the viewpoint of the operator measured by the position input unit 66 into an appropriate position of the viewpoint of the particular potential user, according to a conversion rate determined from the operator's own attribution value and the desired one of the attribution data specified by the operator at the input unit 62; a management unit 64 for controlling the 3D model stored in the 3D model memory unit 65 according to the position of the viewpoint of the particular potential user obtained by the conversion unit 63; and an output unit 67 such as a head mounted display device for outputting the outputs representing the 3D model controlled by the management unit 64.

Figures 28, 29:
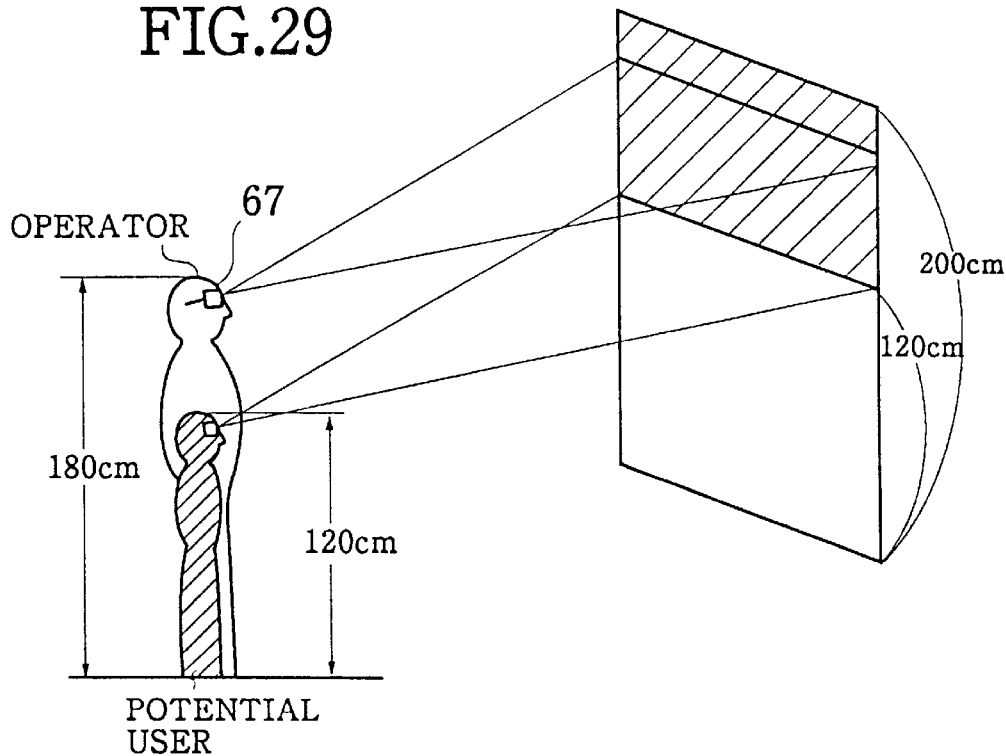
FIG. 28 is an illustration of a data format for the attribution data used in the system of FIG. 27.
FIG. 29 is an illustration of an exemplary situation using the attribution data of FIG. 28 in which the system of FIG. 27 is to utilized.

Here, the attribution data stored in the attribution memory unit 61 are given in a form shown in FIG. 28, which indicates a case of using the height of each potential user type as the attribution value as an example. More specifically, in this attribution data shown in FIG. 28, each type of potential user such as an elementary school children (lower, middle, and upper grades), a junior high school student (girl and boy), and an adult (female and male) has assigned an attribution value indicating an average height for this type of potential users.

Now, as shown FIG. 29, a case in which the operator is a male adult with the height of 180 cm and this operator is to experience the 3D model from the viewpoint of the potential user who is a lower grade elementary school child with the height of 120 cm will be considered. For example, in a case of judging whether the height of 200 cm for a panel to be watched by the potential user is an appropriate, the operator himself has the height of 180 cm so that he would be able to see the entire panel without moving his head. However, the potential user having the height of only 120 cm would not be able to see the upper part of the panel unless the head is inclined significantly. It is possible for the operator to squat down to the height of the potential user's viewpoint, but this requires the operator to take the different posture from the posture of the potential user so that it is difficult to make the proper judgement. Moreover, it is quite difficult for the operator to adjust this height to the potential user's viewpoint when the potential user is sitting down.

In this fourth embodiment, however, the operator can experience the 3D model from the viewpoint of the potential user, without changing his posture, as the outputs representing the 3D model outputted by the output unit 67 are controlled such that the view from the viewpoint of the operator at his own height is adjusted to the view from the viewpoint of the potential user. Consequently, the operator can also experience the view from the potential user's viewpoint when the potential user is sitting down by simply sitting down.

More specifically, the operation in this fourth embodiment is carried out according to the flow chart of FIG. 30 as follows.

First, at the step 230, the operator enters his own height of 180 cm as his own attribution value from the input unit 62.

Then, at the step 231, the operator specifies the desired one of the attribution data stored in the attribution memory unit 61 for the particular potential user type which is the lower grade elementary school child in this case. In response, the management unit 64 reads out the attribution value assigned to the specified potential user type, which is 120 cm in this case, from the attribution memory unit 61 and supply this attribution value to the conversion unit 63 along with the attribution value of the operator entered at the step 230.

Next, at the step 232, the conversion unit 63 calculates the conversion rate r as a ratio of the attribution value of the potential user with respect to the attribution value of the operator, i.e., $r = 120/180 \approx 0.67$ in this case. The calculated conversion rate r is stored within the conversion unit 63.

Then, at the step 233, whether the conversion terminating instruction for the conversion unit 63 is entered by the operator or not is determined.

Unless this conversion terminating instruction is entered, the 3D position of the operator measured by the position input unit 66 is read out to the conversion unit 63 at the step 234, and the y-coordinate value of this 3D position corresponding to the height is converted by using the stored conversion rate r in this case.

Then, at the step 236, the 3D model stored in the 3D model memory unit 65 is read out to the management unit 64 at which the 2D projection image of this 3D model from the viewpoint of the potential user is calculated, and this 2D projection image is displayed by the output unit 67 in a form of the head mounted display. The process then returns to the step 233 described above.

When the conversion terminating instruction for the conversion unit 63 is entered, next at the step 238, whether there is an operation terminating instruction or not is determined, such that when there is such an operation terminating instruction, the process is terminated, whereas otherwise the process returns to the step 231 described above.

Thus, while the conversion by the conversion unit 63 is used, the operator can see the view from the viewpoint of the potential user, as if the operator's height has shrunk from 180 cm to 120 cm. Here, in a case the operator moves his head by a distance d, the viewpoint is displaced by a distance r•d with respect to the 3D model, so that the operator's view changes exactly as the view from the potential user's viewpoint would change when the potential user makes the same move of the head.

Thus, according to this fourth embodiment, it becomes possible for the operator to experience the 3D model from the viewpoint of the potential user, without changing his posture, so that the operator can make a proper judgement as to whether the height of 200 cm for a panel to be watched by the potential user is an appropriate, without constructing the actual 3D model for this case.

In other words, it is possible for the operator to experience the views from the different viewpoints of the different potential users, by simply specifying these different potential users from the input unit 62.

Now, it is possible to modify this fourth embodiment such that the operator can experience not just the view from the potential user's viewpoint but also an environmental condition of the potential user in the virtual space. For example, a case of judging whether the panel is reacheable for the potential user in the example used above can be realized by measuring the positions of the hands of the operator either indirectly using an infrared ray sensor or an ultrasonic wave sensor, or directly using a magnetic sensor. In this case, the attribution data in the attribution memory unit 61 are given in a form shown in FIG. 31, which include the arm length as another attribution value in addition to the height.

Figure 30:
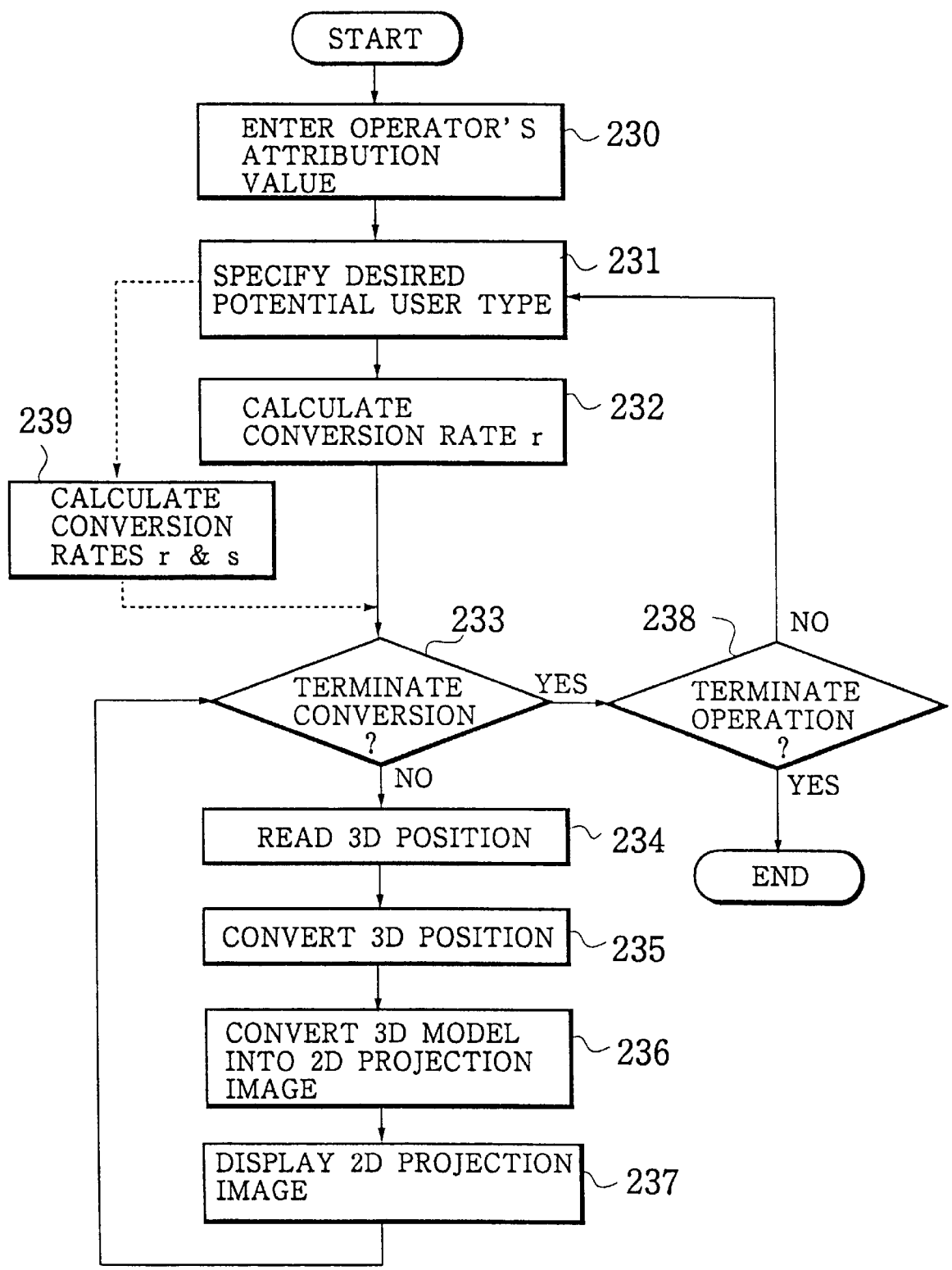
FIG. 30 is a flow chart for the operation of the system of FIG. 27.

More specifically, the operation in this case is also carried out according to the flow chart of FIG. 30 described above, with the following changes.

Namely, in this case, at the step 230, the operator also enters his own arm length of 65 cm for example along with his own height of 180 cm as his own attribution values from the input unit 62.

Then, in response to the step 231, the management unit 64 reads out the attribution values assigned to the specified potential user type, which is 120 cm for the height and 50 cm for the arm length in this case, from the attribution memory unit 61 and supply these attribution values to the conversion unit 63 along with the attribution values of the operator entered at the step 230.

Accordingly, the step 232 is replaced by the step 239 in which the conversion unit 63 calculates the conversion rate s for the arm length as a ratio of the arm length of the potential user with respect to the arm length of the operator, i.e., $s=50/65 \approx 0.77$, in addition to the conversion rate r for the height. The calculated conversion rates r and s are stored within the conversion unit 63.

The rest of the operation according to the flow chart of FIG. 30 remains the same as the case described above.

Figures 31, 32:
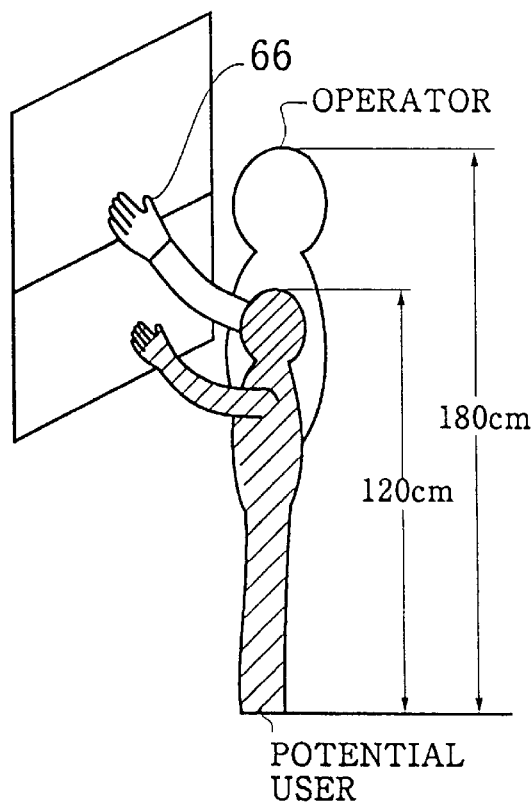
FIG. 31 is an illustration of another data format for the attribution data used in the system of FIG. 27.
FIG. 32 is an illustration of another exemplary situation using the attribution data of FIG. 31 in which the system of FIG. 27 is to utilized.

Here, in a case of writing on a blackboard replacing the panel in the example used above as shown in FIG. 32, the operator himself has the height of 180 cm and the arm length of 65 cm so that he would be able to write on the blackboard at 200 cm height easily, since he can reach as high as 180+65−30=215 cm, assuming that the vertical length of his head and neck is 30 cm. However, the potential user having the height of only 120 cm and the arm length of 50 cm would not be able to write on the blackboard because he can reach only as high as 120+50−30×0.67=150 cm which is about the same height as the lower edge of the blackboard.

Thus, in such a case, the operator of this fourth embodiment can judge that the height of the blackboard is too high for this potential user by experiencing the impossibility of writing from the viewpoint of the potential user.

In this manner, it also becomes possible for the operator can experience the environmental condition of the potential user in the various virtual spaces such as those representing an arrangement of tables and chairs, an arrangement of a kitchen space, and a driver's seat in an automobile.

It is to be noted that the attribution value in the attribution data can be specified in terms of any appropriate quantities such as a finger size and a foot size, such that the operator can check a potentially dangerous crevice on a toy which is too narrow to have the actual finger of the operator inserted but can be wide enough to have the thinner finger of a child inserted, or a pedal which is too small for the foot size of the potential user such that the pedal cannot be stepped sufficiently by the potential user.

Figure 33:
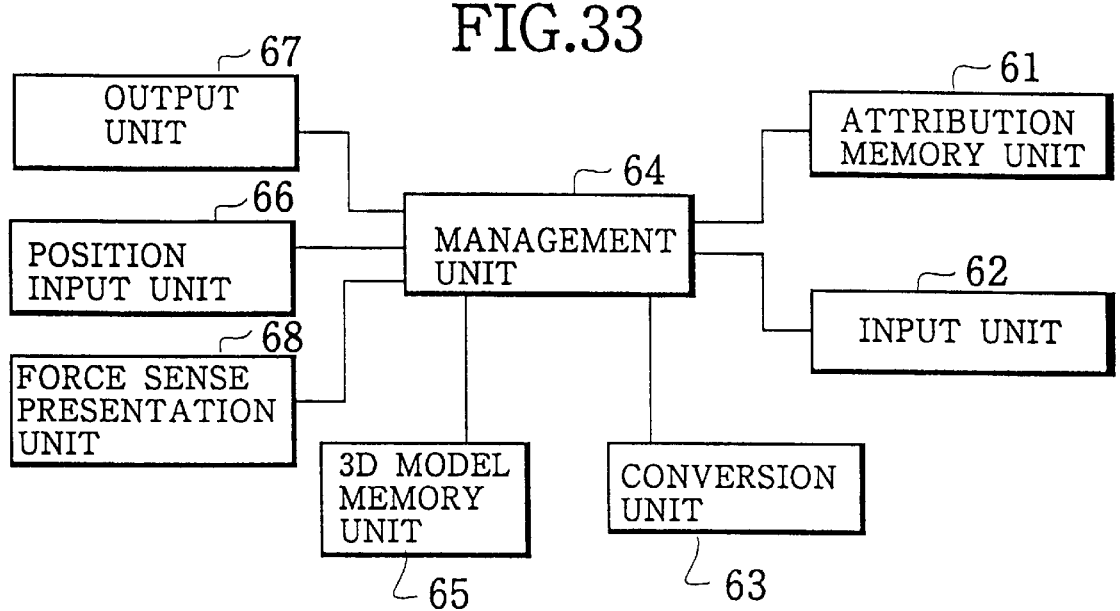
FIG. 33 is a schematic block diagram of a modified configuration for the system of FIG. 27.
Figure 34:
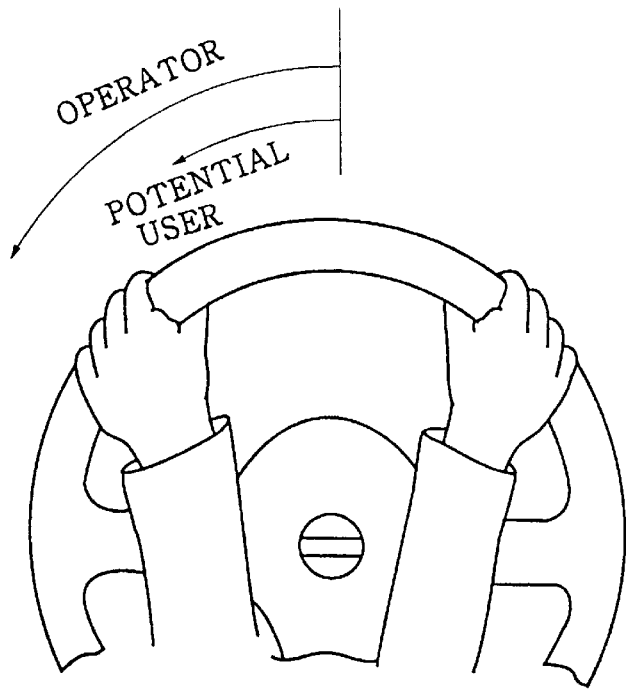
FIG. 34 is an illustration of an exemplary situation in which the modified configuration of FIG. 33 is to be utilized.

In addition, the configuration of the system shown in FIG. 27 may be modified as shown in FIG. 33 which further includes a force sense presentation unit 68 in a form of a torque motor. This modified configuration of FIG. 33 is utilized in a case the operator checks a steering control by various potential users as follows. Namely, when the potential user is an adult female, the power of the operator to manipulate the steering wheel is adjusted to the power of the potential user to manipulate the steering wheel by the conversion unit 63, such that as indicated in FIG. 34 which shows an image of the steering wheel to be displayed by the output unit 67, a range by which the steering wheel can be rotated by the potential user is much limited compared with the range available for the operator himself, so that the operator can experience the driving environment of an adult female driver. Here, by providing the feedback of the force sense from the force sense presentation unit 68, the operator can also experience the heaviness of the steering wheel that would be felt by the potential user.

Furthermore, by showing the image of the road on the background of FIG. 34, the situation of the driving can be simulated by the virtual space such that the difficulty of the driving due to the heavy steering wheel can be experienced the operator.

It is to be noted that the fourth embodiment described above is also applicable to a case of simulating a situation of a near-sighted potential user by dimming the image output, a case of simulating a situation of a potential user with a hearing trouble by muffling the sound output, and cases related to other senses such as the sense of heat, sense of pitch, tactile sense, gustatory sense, and olfactory sense.

Figure 35:
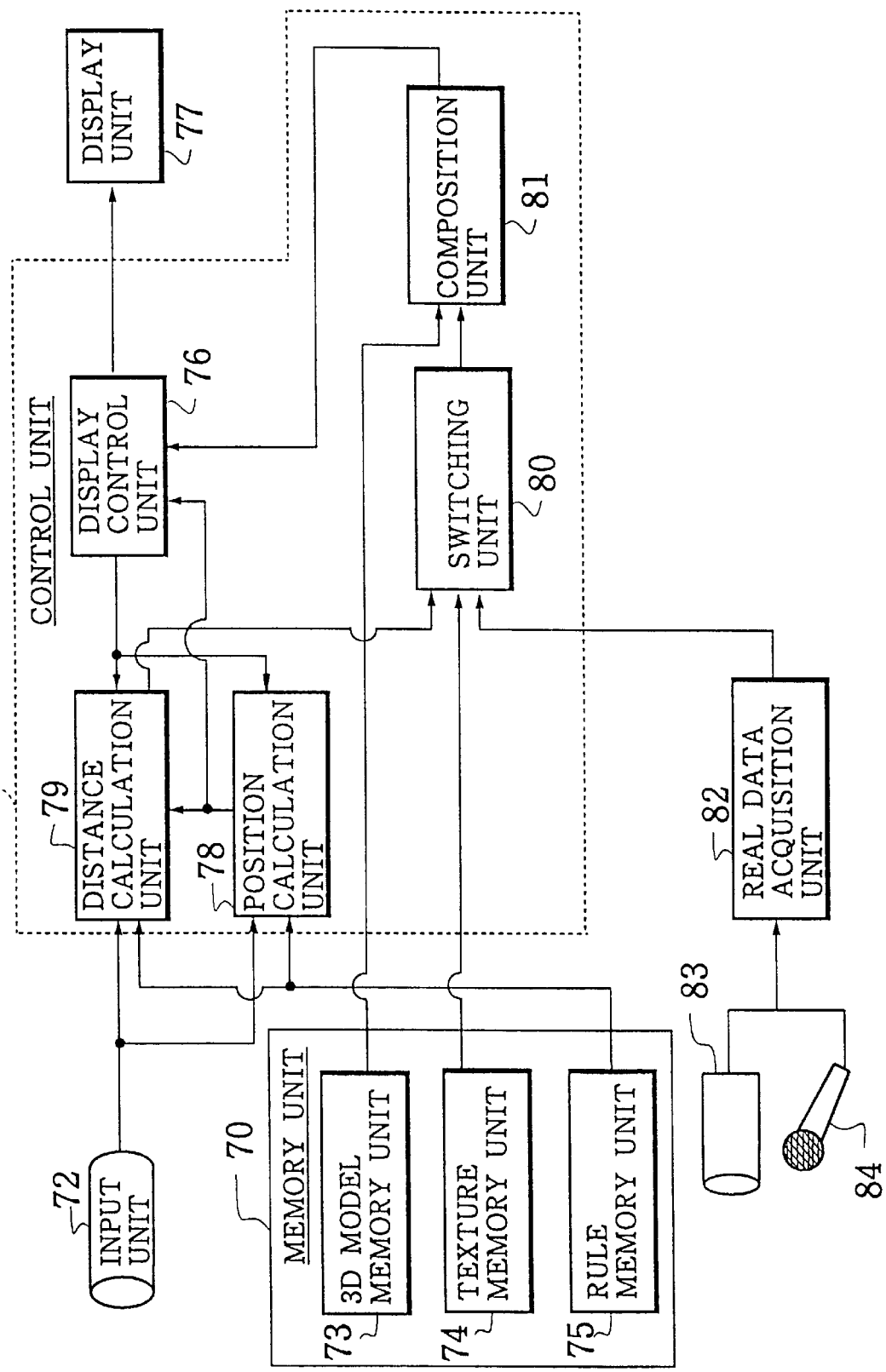
FIG. 35 is a schematic block diagram of a fifth embodiment of a virtual reality data presentation system according to the present invention.

Referring now to FIG. 35, a fifth embodiment of a virtual reality data presentation system according to the present invention will be described in detail.

In this fifth embodiment, the system is given in a form of a monitoring system operation training system, which comprises: a memory unit 70 containing a 3D model memory unit 73 for storing 3D model representing a monitoring system, a texture memory unit 74 for storing texture data for textures to be attached to surfaces of various objects in the monitoring system represented by the 3D model, and a rule memory unit 75 for storing various rules to be used in the system; a display unit 77 for displaying a virtual space including the monitoring system represented by the 3D model; an input unit 72 for entering various inputs such as a 3D position of a user's viewpoint and a command for display switching; a real data acquisition unit 82 for acquiring real data obtained from an actual monitoring system; and a control unit 71 for controlling the display by the display unit 77 according to the inputs from the input unit 72 and the data in the memory unit 70.

Here, the control unit 71 further comprises: a display control unit 76 for controlling the display by the the display unit 77; a position calculation unit 78 for calculating a position of the user's viewpoint with respect to the displayed virtual space to be supplied to the display control unit 76, according to the 3D position entered by the input unit 72 and display image data supplied from the display control unit 76, by using the prescribed procedure stored in the rule memory unit 75; a distance calculation unit 79 for calculating a distance between the user's viewpoint and the reference point on the monitoring system in the displayed virtual space and determining objects in the monitoring system located within a user's field of view, according to the 3D position entered by the input unit 72, the displayed image data supplied from the display control unit 76, and the position of the user's viewpoint, by using the prescribed rules stored in the rule memory unit 75; a switching unit 80 for selectively outputting one of the texture data stored in the texture memory unit 74 and the real data acquired by the real data acquisition unit 82 according to the objects located within the user's field of view determined by the distance calculation unit 79; and a composition unit 81 for obtaining the display image data to be supplied to the display control unit 76 as a composition of the texture data or the real data outputted from the switching unit 80 with the 3D model stored in the 3D model memory unit 73.

Also, the display unit 77 is formed by a display device such as a CRT display or a liquid crystal display.

Also, the input unit 72 is equipped with various input devices such as a keyboard, a touch screen function provided on a display screen of the display unit 77, a pointing device such as a mouse, joy stick, and tablet, and a sensor such as a magnetic sensor, an infrared ray sensor, an ultrasonic wave sensor, and an eye sensor.

In addition, the real data acquisition unit 82 is equipped with a video camera 83 and a microphone 84 for obtaining various visual and audio real data, and a data transmission line (not shown) for obtaining real computer outputs used in the actual monitoring system.

Figure 36:
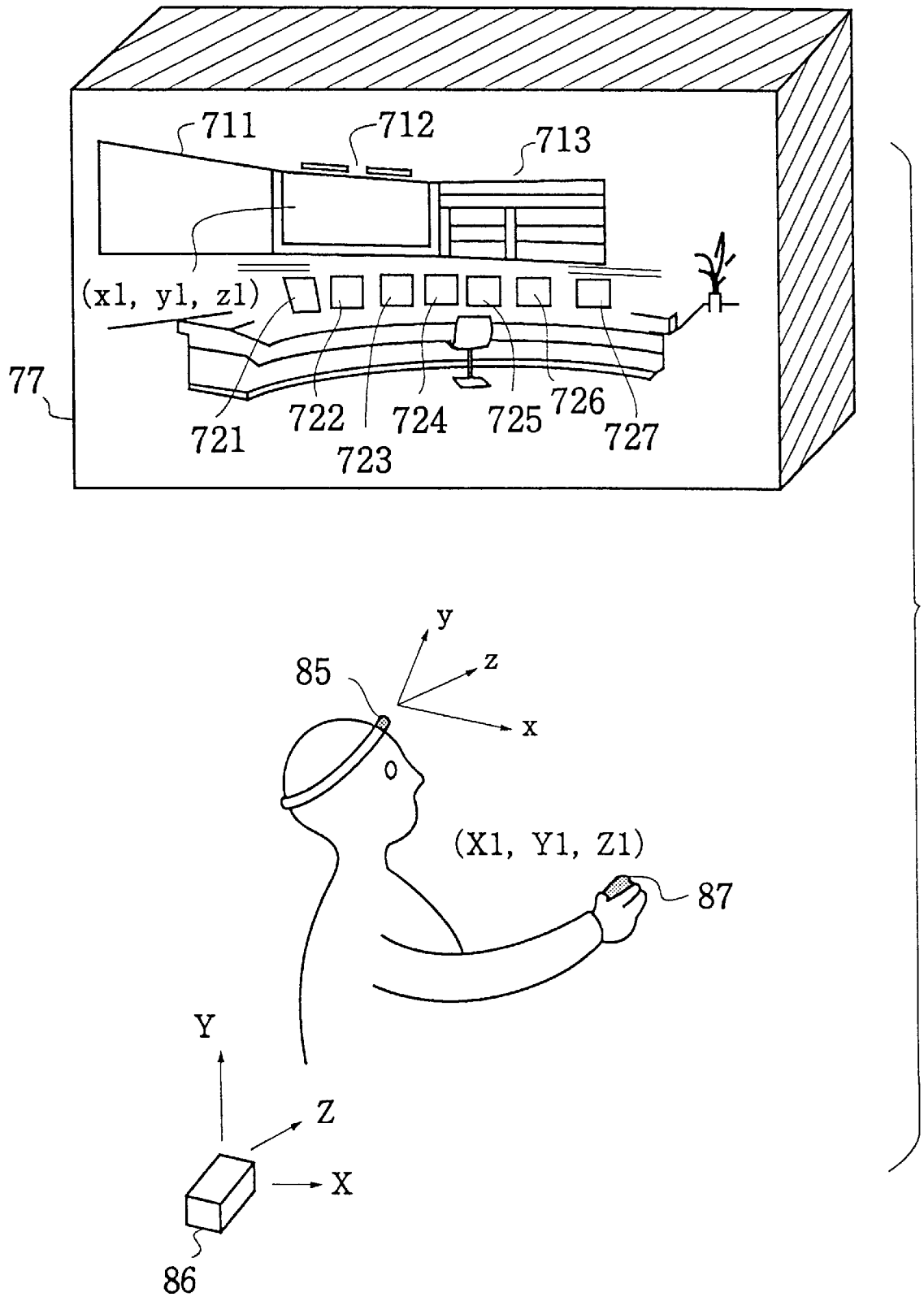
FIG. 36 is an illustration of an exemplary situation to be realized by the system of FIG. 35.

FIG. 36 shows a detail of the monitoring system displayed by the display unit 77 in a form of a wide screen, and a detail configuration of the magnetic sensor device in the input unit 72, operated by the user.

Namely, the magnetic sensor device includes a sensor unit 21 for detecting a position of the user with respect to the display unit 77 which is attached on the head of the user by a head band, a source unit 22 located about 1 m away from the display unit 77, and a supplementary sensor unit 23 for detecting a position pointed by a finger of the user which is attached to the hand of the user. Here, the sensor unit 21 can be attached on bows of the spectacles worn by the user instead of using the head band if desired.

In this magnetic sensor device, the magnetic field generated by the source unit 22 is detected by the sensor unit 21 and the coordinate (X1, Y1, Z1) in the coordinate system (X, Y, Z) with the source unit 22 at the origin, by synchronizing the sensor unit 21 and the source unit 22.

Here, however, the coordinate required to be detected is the coordinate (x1, y1, z1) of the reference point on the display unit 77 in the coordinate system (x, y, z) with the position of the eyes of the user as the origin. It is to be noted in this regard that the position of the sensor unit 21 does not coincide with the position of the eyes of the user.

Consequently, the position calculation unit 78 makes the calibration of the (X, Y, Z) coordinate system and the (x, y, z) coordinate system as follows.

Namely, this calibration is made by using the following three equations.

$$x=X$$

$$y=Y+a$$

$$z=Z+b$$

where a and b are calibration parameters.

Here, the calibration parameters a and b can be determined by the initial calibration measurement using the user standing at the reference position before the actual operation. Note here, however, that this rather simple calibration scheme is sufficient in a case of FIG. 36 because the (X, Y, Z) coordinate system and the (x, y, z) coordinate system are related with each other by a parallel displacement. In general, when the rotational displacement is involved, the calibration parameters in forms of 4×4 matrices must be determined. The calibration procedure described above is stored in the rule memory unit 75 and supplied to the position calculation unit 78.

Now, the objects such as panels 711 to 713 and the terminals 721 to 727 in the monitoring system represented by the 3D model displayed by the display unit 77 are managed in the 3D model memory unit 73 in a form of a table shown in FIG. 37, where each entry registers an ID (such as 711), a name (such as panel-1), a pointer to model data (such as pd0), a pointer to real data (such as rd0), a pointer to texture data (such as ptr0), and a position coordinate (such as ($\alpha_0, \beta_0, \gamma v_0$)) in a coordinate world coordinate system of each object.

Here, the model data specifies the three-dimensional data for vertices of each object, while the texture data stored in the texture memory unit 74 provide a realistic texture to each object, such as a wood texture indicative of a material for the surface of a table, for example. In particular, for the panel and the terminal, the texture data is given by a picture of a display image in each panel or terminal at a past time while the user's viewpoint is sufficiently away from each panel or terminal. In this fifth embodiment, however, this texture data for each panel or terminal is replaced by the real data when the user's viewpoint approaches to each panel or terminal sufficiently, where the real data indicates the actual data such as the computer outputs which are displayed at each panel or terminal in the actual monitoring system.

Similarly, the real data is replaced by the appropriate texture data for each panel or terminal when the user moves away sufficiently from each panel or terminal.

This switching between the texture data and the real data is carried out by the switching unit 80 according to the pointer to real data and the pointer to texture data indicated in the table of FIG. 37.

More specifically, the actual procedure for the switching between the texture data and the real data at each panel or terminal according to the relative position of the user's viewpoint is carried out for an exemplary case in which the user approaches to the panel-2 712 while paying his attention to this panel-2 712, as follows.

First, which object is attracting the user's attention can be determined as follows. Namely, the distance calculation unit 79 has a correspondence table between the (x, y) coordinates on the display and the object IDs in a form shown in FIG. 38. Thus, for example, when the coordinate of the reference point (x1, y1, z1) are obtained by the position calculation unit 78, the object displayed at the reference point can be determined according to this correspondence table of FIG. 38.

Figure 38:
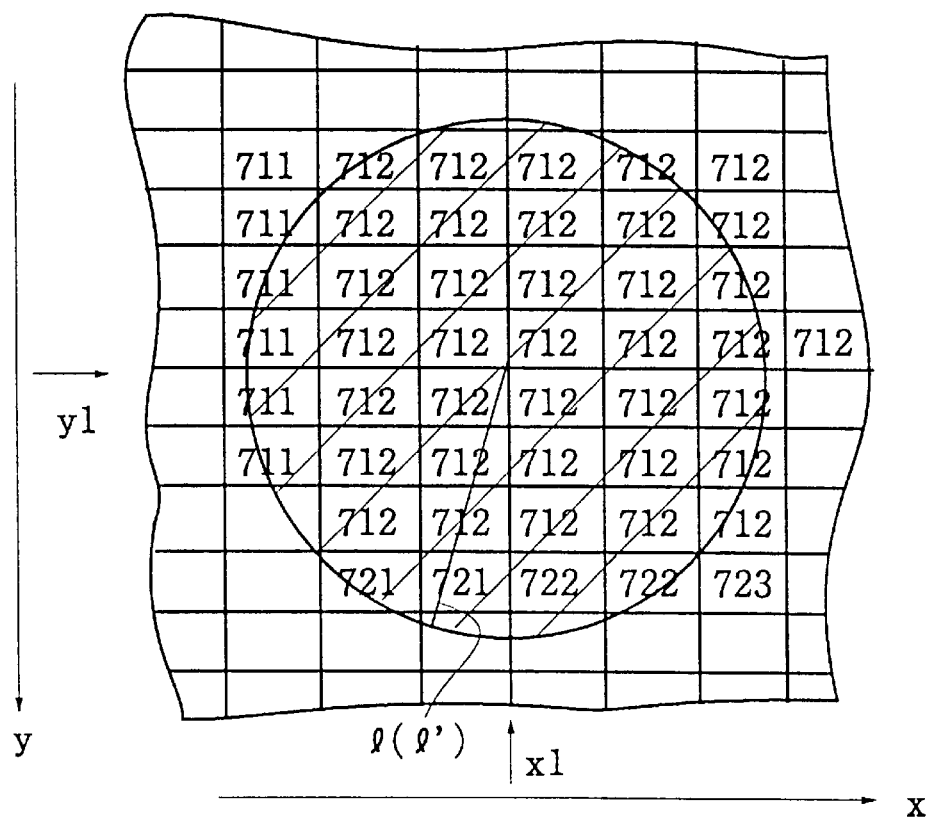
FIG. 38 is a diagrammatic illustration of a correspondence table used in the distance calculation unit in the system of FIG. 35.

Here, a normal field of view of human eyes when the reference point is located at the coordinate (x1, y1, z1) can be expressed as a region within a circle centered around a point (x1, y1) with a certain radius 1 (1') as indicated by a shaded region in FIG. 38. Here, the radius 1 (1') depends on the distance $$L = \sqrt{x1^2 + y1^2 + z1^2}$$

between the viewpoint and the reference point.

Figure 39:
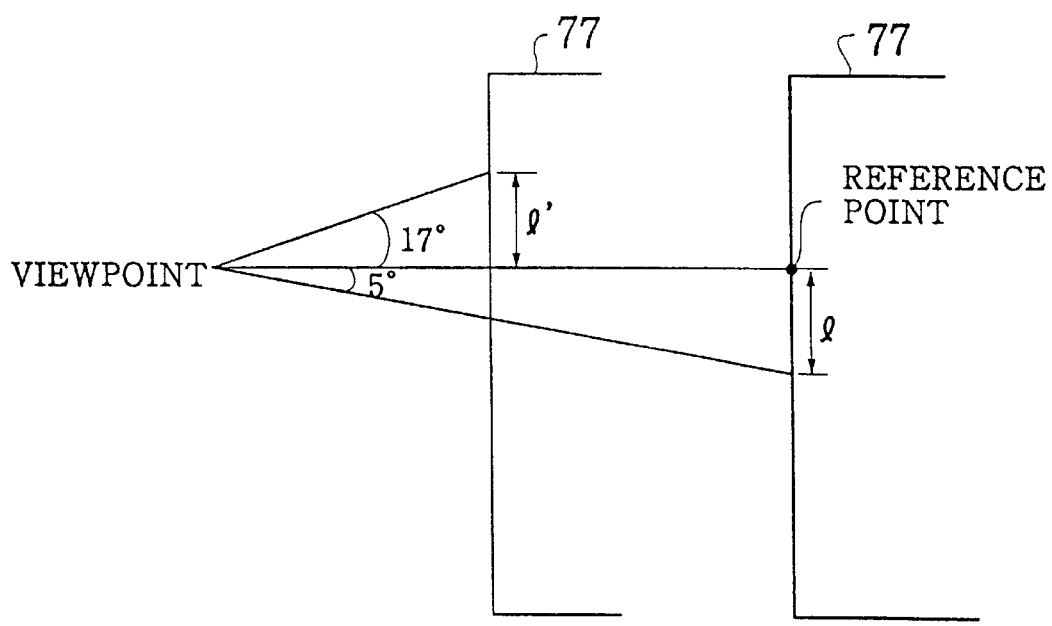
FIG. 39 is a diagram for showing two different radii of the field of view used in the system of FIG. 35.

In this fifth embodiment, for the distance L≦a first threshold T1, the radius 1' determined as 1'=L×tan 17° as indicated in FIG. 39 is used, while for T1<L≦a second threshold T2, where T2>T1, the radius 1 determined as 1=L×tan 5° as indicated in FIG. 39 is used. Here, the angle of 17° determining the radius 1' is a viewing angle of the so called effective view field indicating a range in which at least the shape and the color of the objects are identifiable by the normal human eyes, without moving the head. On the other hand, the angle of 5° determining the radius 1 is a viewing angle of the so called discriminative view field indicating a range in which the objects are accurately visible by the normal human eyes.

Then, when the distance L is determined, the distance calculation unit 79 regards the objects located within this circle with the radius 1 or 1' as those recognized by the user, and replaces the texture data by the real data for the objects located within this circle, according to the prescribed rules summarized in FIG. 40 supplied from the rule memory unit 75. More specifically, according to this FIG. 40, only those objects located within the circle with the radius 1=L×tan 17° are to be displayed with the real data when L≦T1, and only those objects located within the circle with the radius 1=L×tan 5° are to be displayed with the real data when T1<L≦T2, while all the objects are to be displayed with the texture data when L>T2.

Figure 41:
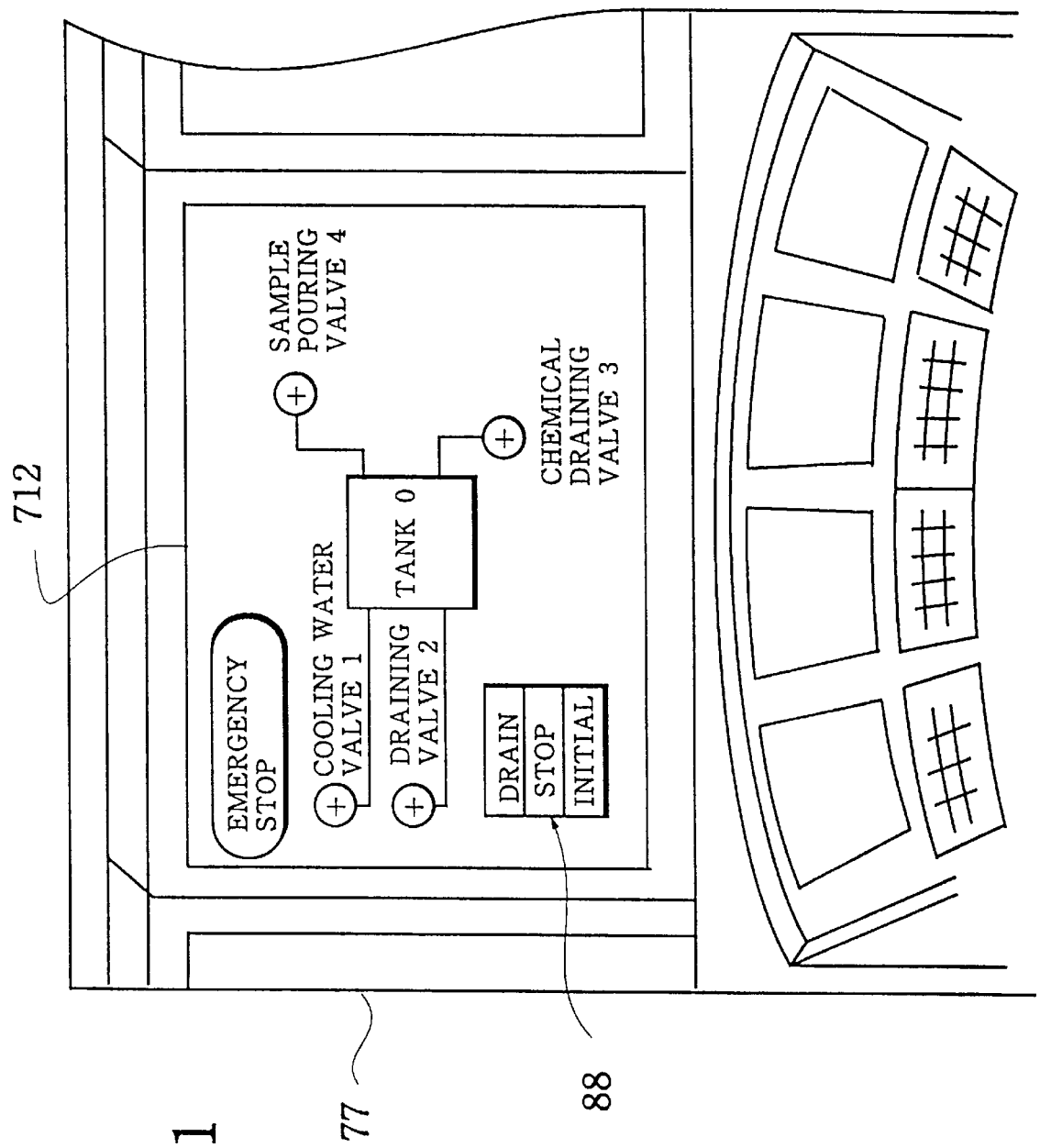
FIG. 41 is an illustration of the real data display used in the system of FIG. 35.

In a case shown in FIG. 38, the only object located within the shaded region is the panel-2 712, so that the texture data for this panel-2 712 specified by the pointer to texture data (ptr1) used at the composition unit 81 in constructing the display image data of the monitoring system is replaced by the real data for this panel-2 712 specified by the pointer to real data (rd1), such that this panel-2 712 appears to show the actual computer output as shown in FIG. 41.

Similarly, the switching from the real data specified by the pointer to real data (rd1) to the texture data specified by the pointer to texture data (ptr1) is carried out according to the same rules shown in FIG. 40.

In order to cope with a case in which the user changes his reference point while approaching to or moving away from the display unit 77, the detection of the reference point by the distance calculation unit 79 using the correspondence table of FIG. 38 is repeated at constant interval, such that the switching of the texture data and the real data described above can be carried out consecutively.

Figure 42:
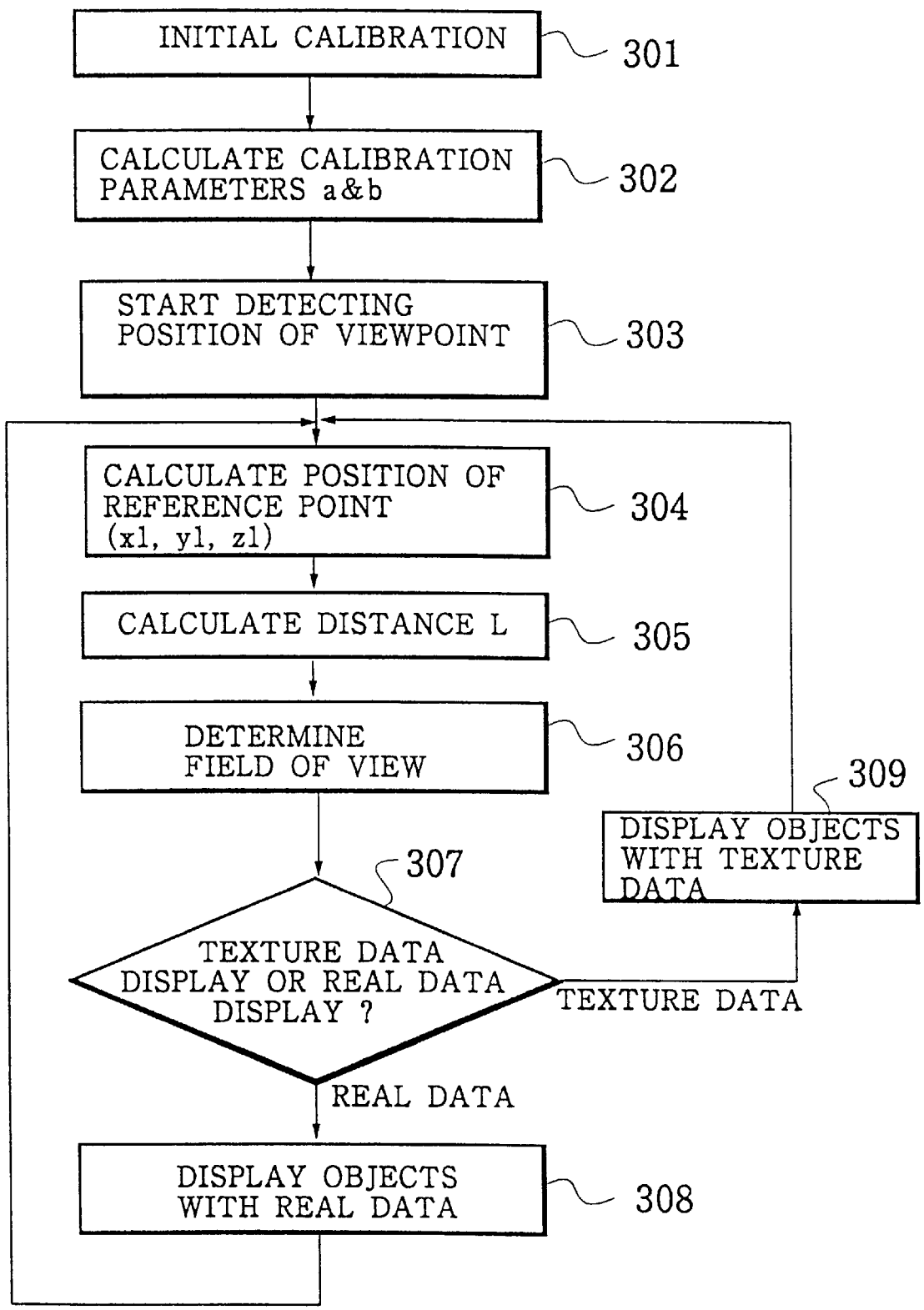
FIG. 42 is a flow chart for the operation of the system of FIG. 35.

Thus, the operation of this system of the fifth embodiment can be carried out according to the flow chart of FIG. 42 as follows.

First, at the step 301 the initial calibration with the user standing at the reference position is carried out, and the calibration parameters a and b are determined at the step 302.

Then, the detection of the position of the viewpoint by the input unit 72 is started at the step 303.

Next, at the step 304, the position calculation unit 78 calculates the coordinate (x1, y1, z1) of the reference point, while at the step 305, the distance calculation unit 79 calculates the distance L.

Then, at the step 306, the field of view is determined by the distance calculation unit 79 by calculating the radius 1 or 1' according to the distance L obtained at the step 305.

Next, at the step 307, the distance calculation unit 79 determines whether each object of the monitoring system represented by the 3D model is to be displayed with the texture data or the real data, according to the rules shown in FIG. 40, and controls the switching unit 80 accordingly.

In response, in a case of the real data display, the switching unit 80 selects the real data supplied from the real data acquisition unit 82 for that object such that the composition unit 81 obtains the display image data specifying the real data display for that object at the step 308, whereas in a case of the texture data display, the switching unit 80 selects the texture data supplied from the texture memory unit 74 for that object such that the composition unit 81 obtains the display image data specifying the texture data display for that object at the step 309. In either case, the process returns to the step 304 so as to repeat the steps 304 to 309 for next reference point.

Here, it is to be noted that, in the real data display shown in FIG. 41, the user can specify a desired entry in a menu 88 by pointing it by finger, where the position pointed by the finger is detected by the supplementary sensor unit 23 attached to the user's hand, such that the operation of a touch screen function can be realized within the displayed virtual space.

Also, the real data to replace the texture data may not necessarily be the computer outputs as shown in FIG. 41 and can also be an video image obtained by the camera 83 located at a distanced cite, in which case the pointer to the real data in FIG. 38 points to an image server in a network system through which the video image is transmitted from the camera 83.

Thus, by using the monitoring system operation training system according to this fifth embodiment, a training for a recovery operation in a case of an accident can be carried out by checking the proper operations in the displayed virtual space. Similarly, a training for a checking operation by finger pointing and voice confirmation can be carried out by detecting the voice of the user using the technique of the speech recognition.

Moreover, the amount of data processing required for the display of the 3D model will not be increased very much, as the real data are used only selectively.

In this regard, it is noted that the amount of data processing required for the display of the 3D model can be reduced further by replacing the texture data display with the simpler display format such as a block diagram or a schematic diagram.

It is also to be noted that the fifth embodiment described above can be utilized in simulating a number of different operator rooms, such that the training for the operations in various operator rooms can be carried out without actually constructing a physical training facility for each operator room. Moreover, such a training can be carried out with the entire environmental conditions of the operator room simulated, so that the very effective training can be achieved in the very realistic manner.

Figure 43:
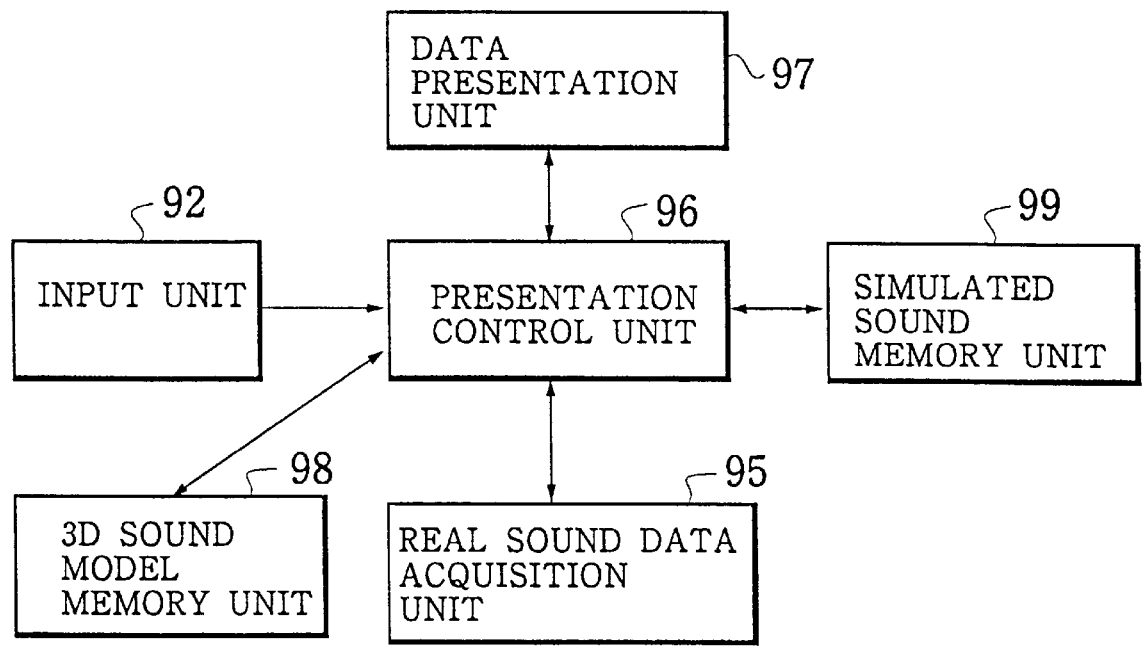
FIG. 43 is a schematic block diagram of a sixth embodiment of a virtual reality data presentation system according to the present invention.

Referring now to FIG. 43, a sixth embodiment of a virtual reality data presentation system according to the present invention will be described in detail.

In this sixth embodiment, the system is given in a form of a sound monitoring system operation training system, which comprises: a model memory unit 73 for storing 3D sound model representing a sound monitoring system; a data presentation unit 97 for presenting the sound data for the sound monitoring system represented by the 3D sound model; an input unit 92 for entering various inputs such as a position of the user; a real sound data acquisition unit 95 for acquiring real sound data obtained from an actual sound monitoring system; a simulated sound memory unit 99 for storing simulated sound data for the sounds that can be generated by various objects in the sound monitoring system; and a presentation control unit 96 for controlling the data presentation unit 97 such that the simulated sound data are outputted for the objects located sufficiently away from the point of the user entered from the input unit 92, while the real sound data are outputted for the objects located sufficiently close to the point of the user entered from the input unit 92.

This sixth embodiment can be effectively regarded as a modification of the fifth embodiment described above, in which the switching between the texture data and the real data used in the fifth embodiment described above is modified to the switching between the simulated sound data and the real sound data.

Figure 44:
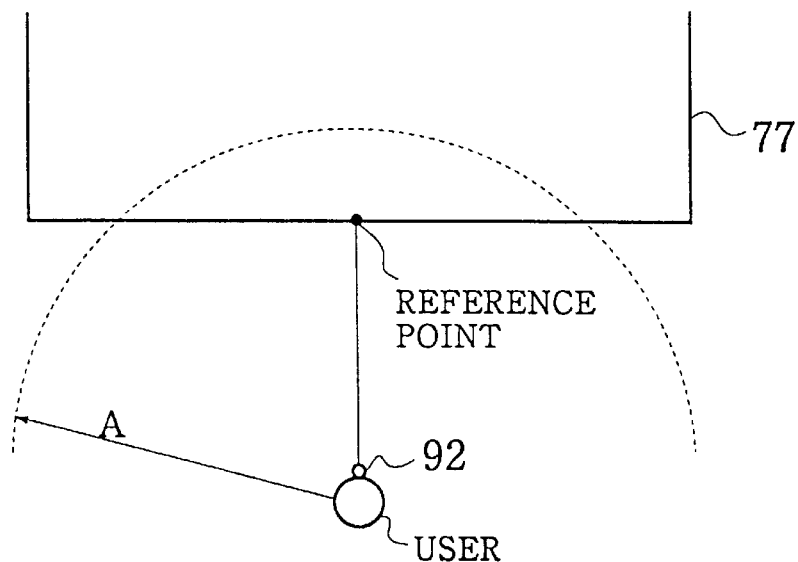
FIG. 44 is a diagram for showing an audible range used in the system of FIG. 43.

Here, the switching between the simulated sound data and the real sound data is determined according to an audible range with a radius A indicated in FIG. 44, instead of the field of view with the radius l used in the fifth embodiment.

In this sixth embodiment, the various objects generating sounds, such as panels 711 to 713 and the terminals 721 to 727 in the monitoring system similar to that shown in FIG. 36 used in the fifth embodiment above for example, are managed in the model memory unit 98 in a form of a table shown in FIG. 45, where each entry registers an ID (such as 711), a name (such as panel-1), a pointer to real sound data (such as rs0), a pointer to simulated sound data (such as ps0), and a position coordinate (such as ($\delta_p, \epsilon_p, \eta_p$) in a coordinate world coordinate system of each object. Here, the pointer to model data similar to that used in the table of FIG. 37 for the fifth embodiment may also be provided in a case the display of the 3D model is incorporated.

Figure 46:
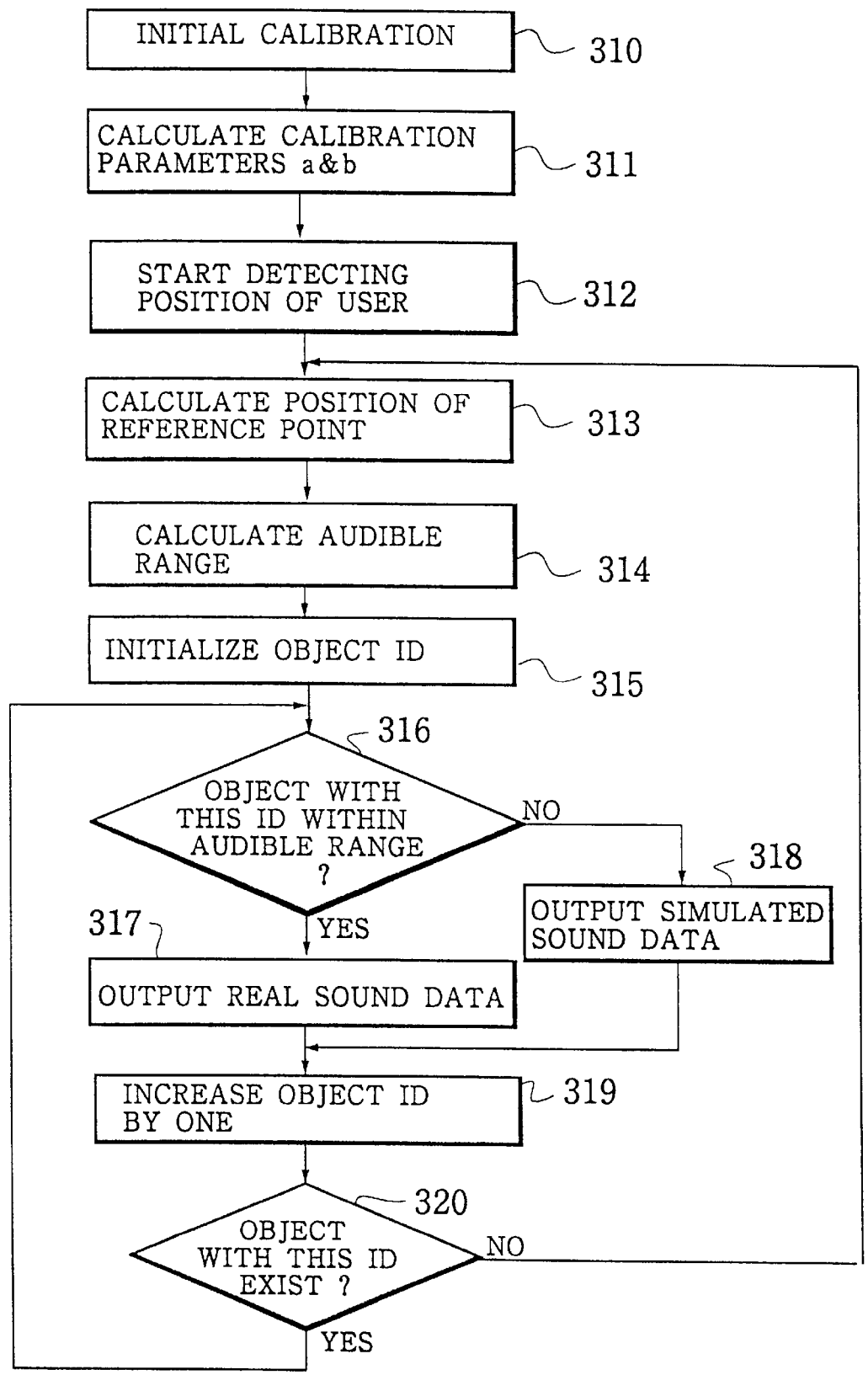
FIG. 46 is a flow chart for the operation of the system of FIG. 43.

Accordingly, the operation of this system of the sixth embodiment can be carried out according to the flow chart of FIG. 46 as follows.

First, at the step 310, the initial calibration with the user standing at the reference position is carried out, and the calibration parameters a and b are determined at the step 311.

Then, the detection of the position of user by the input unit 92 is started at the step 312.

Next, at the step 313, the coordinate (x1, y1, z1) of the reference point is calculated.

Then, at the step 314, the audible range with the radius A is calculated, and at the step 315, the object ID is initialized.

Next, at the step 316, whether each object with the supplied object ID is located within the audible range or not is determined.

In a case the object is located within the audible range, the real sound data are outputted for this object at the step 317, whereas otherwise the simulated sound data are outputted for this object at the step 318. Here, the simulated sound data has a finite recorded time so that the output of the simulated sound data must be continued repeatedly until there is a command for the switching to the real sound data.

Then, at the step 319, the object ID is increased by one to step up to the new object ID, and whether the object with this new object ID exists or not is determined at the step 320. In a case the object with the new object ID exists, the process returns to the step 316 to carry out the steps 316 to 320 for this new object ID, whereas otherwise the process returns to the step 313 so as to repeat the steps below the step 313 for next reference point.

It is to be noted that, although the data presentation unit 97 is indicated in FIG. 44 in a form of a large size speaker device, the data presentation unit 97 can be a small size device such as a headphone device to be worn by the user, as long as the data presentation unit 97 is capable of presenting the 3D sound model.

It is also to be noted that the sixth embodiment described above can be utilized in simulating a sound space of a number of different operator rooms, such that the training for the operations in various operator rooms can be carried out without actually constructing a physical training facility for each operator room. Moreover, such a training can be carried out with the entire acoustic conditions of the operator room simulated, so that the very effective training can be achieved in the very realistic manner.

Referring now to FIG. 47, a seventh embodiment of a virtual reality data presentation system according to the present invention will be described in detail.

In this seventh embodiment, the system is given in a form of a 3D model arrangement design system, which comprises: an input unit 401, a data conversion unit 402, a 3D model memory unit 403, a display conversion unit 404, a display unit 405, a direct command unit 406, an indirect command unit 407, a command switching unit 408, and a data management unit 409 through which all of the units 401 to 408 can communicate with each other. In addition, the command switching unit 408 is directly connected with the direct command unit 406, and further equipped with a reflection calculation unit 410 and a reflection command unit 411.

The input unit 401 contains an input driver for inputting a 3D model produced by CAD (Computer Aided Design) system through a network or input data from a storage medium such as magnetic tape cassette, a pointing device such as a mouse for inputting the arrangement or the correction of the arrangement for the 3D model, a data glove, a 3D pointing device such as a 3D magnetic sensor, and a keyboard. The various input data entered from this input unit 401 are supplied to the data management unit 409.

The data conversion unit 402 converts the data format of the 3D model entered from the input unit 401 in a manner described in detail below.

The 3D model memory unit 403 stores the 3D model data entered from the input unit 401 and converted by the data conversion unit 402, in an arrangement specified from the input unit 401.

The display conversion unit 404 makes a perspective projection or a high speed display conversion according to a distance from a position of the viewpoint specified by the input unit 401 at a time of displaying the 3D model stored in the 3D model memory unit 403 in the memorized arrangement, and controls the display unit 405 such that the reflections calculated by the reflection calculation unit 410 are superposed over a console monitor screen in the 3D model according to the commands from the reflection command unit 411.

The display unit 405 is formed by a CRT for displaying the display images of the 3D model as converted by the display conversion unit 404.

The direct command unit 6 is provided for directly specifying a position in the displayed 3D virtual space by using the data glove or the 3D magnetic sensor provided in the input unit 401, in a case of correcting the arrangement of the 3D model displayed by the display unit 405 by manipulating the 3D model in the 3D virtual space directly.

The indirect command unit 7 is provided for indirectly working on the 3D model in the displayed 3D virtual space, by correcting the displacement, the rotation, and the arrangement of the 3D model, by using the mouse provided in the input unit 401 in another 3D or 2D space corresponding to the displayed 3D virtual space.

The command switching unit 408 controls the switching between the direct command unit 406 and the indirect command unit 407.

The reflection calculation unit 410 calculates the reflections to be superposed by the display conversion unit 44 according to the attributed values such as a position, a shape, and a luminous intensity of the lights such as fluorescent lights in the displayed 3D virtual space which causes the reflections, and the attributed values such as a position, a curvature, and a reflection coefficients of the console monitor screen in the displayed 3D virtual space on which the reflections are to be caused.

The reflection command unit 411 specifies a case incorporating an anti-reflection measure such as a louver provided in a vicinity of each fluorescent light, and a case without any anti-reflection measure.

With this configuration, the display conversion unit 404 applies the known hierarchical simplification scheme to the 3D model stored in the 3D model memory unit 403, in order to realize a high speed display of the 3D model given in terms of a large amount of data. For example, a number of polygons forming the 3D model is reduced by simplifying the portions of the 3D model located farther away from the viewpoint.

Figure 48A:
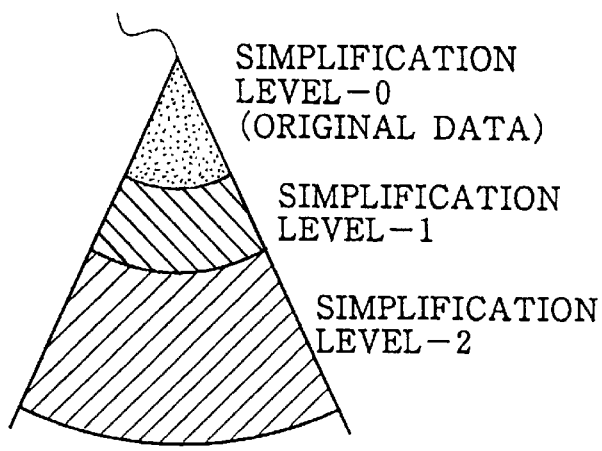
FIGS. 48A, 48B, 48C, and 48D are diagrams for explaining the hierarchical simplification scheme used in the system of FIG. 47.
Figure 48B:
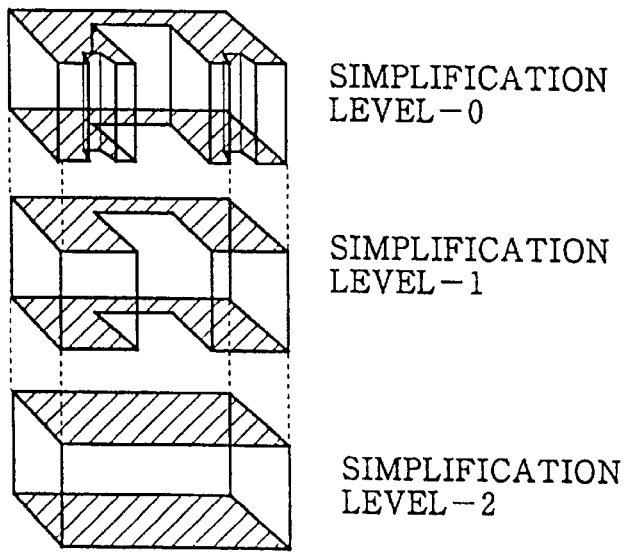
Figure 48C:
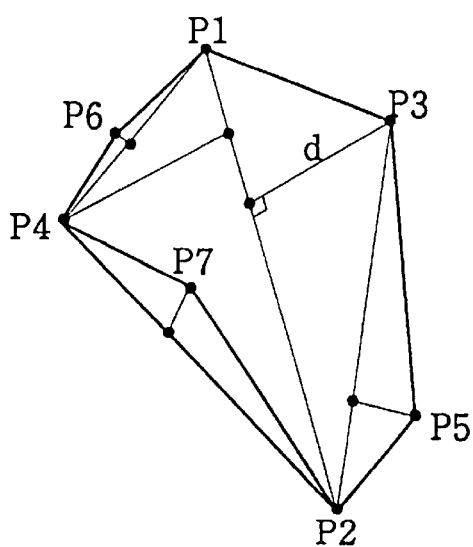
Figure 48D:
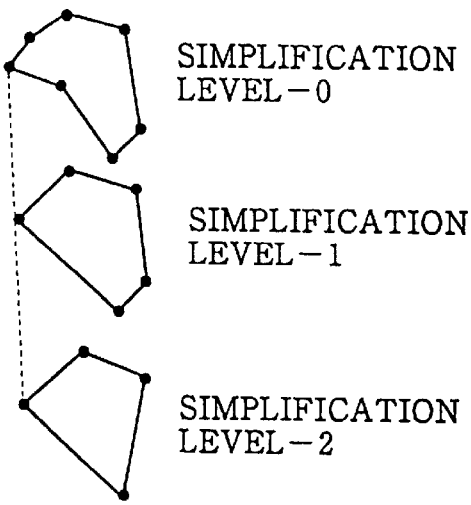

This simplification can be realized in the following manner for example. Namely, as shown in FIG. 48A, the simplification is made in three simplification levels (level-0, level-1, level-2) in accordance with the distance from the viewpoint. Then, for each of these simplification levels, a simplified model as shown in FIG. 48B is formed in the data management unit 9 on a basis of the original data of the 3D model. Here, the simplification is achieved by reducing a number of vertices by using a bisection scheme in which a polyhedron of a bottom surface of the 3D model is triangulated as shown in FIG. 48C and a vertex of the polyhedron is eliminated whenever a length of a vertical line drawn from the vertex to a base of a triangle containing the vertex becomes less than a reference length d as shown in FIG. 48D, where the reference length d is taken to be longer for the higher simplification level.

With this simplification scheme, the number of polygons forming the 3D model can be reduced to about 1/10, so that it becomes possible to display the 3D model on the display unit 405 in real time. Here, for example, the 3D model representing a monitoring room appears as shown in FIGS. 49 and 50, where FIG. 49 shows a case without a louver in which the reference numeral 431 indicates the reflections due to the fluorescent lights, whereas FIG. 50 shows a case of using a louver in which the reference numeral 441 indicates the reflections due to the fluorescent lights.

Figure 49:
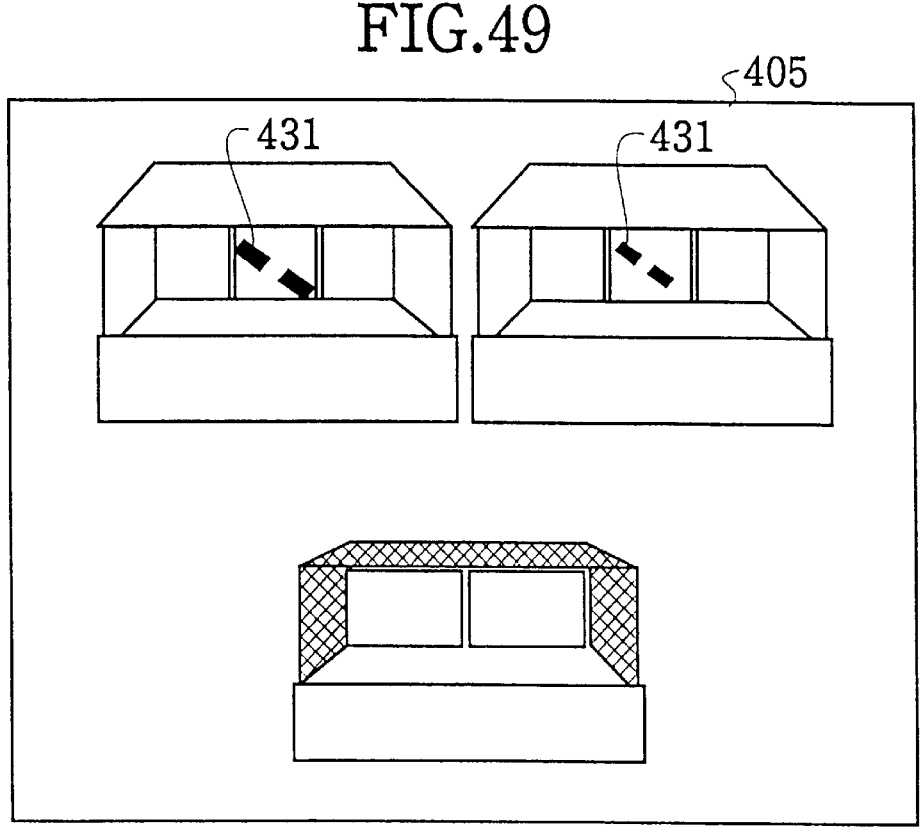
FIG. 49 is an illustration of an exemplary display of a 3D model without a louver.
Figure 50:
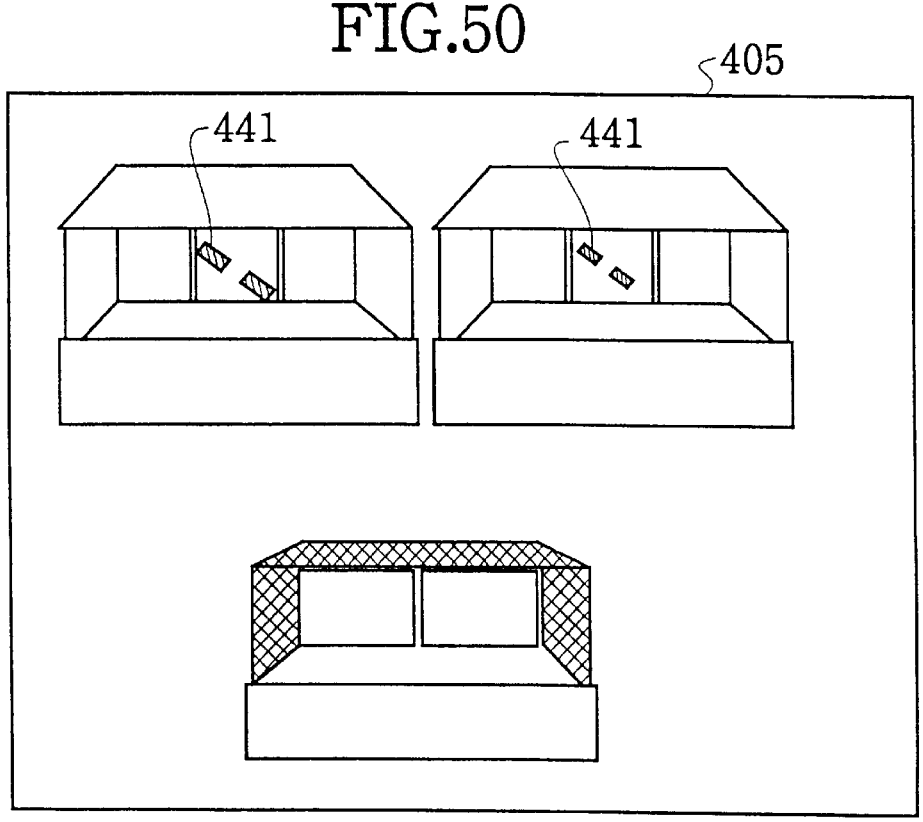
FIG. 50 is an illustration of an exemplary display of a 3D model with louvers.

Now, the operation of the system in this seventh embodiment will be described for an exemplary case of determining a 3D arrangement of the 3D model representing monitoring room as shown in FIGS. 49 and 50.

Figure 51:
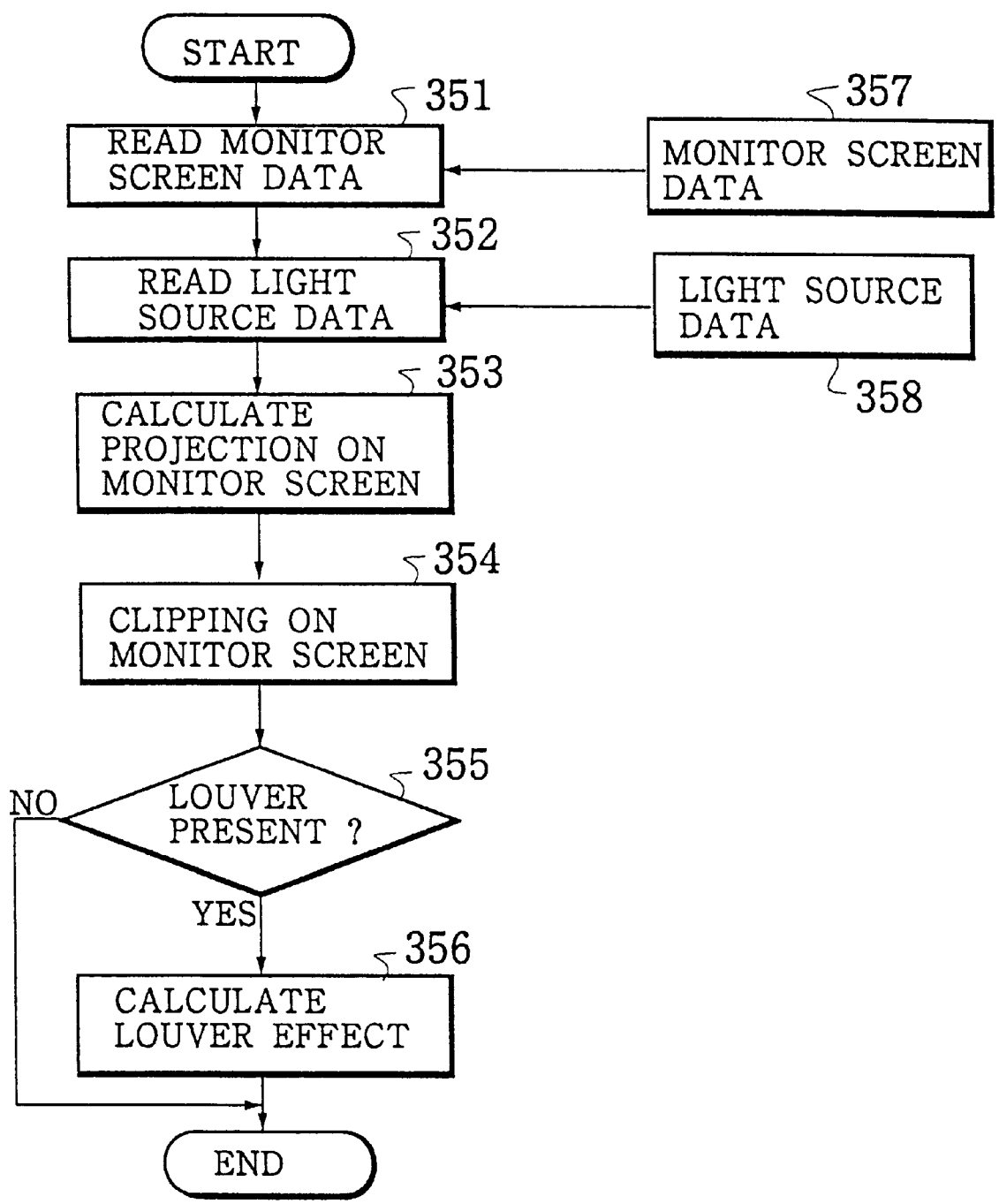
FIG. 51 is a flow chart for the operation of the system of FIG. 47.

Namely, in this case, the operation proceeds according to the flow chart of FIG. 51 as follows.

First, at the step 351, the monitor screen data for console monitor screens in the 3D model indicated by the reference numeral 357 which are stored in the 3D model memory unit 403 are read out from the 3D model memory unit 403 to the reflection calculation unit 410 through the data management unit 409. Here, the monitor screen data are given in a form of a table shown in FIG. 52, in which each entry specifies a monitor number, a position, vertices, a diameter/radius of curvature ratio (d/r), and a material for each console monitor screen included in the 3D model.

Here, the diameter/radius of curvature ratio d/r equal to 0 indicates that the radius of curvature is infinitely large, i.e., the monitor screen is flat. As the monitor screen becomes round, this ratio d/r becomes larger.

Next, at the step 352, the light source data for the fluorescent lights in the 3D model indicated by the reference numeral 358 which are stored in the 3D model memory unit 403 are read out from the 3D model memory unit 403 to the reflection calculation unit 410 through the data management unit 409. Here, the light source data are given in a form of a table shown in FIG. 53, in which each entry specifies a light number, a position, vertices, and luminous intensities for a case without a louver and a case with a louver.

Next, at the step 353, the projection of the fluorescent lights on the monitor screen is calculated according to the fluorescent light polygons formed by the vertex data given in the light source data of FIG. 53 and the screen polygons formed by the vertex data given in the monitor screen data of FIG. 52.

Figure 54:
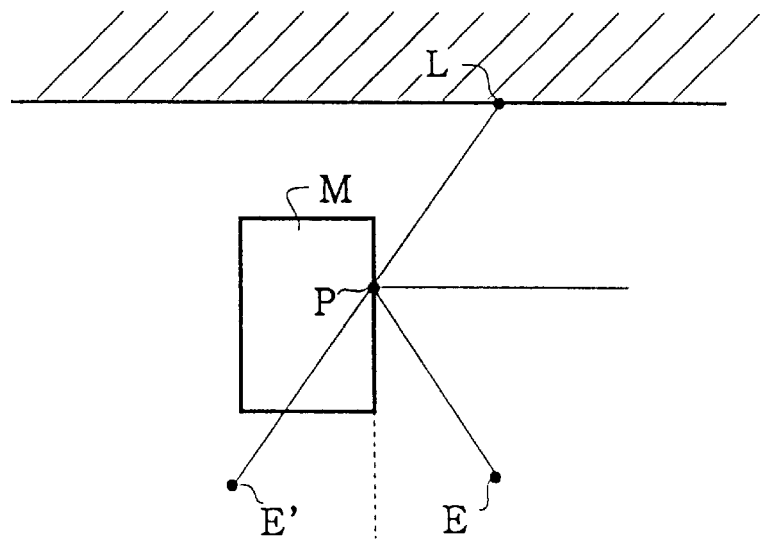
FIG. 54 is a diagram for explaining a procedure for obtaining a projection polygon for a case of a flat monitor screen in the system of FIG. 47.

Here, in a case the monitor screen is flat, i.e., when d/r=0, an intersection of a line joining a mirror image point E' of the viewpoint E and the vertex L of the fluorescent light with the monitor screen surface M is calculated as a reflection point P as shown in FIG. 54, for each vertex L of each fluorescent light, so as to obtain a projection polygon for the fluorescent light at the monitor screen surface M. In this case, the viewpoint E is determined according to the height of the operator or the average height of the operator type specified from the input unit 401.

Figure 55A:
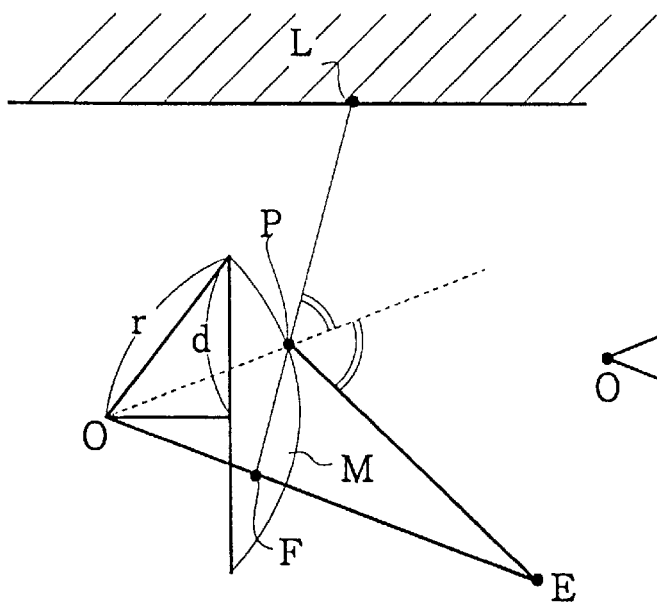
FIGS. 55A and 55B are diagrams for explaining a procedure for obtaining a projection polygon for a case of a curved monitor screen in the system of FIG. 47.
Figure 55B:
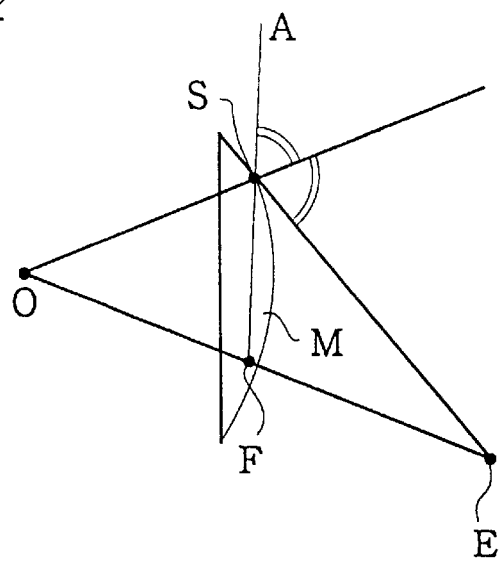

On the other hand, in a case the monitor screen is curved, assuming that the monitor screen surface M can be approximated by an appropriate spherical surface, the focal point F for the viewpoint E and the monitor screen surface M is calculated as shown in FIG. 55A. Here, in general, as shown in FIG. 55B, a point A is obtained for an arbitrary sample point S on the monitor screen surface M is determined such that an angle between the line passing through the point A and the sample point S and the line passing through the sample point S and the viewpoint E is divided in two equal parts by a line passing through a center O of the spherical surface of the monitor screen surface M and the sample point S, and then the focal point F is determined as an intersection of the line passing through the point A and the sample point S with the line joining the viewpoint E and the center O.

Then, the projection polygon of the fluorescent light on the monitor screen can be obtained by calculating an intersection of the monitor screen surface M with a line joining each vertex of the fluorescent light polygon and the focal point F.

Figure 56:
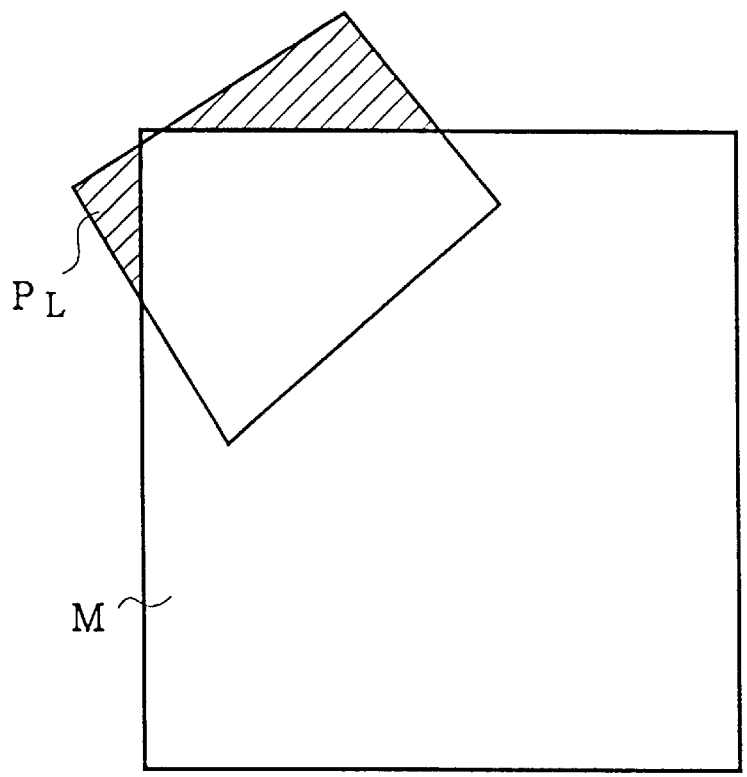
FIG. 56 is a diagrammatic illustration of a monitor screen for explaining a procedure for clipping used in the system of FIG. 47.

Then, at the step 354, when the projection polygon calculated at the step 353 has portions sticking out of the area of the monitor screen surface M as in a case of the projection polygon PL shown in FIG. 56, where shaded regions indicates the portions sticking out, these portions sticking out are clipped by using the known clipping algorithm such as the so called Liang-Barsky algorithm disclosed by Y-D. Liang and B. A. Barsky, "An Analysis and Algorithm for Polygon Clipping", CACM 26(11), pp. 868–877, November 1983.

Next, at the step 355, whether the louver is present in this case or not is determined according to the command entered from the reflection command unit 411. Here, the command from the reflection command unit 411 is actually inputted by using the keyboard or the data glove provided in the input unit 401.

If there is no louver, the process terminates at this point, whereas when there is a louver, next at the step 356, the effect of the louver is calculated. Note here that the above described steps 353 and 354 are equally valid for the case of using the louver as well, in which case the luminous intensity of the reflections due to the fluorescent light is decreased at this step 356, depending on the radiation angles of the lights emitted from the fluorescent light which are affected by the presence of the louver.

Figure 57:
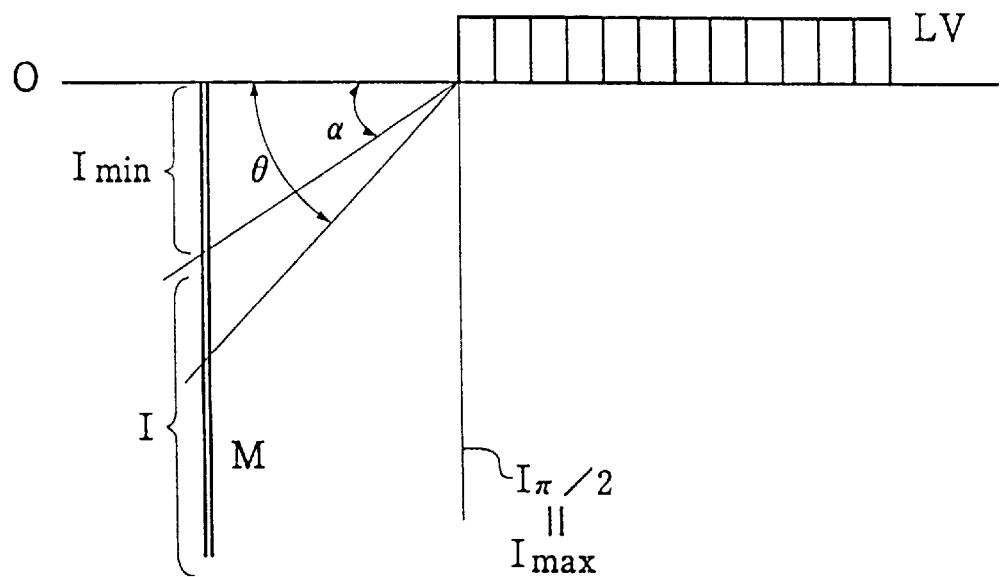
FIG. 57 is a diagrammatic illustration of a monitor screen and a louver for explaining a procedure for calculating an effect of a louver in the system of FIG. 47.

Namely, a case of using the louver can be represented as shown in FIG. 57, where LV indicates the louver.

In this case, a denotes the radiation limit angle at which only the lights reflected by the louver LV can reach the monitor screen surface M, such that there are only reflected lights with the luminous intensity equal to Imin for the radiation angle θ between 0 and α. Here, the luminous intensity Imin of the reflected lights depends on the material, interval, and height of the louver LV. In the example of the light source data shown in FIG. 53., the luminous intensity is reduced to ½ by the presence of the louver.

Figure 58:
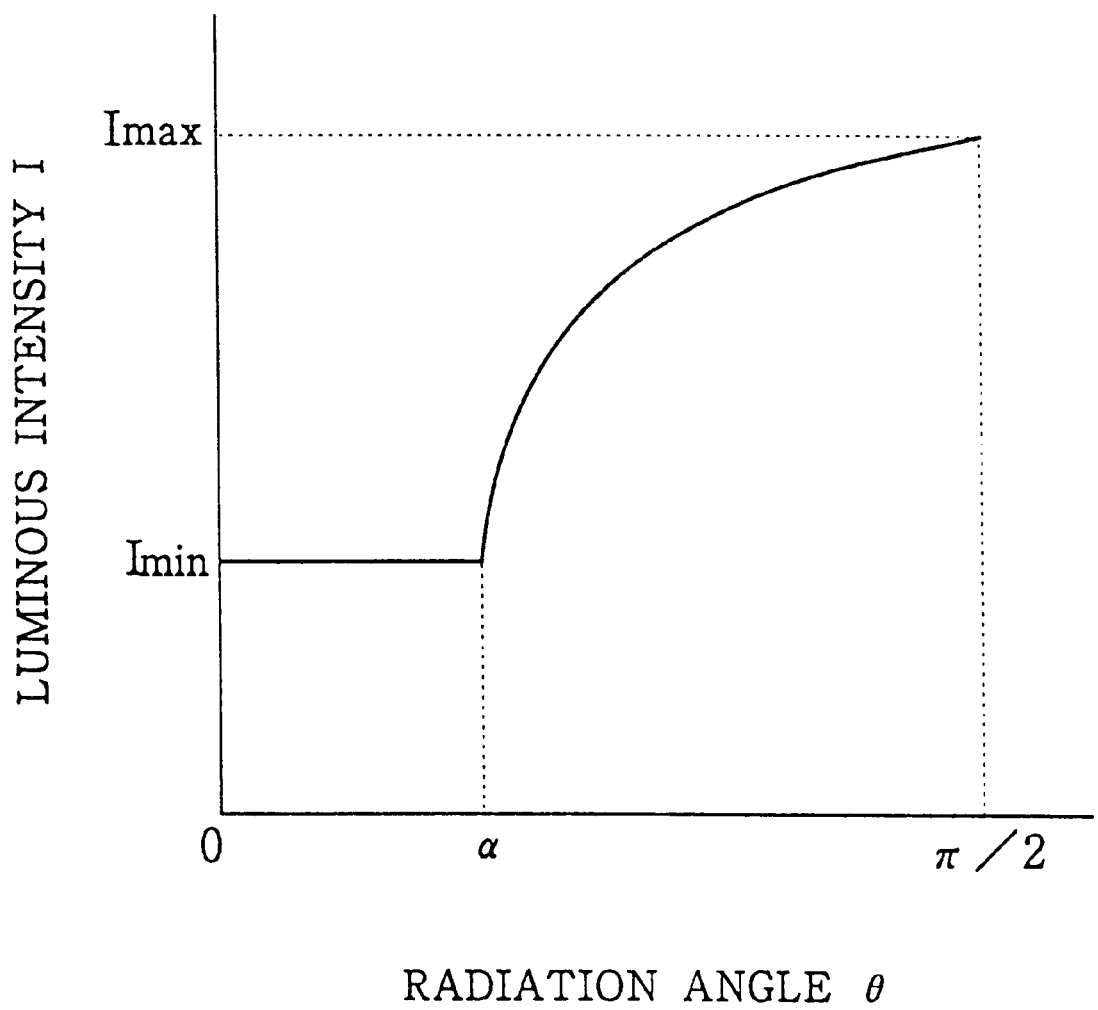
FIG. 58 is a graph of a function defining a relationship between the luminous intensity and the radiation angle for a case shown in FIG. 57.

On the other hand, for the radiation angle θ=π/2, the luminous intensity Imax is the same as the case without the louver. Consequently, the luminous intensity I for the radiation angle θ between α and π/2 can be expressed as follows.

$$I = I\min + (I\max - I\min) \cdot f(\theta - \alpha)$$

where f denotes an interpolation function, which can be given in a form of a quadratic curve shown in FIG. 58, for example.

Thus, at the step 356, the effect of the louver is calculated by calculating the luminous intensity I at each vertex of the fluorescent light polygon according to the above expression for the luminous intensity I, and then calculating the resulting luminous intensity at each vertex of the projection polygon.

It is to be noted that, in a case involving a plurality (L+1) of the fluorescent lights, the entries with the light number "0" to "L" in the table shown in FIG. 53 are used as the light source data, and the steps 351 to 356 described above are carried out for all these entries, whereas in a case involving a plurality (N+1) of the console monitors, the entries with the monitor numbers "0" to "N" in the table shown in FIG. 52 are used as the monitor screen data, and the steps 351 to 356 described above are carried out for each of these entries separately.

In this manner, the 3D model representing a monitoring room as shown in FIGS. 49 and 50 mentioned above can be obtained and displayed on the display unit 405.

In these FIGS. 49 and 50, the reflections 431 and 441, respectively, are superposed on the console monitor screens by using the transparency which is inversely proportional to the luminous intensity of each projection polygon on each monitor screen surfaces. In other words, for the larger luminous intensity of the projection polygon, the transparency is made lower, such that the displayed image behind the reflection becomes harder to see for the reflection with the larger luminous intensity.

Thus, according to this seventh embodiment, the reflections due to the fluorescent lights in the 3D model to be displayed can be obtained by the relatively simple calculation of the projection polygon for each fluorescent light polygon which can be carried out at high speed, so that the reflections due to the fluorescent lights can be incorporated on the displayed 3D model in real time, even when the arrangement of the 3D model is changed in the manner described below.

Now, the procedure for correcting the arrangement of the 3D model in this system of the seventh embodiment will be described.

In this case, the operator specifies the desired operations to be made on the 3D model displayed on the display unit 405 by the data glove or the keyboard provided in the input unit 401, using either the direct or the indirect commands.

Figures 59, 60:
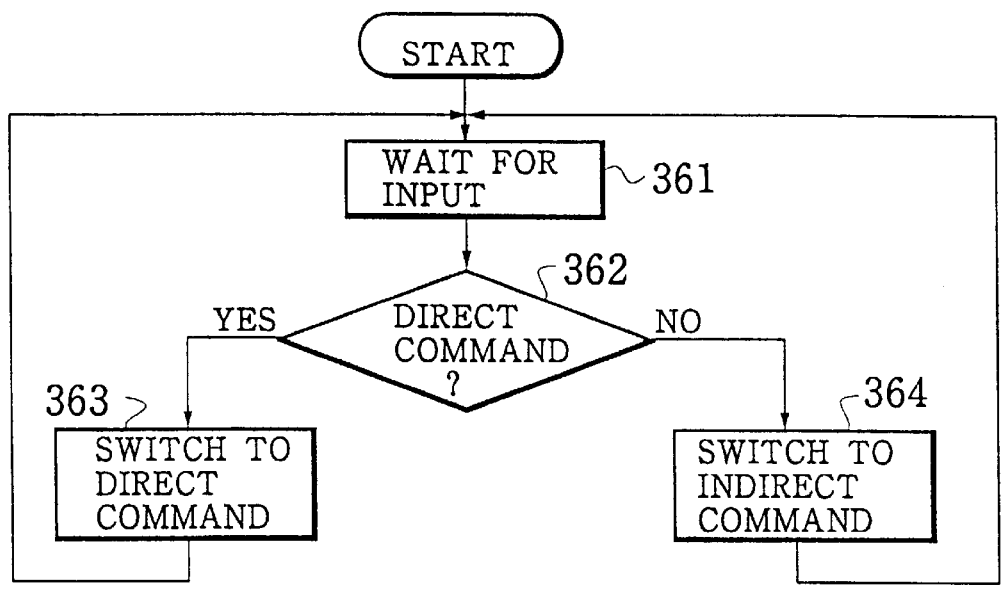
FIG. 59 is a flow chart for the operation of switching between direct command and indirect command in the system of FIG. 47.
FIG. 60 is a table summarizing the commands for switching between direct command and indirect command used in the system of FIG. 47.

Here, the command switching unit 408 switches between the direct command unit 406 and the indirect command unit 407 according to the flow chart of FIG. 59. Namely, first at the step 361, the input from the data glove or keyboard is waited. Then, when the input is entered, next at the step 362, whether the entered input specifies the direct command or not is determined. In a case of the input specifies the direct command, next at the step S363, the operation is switched to the direct command unit 406 and the process returns to the step 361 for the next input, whereas otherwise next at the step S364m the operation is switched to the indirect command unit 407.

In this case, the operator can specify the direct command or the indirect command according to the predetermined manner as summarized in a table shown in FIG. 60 which is stored in the command switching unit 408. According to this FIG. 60, when the data glove is used, the gesture of grasping indicates the direct command, for example.

In the direct command unit 406, the coordinate in the displayed 3D model can be specified directly from the input unit 401, so that the operator can manipulate the displayed 3D model directly. For example, when the operator wishes to change the angle of the monitor screen to see how the reflections due to the fluorescent lights changes, the operator moves the hand image displayed on the display unit 405 in correspondence to the data glove to the sufficient proximity to the displayed monitor screen, and specifies the direct command by making a gesture of grasping by the data glove. Then, the operator manipulate the data glove such that the hand image displayed on the display unit 405 pushes the edge of the monitor screen. In response, the data management unit 409 changes the display position of the monitor screen pushed by the hand image, according to the pushing indicated by the hand image. For example, when the pushing by the hand image indicates the moving of the right edge of the monitor screen to the coordinate (gx, gy, gz), the display position of the right edge of the monitor screen is changed in the z-direction (depth direction), such that the coordinates in the z-direction of the vertices registered in the monitor screen data shown in FIG. 52 are changed before and after the moving, as follows.

| Before moving | After moving |
| --- | --- |
| $Z_{00}$ | $Z_{00} - gz + (Z_{02} + Z_{03})/2$ |
| $Z_{01}$ | $Z_{01} - gz + (Z_{02} + Z_{03})/2$ |
| $Z_{02}$ | $gz + (Z_{02} - Z_{03})/2$ |
| $Z_{03}$ | $gz + (Z_{02} - Z_{03})/2$ |

Similarly, when the hand image pushes the left edge of the monitor screen, the display position of the left edge of the monitor screen is changed in the similar manner. Also, when the hand image pushes the upper or lower edge of the monitor screen, the display position of the upper or lower edge of the monitor screen is changed in x- and y-directions.

In a case the operator wishes to shorten the length of the monitor table, the operator can specify the operation of cutting by making a gesture of cutting in the direct command mode with the hand image located at a desired position to cut the monitor table, such that the monitor table on the y-z plane can be cut off at the specified position.

On the other hand, in a case of changing the location of the entire console monitor, it is rather difficult to specify the desired location precisely by directly moving the displayed monitor screen in the direct command mode. In such a case, it is more convenient to utilize a two dimensional top plan view of the arrangement of the 3D model on which the position can be specified precisely by using the mouse provided in the input unit 401.

Consequently, in such a case, the operator depresses the function-2 key of the keyboard provided in the input unit 401 to indicate the indirect command, such that the command switching unit 408 switches to the indirect command unit 407 according to the flow chart of FIG. 59.

In response, the display unit 405 displays the two-dimensional arrangement diagram of the 3D model, on which the arrangement can be manipulated according to the desired position specified by using the mouse provided in the input unit 401.

It is to be noted that the switching between the direct command unit 406 and the indirect command unit 407 can be specified by the 3D model itself, rather than the input from the input unit 401, in forms of the flags indicating the appropriate manipulation mode suitable for each part of the 3D model.

Now, the operation of the data format conversion at the data conversion unit 402 in the system of FIG. 47 will be described in detail.

Namely, in this seventh embodiment, the 3D model memory unit 403 stores the 3D model in the data format called flip file format developed by the Silicon Graphic Inc. so as to facilitate the high speed handling of the 3D model at the data management unit 409, the display conversion unit 404, and the display unit 405.

Figure 61:
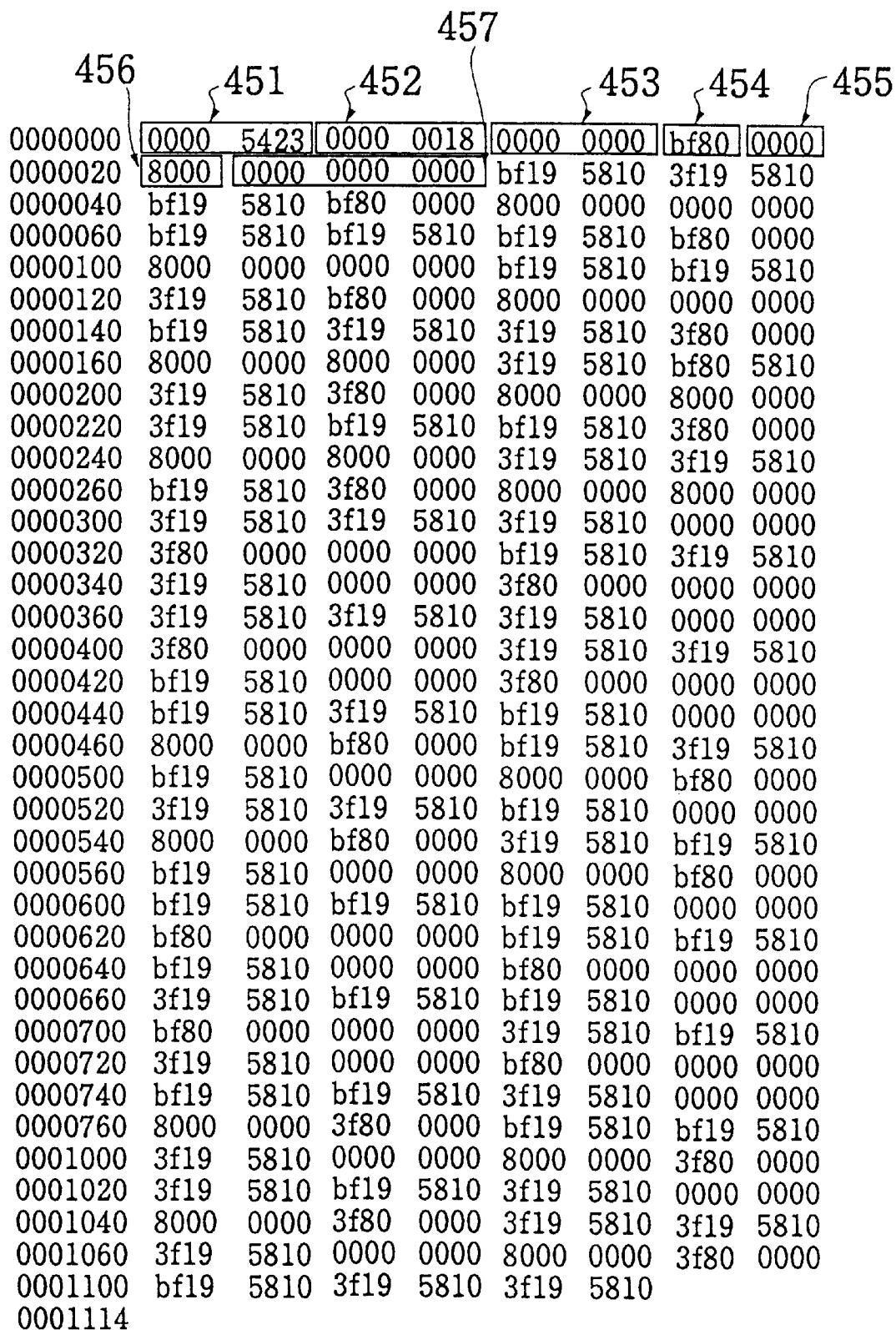
FIG. 61 is an illustration of the 3D model data for a cube in a flip file format to be used in the system of FIG. 47.

As a simplest example, a cube can be expressed in this flip file format as shown in FIG. 61. In this FIG. 61, a part 451 indicates the start, a part 452 indicates a vertex, a part 453 indicates a space, parts 454 to 456 indicates normal vectors in x, y, and z directions, respectively, and a part 457 indicates x, y, and z coordinates of the vertex. The similar expressions are given in the following parts.

On the other hand, the data format widely used in the CAD system is the dxf format developed by the AutoDesk Inc. As a simplest example, a cube can be expressed in this dxf format as shown in FIG. 62.

Now, as can be seen from these FIGS. 61 and 62, the flip file format of FIG. 61 uses four vertices of a rectangular polygon and normal vectors indicating the orientation of the rectangular polygon, where the normal vectors are indispensable in calculating the luminous intensity when the light is incident on the rectangular polygon, whereas the dxf format of FIG. 62 uses the type of the figure such as "POLYLINE" and the vertices forming the figure such as "VERTEX" for expressing the 3D figure, so that the dxf format does not include the normal vectors.

Consequently, it becomes necessary to derive the normal vectors from the vertices given in the dxf format in a case of using the data produced by CAD system in the dxf format is to be used as the input data in this system. Note here that there are two types of the normal vectors including the right handed one and the left handed one that can be derived from a given vertex.

Figure 63:
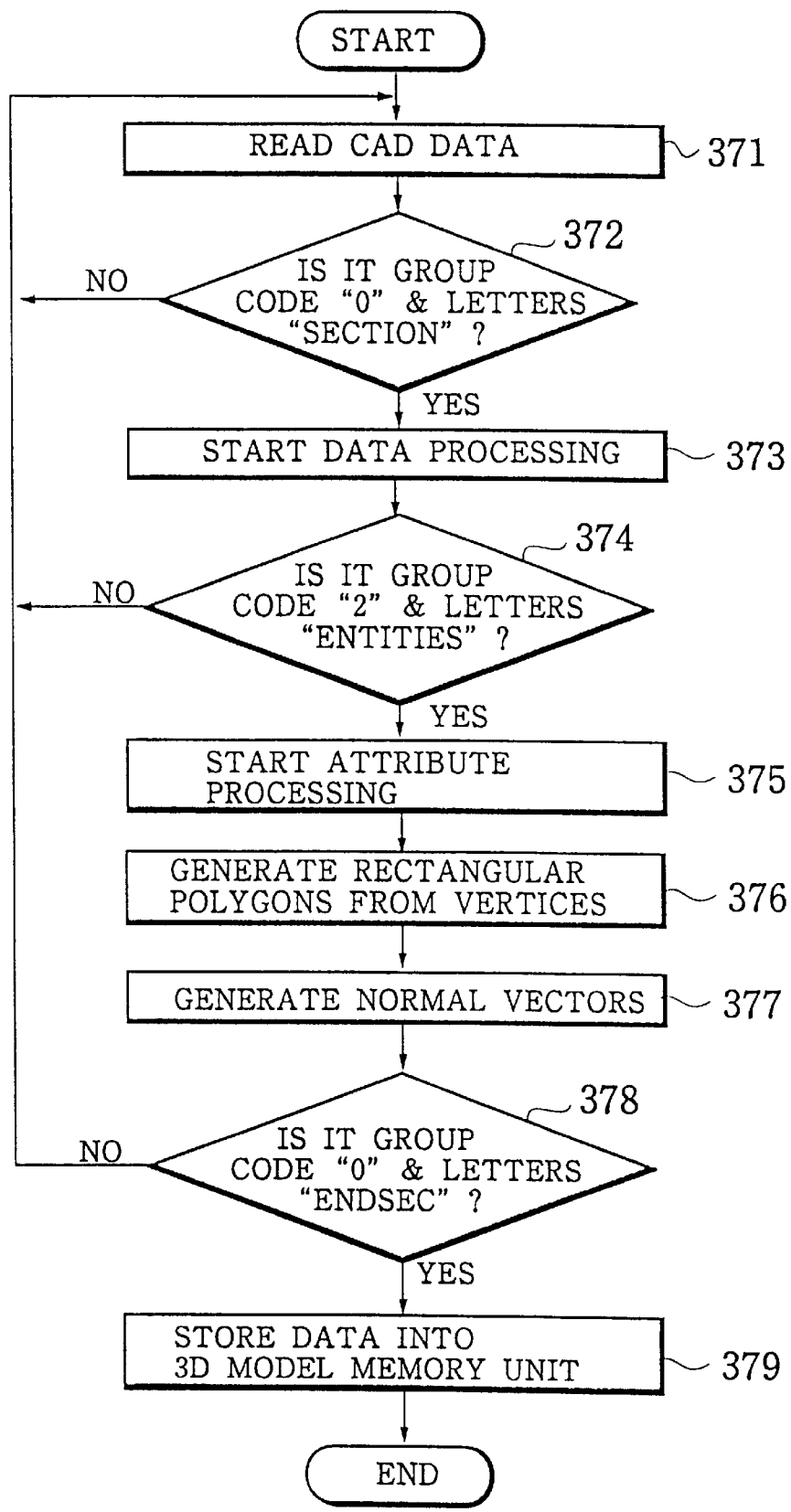
FIG. 63 is a flow chart for the operation of data format conversion from the dxf format to the flip file format in the system of FIG. 47.

Thus, the conversion of the data format from the dxf format to the flip file format can be carried out according to the flow chart of FIG. 63.

First, at the step 371, the CAD data in the dxf format produced by the external CAD system are read into the data conversion unit 402 through the input unit 401.

Then, at the step 372, whether the first data line entered at the step 371 is the data line having a group code "0" and the letters "SECTION" in the dxf format or not is determined. In a case of the affirmative, the data processing is started at the next step 373, whereas otherwise the process returns to the step 371 for the next CAD data.

Then, at the step 374, whether the next data line entered at the step 371 is the data line having a group code "2" and the letters "ENTITIES" in the dxf format or not is determined. In a case of the affirmative, the data processing is started at the next step 375, whereas otherwise the process returns to the step 371 for the next CAD data.

Then, at the step 376, the rectangular polygons are generated from the vertices specified in the CAD data by reading the following data lines specifying the vertices, and at the step 377, the normal vectors are also generated from the vertices. Here, both the right handed and left handed normal vectors are generated.

Then, at the step 378, whether the next data line entered at the step 371 is the data line having a group code "0" and the letters "ENDSEC" in the dxf format or not is determined. In a case of the affirmative, the rectangular polygons generated at the step 376 and the normal vectors generated at the step 377 are stored in to the 3D model memory unit 403 at the next step 379, whereas otherwise the process returns to the step 371 for the next CAD data.

On the other hand, in order to convert the 3D model given in the flip file format into the dxf format, the "POLYLINE" and the vertex data can be obtained directly.

Thus, according to this seventh embodiment, the reflections due to the fluorescent lights can be incorporated in the display of the 3D model in real time, and the arrangement of the displayed 3D model can be manipulated in view of the reflections, so that the 3D model can be checked in a very realistic setting, so as to reduce the possible need for re-designing the room or re-manufacturing the products. Moreover, the CAD data produced by the already existing CAD system can be utilized directly, so that the operation of the system can be simplified.

It is to be noted that the CAD data entered from the external CAD system may be processed into a desired form before they are stored into the 3D model memory unit 403. For example, the very smooth curve that can effectively be regarded as a straight line can be approximated by the straight line so as to reduce the number of polygons involved, as long as the approximation is practically unnoticeable by the operator, within the precision provided by the drawing device used.

Also, the 3D object having the complicated shape or the inner structure in the 3D model can be simplified by omitting those parts which are practically invisible to the operator. Namely, in addition to those parts which are totally invisible from outside, those parts which are visible only from very limited positions of viewpoint may also be omitted, depending on the various positions of the viewpoint that can be provided by the manner of display, within the precision provided by the drawing device used. In this case, the different weight factors may be used for different directions, such that the surfaces visible from above will not be omitted for example.

It is to be noted that the manner of entering various input by using the various input devices provided in the input unit 401 as described above may be modified in any desired manner, so that it is also possible to take the image of the operator's hand, and image processed this image to determine the commands, for example.

Figure 64:
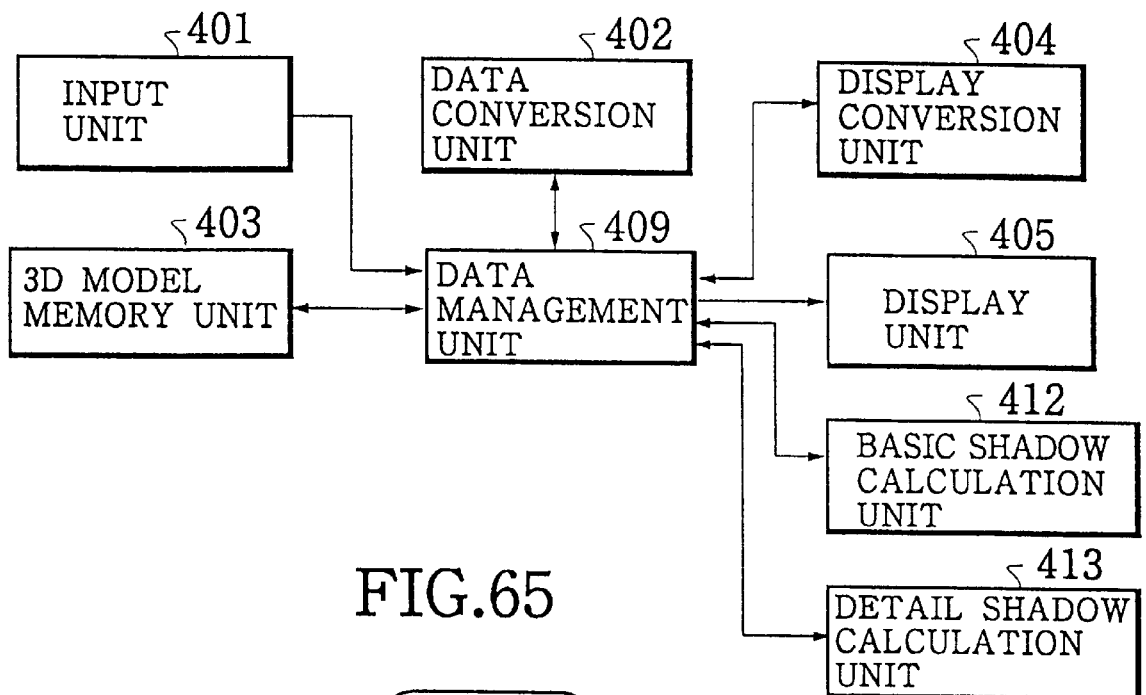
FIG. 64 is a schematic block diagram of an eighth embodiment of a virtual reality data presentation system according to the present invention.

Referring now to FIG. 64, an eighth embodiment of a virtual reality data presentation system according to the present invention will be described in detail.

In this eighth embodiment, the system is given in a form of a 3D model arrangement design system, in which the input unit 401, the data conversion unit 402, the 3D model memory unit 403, the display conversion unit 404, the display unit 405, and the data management unit 409 are substantially similar to those described above for the seventh embodiment, so that their descriptions will be omitted.

In addition, this system of FIG. 64 further comprises: a basic shadow calculation unit 412 for calculating the basic shadow to be incorporated in to the displayed 3D model; and the detail shadow calculation unit 413 for calculating the detail shadow based on the basic shadow calculated by the basic shadow calculation unit 412 in which the peripheral region of the shadow is blurred; where both of these basic shadow calculation unit 412 and the detail shadow calculation unit 413 are connected to the data management unit 408.

Figure 65:
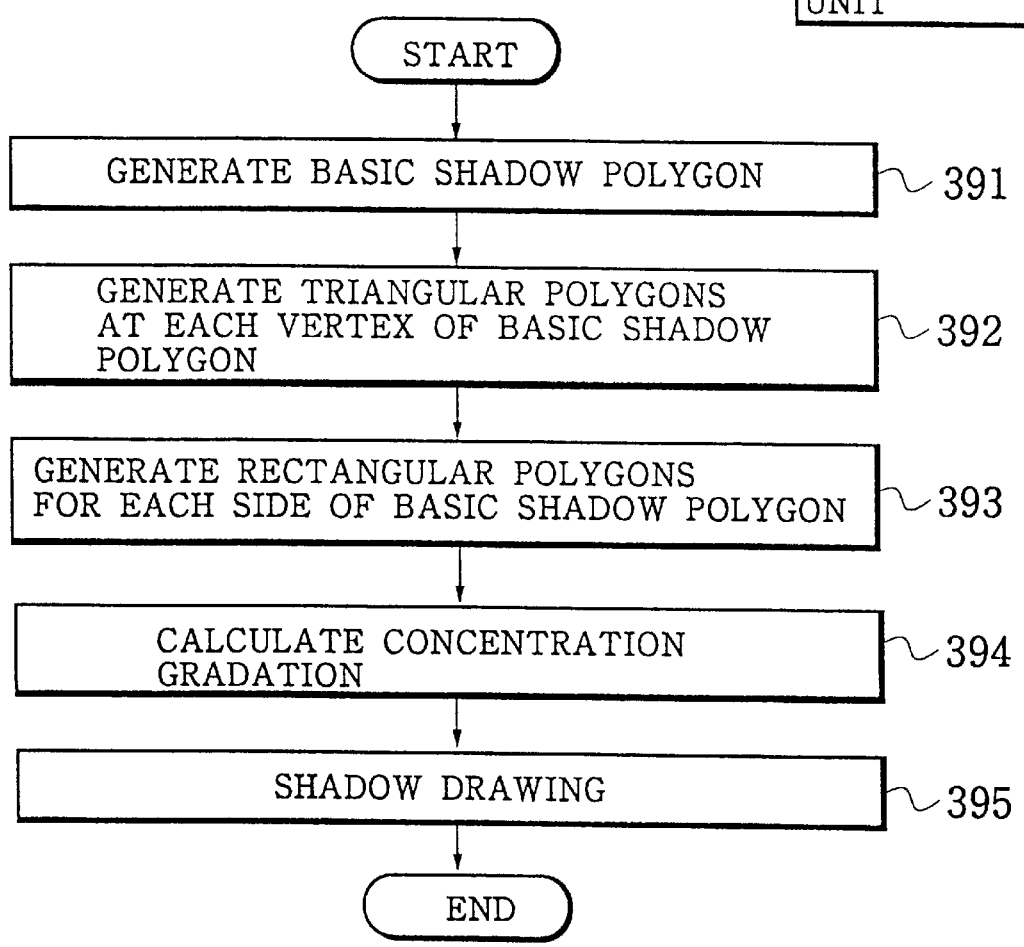
FIG. 65 is a flow chart for the operation of generating the shadow image in the system of FIG. 64.

More specifically, the generation of the shadows to be incorporated in the displayed 3D model by these basic shadow calculation unit 412 and the detail shadow calculation unit 413 is carried out according to the flow chart of FIG. 65 as follows.

First, at the step 391, the basic shadow polygon is generated by the basic shadow calculation unit 412. Here, the basic shadow calculation unit 412 uses the known shadow generation algorithm such as that disclosed by J. F. Blinn, "Me and My (Fake) Shadow", CG & A, 9(1), pp. 82–86, January 1988, which imposes no limitation on the 3D model data structure. Namely, as shown in FIG. 66, a basic shadow 422 of the 3D object 420 on a projection plane 421 is obtained at this step 391.

Figure 66:
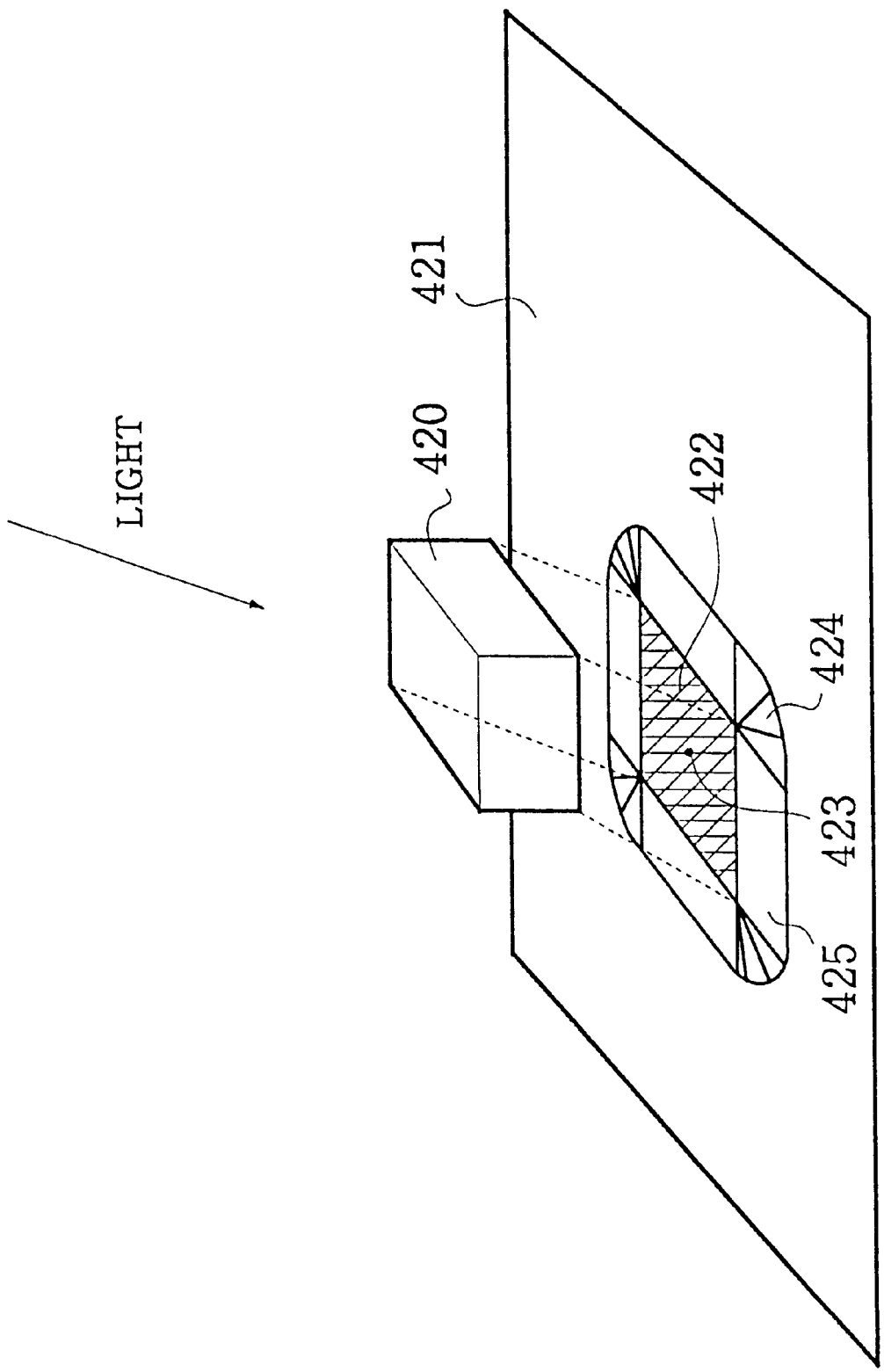
FIG. 66 is a diagrammatic illustration of the shadow image generated according to the flow chart shown in FIG. 65.

Then, at the step 392, the detail shadow calculation unit 413 generates triangular polygons 424 at each vertex of the basic shadow polygon, as shown in FIG. 66. Here, the triangular polygons 424 can be obtained by extending the line segments from each of the two sides of the basic shadow polygon meeting at that vertex by a predetermined length δ and the angle between these line segments is divided into a plurality of equal parts (three in FIG. 66) to form a plurality (three) of isoscales triangles. The triangular polygons 424 may also be generated with respect to a line joining a light source projection point 423 and each vertex of the basic shadow polygon, which is extended outwards by the predetermined length δ from each vertex.

Next, at the step 393, the detail shadow calculation unit 413 generates rectangular polygons 425 next to each side of the basic shadow polygon.

Then, at the step 394, the concentration at the boundary of the basic shadow polygon and the rectangular polygons generated at the step 393 is set equal to 1, while the concentration at outer contour of expansion polygon generated by the detail shadow calculation unit 413 including the triangular polygons generated at the step 392 and the rectangular polygons generated at the step 393 are set equal to 0, and the concentrations for the any other region of the expansion polygons lying between the boundary and the outer contour are linearly interpolated, so as to form the concentration gradation. Also, the concentration at interior of the basic shadow polygon is set equal to 1.

Finally, at the step 395, the concentration p for each point calculated at the step 394 is converted into the transparency t at each point according to the equation t=1.0−p, and the shadow painted out according to this transparency t at each point is drawn on the displayed 3D model.

As a result, it becomes possible to form a dim semi-tone shadow due to the expansion polygons can be formed around the basic shadow 422 at high speed, such that the soft shadow image can be incorporated in the displayed 3D model, which can assist the operator's comprehension of the 3D arrangement of the objects.

It is to be noted that the calculation of the concentration gradient at the step 394 may be modified such that the concentration is set equal to 1 only at the light source projection point 423 while the concentration at the outer contour is set equal to 0 and the concentrations at any intermediate points between the light source projection point 423 and the outer contour can be obtained by the linear interpolation, such that the entirely dim shadow can be produced.

It is to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A virtual reality data presentation system, comprising:
   model data memory means for storing 3D (three dimensional) model data representing a 3D model with object models in a 3D virtual space;
   data presentation means for presenting the 3D model according to the 3D model data stored in the data memory means;
   input means operated by a user to which the 3D model is presented by the data presentation means, for entering input data Indicating a user's physical action in a real space for virtually manipulating physical objects represented by the object models in the 3D model;
   control data memory means for storing control data specifying reactions of the object models in the 3D virtual space presented by the data presentation means in response to the user's physical action indicated by the input data entered from the input means, the control data specifying the reactions of the object models by applying a non-linear function defining a desired natural relationship between the reactions of the object models and the user's physical action onto the input data entered from the input means; and
   control means for controlling the data presentation means according to the 3D model data stored in the model data memory means, the input data entered from the input means, and the control data stored in the control data memory means, such that reactions of the object models in the 3D virtual space in response to the user's physical action resemble reactions of the physical objects in the real space in response to the user's physical action.

2. The system of claim 1, wherein the control data specify the reactions of the object models in terms of movements of the object models different from movements set by the user's physical action indicated by the input data entered from the input means.

3. The system of claim 1, wherein the 3D model data include image data and sound data associated with the 3D model, and the data presentation means presents the image data of the 3D model in correspondence to the sound data of the 3D model.

4. The system of claim 1, wherein the data presentation means displays the 3D model, and the control data include restriction data specifying restrictions concerning a display position of at least one of the object models in the 3D model, such that the control means controls the display position of said at least one of the object models in the 3D model according to the restriction data.

5. The system of claim 1, further comprising 2D (two dimensional) image memory means for storing 2D image indicative of spatial arrangement of the object models in the 3D virtual space, wherein the control means controls the data presentation means to display the 3D model along the 2D image stored in the 2D image memory means.

6. The system of claim 5, wherein the control means controls the data presentation means to display at least one of a present position of a viewpoint from which the 3D model is displayed and a present view field covered by the display of the 3D model, on the 2D image displayed along the 3D model.

7. The system of claim 1, wherein the 3D model data include:
  object shape data specifying a shape of each object model in the 3D model;
  material property data specifying material properties of a material composing a physical object represented by each object model in the 3D model; and
  linkage data specifying a link between the object shape data and the material property data for each object model in the 3D model; and
  wherein the control means controls the data presentation means to present the material property data in conjunction with a display of the 3D model according to the object shape data.

8. The system of claim 7, wherein the material property data specify the material properties including at least one of a texture, an auditory material property, a tactile material property, an olfactory material property, and a gustatory material property.

9. The system of claim 1, further comprising attribution memory means for storing attribution data specifying attribution values of prescribed attributions affecting a manner of presentation of the 3D model by the data presentation means, for each user type representing a type of the user operating the input means, wherein the control means controls the manner of presentation of the 3D model by the data presentation means according to the attribution data for the user type specified from the input means.

10. The system of claim 9, wherein the attribution data specify a height of the user represented by each user type, and the data presentation means displays the 3D model with a viewpoint positioned according to the height specified by the attribution data for the user type specified from the input means.

11. The system of claim 9, wherein the attribution data specify physical sizes of the user represented by each user type, and the data presentation means presents the 3D model in a form suitable for the physical sizes specified by the attribution data for the user type specified from the input means.

12. The system of claim 9, wherein the attribution data specify a force sense of the user represented by each user type, the force sense indicating a manner by which the user senses a force exerted onto the user, and the data presentation means presents the 3D model in accordance with the force sense specified from the input means.

13. The system of claim 1, further comprising real data acquisition means for obtaining dynamically changing real object data in real time from physical objects represented by the object models in the 3D model, wherein the control means controls the data presentation means to selectively present selected ones of the object models in the 3D model in terms of the real object data obtained by the real data acquisition means.

14. The system of claim 13, wherein the real object data include at least one of real image data indicating physical appearances of the physical objects and real sound data indicating physical sound generated by the physical objects.

15. The system of claim 13, wherein the control means controls the data presentation means to present the object models in terms of the real object data for those object models in the 3D model which are located within a range of attention of the user operating the input means.

16. The system of claim 1, further comprising reflection calculation means for calculating reflections due to lights in the 3D model, wherein the data presentation means displays the 3D model and the control means controls the data presentation means to display the 3D model by superposing the reflections due to lights calculated by the reflection calculation means onto the 3D model.

17. The system of claim 16, wherein the reflection calculation means calculates the reflections due to lights according to positions in the 3D virtual space of light source models and reflective surface models in the 3D model, physical attributions of physical light sources and physical reflective surfaces represented by the light source models and the reflective surface models in the 3D model, and presence or absence of louvers attached to the light source models in the 3D model.

18. The system of claim 16, wherein the reflection calculation means calculates the reflections due to lights as projection polygons obtained by Projecting light source polygons representing the light source models onto the reflective surface models.

19. The system of claim 1, wherein the input means includes:
  direct command means for entering direct input data for directly manipulating the object models in the 3D virtual space in which the 3D model is presented by the data presentation means; and
  indirect command mans for entering indirect input data for indirectly manipulating the object models in the 2D space indicative of spatial arrangement of the object models in the 3D virtual space.

20. The system of claim 1, further comprising shadow calculation means for calculating shadows due to lights for the object models in the 3D model, and wherein the data presentation means displays the 3D model and the control means controls the data presentation means to display the 3D model by superposing the shadows due to lights calculated by the shadow calculation means onto the 3D model.

21. The system of claim 20, wherein the shadow calculation means calculates the shadows due to lights by expanding a direct projection area of each object model into expansion polygons surrounding the direct projection area and providing a concentration gradation for the shadows due to lights within the direct projection area and the expansion polygons.

22. A virtual reality data presentation system, comprising:
  model data memory means for storing 3D (three dimensional) model data representing a 3D model with object models in a 3D virtual space;
  data presentation means for presenting the 3D model to a user according to the 3D model data stored in the data memory means in a manner allowing a user's virtual manipulation of the object models in the 3D model within the 3D virtual space;

real data acquisition means for obtaining dynamically changing real physical object appearance data in real time from physical objects in a real space which are represented by the object models in the 3D model; and control means for controlling the data presentation means to selectively present selected ones of the object models in the 3D model in terms of the real physical object appearance data obtained by the real data acquisition means such that appearances of the object models in the 3D virtual spaces presented by the data presentation means resemble appearances of the physical object in the real space.

23. The system of claim 22, wherein the real object data include at least one of real image data indicating physical appearances of the physical objects and real sound data indicating physical sounds generated by the physical objects.

24. The system of claim 22, wherein the control means controls the data presentation means to present the object models in terms of the real object data for those object models in the 3D model which are located within a range of attention of the user operating the system.

25. A method of virtual reality data presentation, comprising the steps of:

presenting a 3D (three dimensional) model to a user according to 3D model data representing a 3D model with object models in a 3D virtual space;

entering input data indicating a user's physical action in a real space for virtually manipulating physical objects represented by the object models in the 3D model; and controlling the presenting step according to the 3D model data, the input data entered at the entering step, and control data specifying reactions of the object models in the 3D virtual space presented at the presenting step in response to the user's physical action indicated by the input data entered at the entering step, the control data specifying the reactions of the object models by applying a non-linear function defining a desired natural relationship between the reactions of the object models and the user's physical action onto the input data entered at the entering step, such that reactions of the object models in the 3D virtual space in response to the user's physical action resemble reactions of the physical objects in the real space in response to the user's physical action.

26. A method of virtual reality data presentation, comprising the steps of:

presenting a 3D (three dimensional) model to a user according to 3D model data representing a 3D model with object models in a 3D virtual space, in a manner allowing a user's virtual manipulation of the object models in the 3D model within the 3D virtual space;

obtaining dynamically changing real physical object appearance data in real time from physical objects in a real space which are represented by the object models in the 3D model; and controlling the presenting step to selectively present selected ones of the object models in the 3D model in terms of the real physical object appearance data obtained at the obtaining step, such that appearances of the object models in the 3D virtual space presented by the presenting step resemble appearance of the physical objects in the real space.

27. A virtual reality data presentation system, comprising:

model data memory means for storing 3D (three dimensional) model data representing a 3D model with object models in a 3D virtual space;

data presentation means for presenting the 3D model according to the 3D model data stored in the data memory means;

input means operated by a user to which the 3D model is presented by the data presentation means, for entering input data indicating a user's physical action in a real space for virtually manipulating physical objects represented by the object models in the 3D model;

control data memory means for storing control data specifying reactions of the object model in the 3D virtual space presented by the data presentation means in response to the user's physical action indicated by the input data entered from the input means, the control data specifying the reactions of the object models in terms of natural movements of the object models which are different from manipulating movements set by the user's physical action indicated by the input data entered from the input means; and control means for controlling the data presentation means according to the 3D model data stored in the model data memory means, the input data entered from the input means, and the control data stored in the control data memory means, such that reactions of the object models in the 3D virtual space in response to the user's physical action resemble reactions of the physical objects in the real space in response to the user's physical action.

28. A method of virtual reality data presentation, comprising the steps of:

presenting a 3D (three dimensional) model to a user according to 3D model data representing a 3D model with object models in a 3D virtual space;

entering input data indicating a user's physical action in a real space for virtually manipulating physical objects represented by the object models in the 3D model; and controlling the presenting step according to the 3D model data, the input data entered at the entering step, and control data specifying reactions of the object models in the 3D virtual space presented at the presenting step in response to the user's physical action indicated by the input data entered at the entering step, the control data specifying the reactions of the object models in terms of natural movements of the object models which are different from manipulating movements set by the user's physical action indicated by the input data entered at the entering step, such that reactions of the object models in the 3D virtual space in response to the user's physical action resemble reactions of the physical objects in the real space in response to the user's physical action.

* * * * *